(12) United States Patent
Murison

(10) Patent No.: US 11,033,830 B2
(45) Date of Patent: Jun. 15, 2021

(54) METHODS AND DEVICES TO HYDRAULIC CONSUMER DEVICES

(71) Applicant: OBOTICS INC., North Gower (CA)

(72) Inventor: Bruce Murison, North Gower (CA)

(73) Assignee: Obotics Inc., North Gower (CA)

(*) Notice: Subject to any disclaimer, the term of this patent is extended or adjusted under 35 U.S.C. 154(b) by 1053 days.

(21) Appl. No.: 15/125,022

(22) PCT Filed: Mar. 11, 2015

(86) PCT No.: PCT/CA2015/000159
§ 371 (c)(1),
(2) Date: Sep. 9, 2016

(87) PCT Pub. No.: WO2015/135070
PCT Pub. Date: Sep. 17, 2015

(65) Prior Publication Data
US 2017/0021284 A1 Jan. 26, 2017

Related U.S. Application Data

(60) Provisional application No. 61/950,980, filed on Mar. 11, 2014.

(51) Int. Cl.
*A61H 9/00* (2006.01)
*A61H 35/00* (2006.01)
(Continued)

(52) U.S. Cl.
CPC ............. *A63H 29/00* (2013.01); *A61H 7/001* (2013.01); *A61H 9/0078* (2013.01); *A63H 3/46* (2013.01);
(Continued)

(58) Field of Classification Search
CPC ...... F04B 17/044; F04B 17/046; A63H 11/00; A63H 13/00; A63H 29/00; A63H 33/26;
(Continued)

(56) References Cited

U.S. PATENT DOCUMENTS

| 2,515,110 | A | * | 7/1950 | Bornstein | ................. F04B 5/02 417/418 |
| 3,754,154 | A | * | 8/1973 | Massie | ................... H02K 33/14 310/30 |

(Continued)

*Primary Examiner* — Patrick Hamo
(74) *Attorney, Agent, or Firm* — Rosenberg, Klein & Lee

(57) ABSTRACT

Many devices with "limbs" or "arms" are susceptible to damage when a user bends or twists a joint of the limb or arm beyond its design point or in a direction other than intended. This is common with children's toys. Accordingly, it would be beneficial to provide children with toys employing fluidic actuators that can be bent, twisted, deformed and yet recover subsequently allowing the intended motion to be performed. Further, it would be beneficial by providing devices that employ fluidic actuators, and hence are essentially non-mechanical, to provide users not only of toys but other devices with driving mechanisms that are not susceptible to wear-out such as, by stripping drive gears, etc., thereby increasing their reliability and reducing noise. Fluidic devices allow for high efficiency, high power to size ratio, low cost, limited or single moving part(s) and allow for mechanical springless designs as well as functional reduction by providing a piston which is both pump and vibrator.

18 Claims, 31 Drawing Sheets

(51) Int. Cl.

| | | |
|---|---|---|
| *A63H 29/00* | (2006.01) | |
| *A63H 11/00* | (2006.01) | |
| *A63H 13/00* | (2006.01) | |
| *H02K 41/02* | (2006.01) | |
| *A61H 7/00* | (2006.01) | |
| *A63H 29/22* | (2006.01) | |
| *A63H 29/10* | (2006.01) | |
| *A63H 3/46* | (2006.01) | |
| *A63H 33/26* | (2006.01) | |
| *F15B 11/16* | (2006.01) | |
| *F15B 13/06* | (2006.01) | |
| *G09B 23/30* | (2006.01) | |
| *F15B 15/10* | (2006.01) | |
| *F15B 15/08* | (2006.01) | |

(52) U.S. Cl.
CPC ............. *A63H 11/00* (2013.01); *A63H 13/00* (2013.01); *A63H 29/10* (2013.01); *A63H 29/22* (2013.01); *A63H 33/26* (2013.01); *F15B 11/16* (2013.01); *F15B 13/06* (2013.01); *G09B 23/303* (2013.01); *H02K 41/02* (2013.01); *A61H 7/005* (2013.01); *A61H 35/006* (2013.01); *A61H 2201/0207* (2013.01); *A61H 2201/0214* (2013.01); *A61H 2201/10* (2013.01); *A61H 2201/102* (2013.01); *A61H 2201/1238* (2013.01); *A61H 2201/1246* (2013.01); *A61H 2201/1664* (2013.01); *A61H 2201/5002* (2013.01); *A61H 2201/5005* (2013.01); *A61H 2201/5035* (2013.01); *A61H 2201/5038* (2013.01); *A61H 2201/5071* (2013.01); *A61H 2205/102* (2013.01); *F15B 15/08* (2013.01); *F15B 15/103* (2013.01); *F15B 2211/2053* (2013.01)

(58) Field of Classification Search
CPC .. A61H 7/001; A61H 9/0078; A61H 2201/10; A61H 2201/1238; A61H 2201/5035; F15B 11/16; F15B 13/06; F15B 2211/2053; G09B 23/303; H02K 41/02
USPC ........................................ 417/401, 417, 418
See application file for complete search history.

(56) References Cited

U.S. PATENT DOCUMENTS

| | | | | |
|---|---|---|---|---|
| 3,826,291 | A * | 7/1974 | Steffens | B67D 7/0482 141/59 |
| 4,223,706 | A * | 9/1980 | McGahey | B67D 7/0482 141/290 |
| 4,353,220 | A * | 10/1982 | Curwen | H02K 33/02 417/214 |
| 4,750,871 | A * | 6/1988 | Curwen | F04B 35/045 417/320 |
| 5,106,268 | A * | 4/1992 | Kawamura | F04B 35/045 417/418 |
| 5,123,817 | A * | 6/1992 | Willemsen | B67D 7/0482 141/290 |
| 5,957,113 | A * | 9/1999 | Masaki | F02M 25/089 123/518 |
| 6,899,149 | B1 * | 5/2005 | Hartsell, Jr. | B67D 7/0486 141/192 |
| 9,540,224 | B2 * | 1/2017 | Hakansson | F04B 53/006 |
| 2005/0053490 | A1 * | 3/2005 | Bahnen | F04B 35/045 417/418 |
| 2005/0112001 | A1 * | 5/2005 | Bahnen | F04B 35/045 417/418 |
| 2006/0127252 | A1 * | 6/2006 | Caddell | F04B 17/044 417/418 |

* cited by examiner

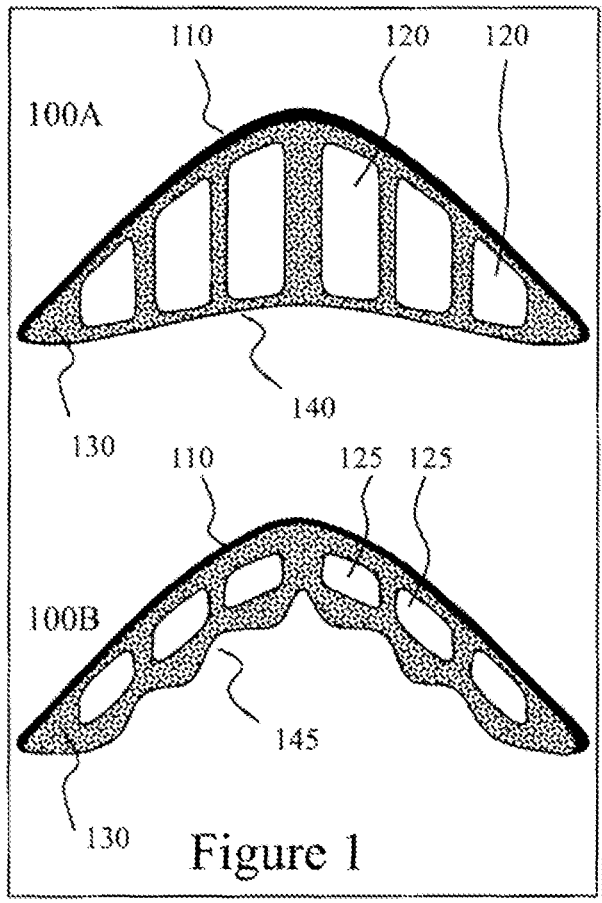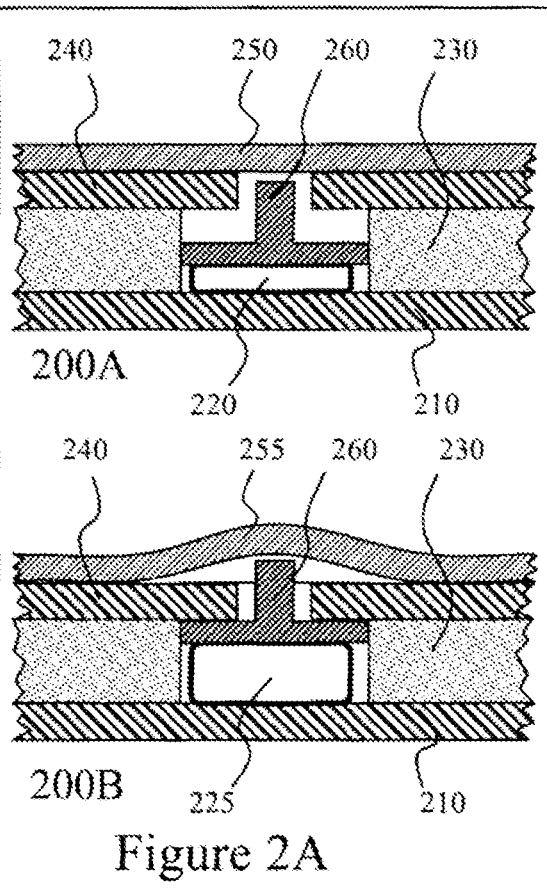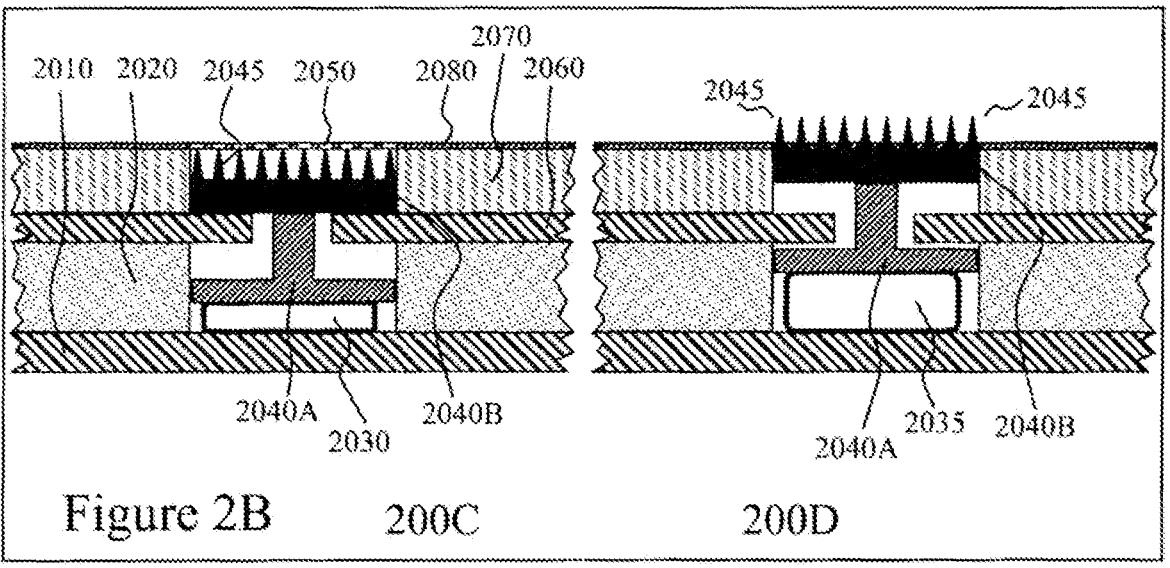
Figure 1
Figure 2A
Figure 2B

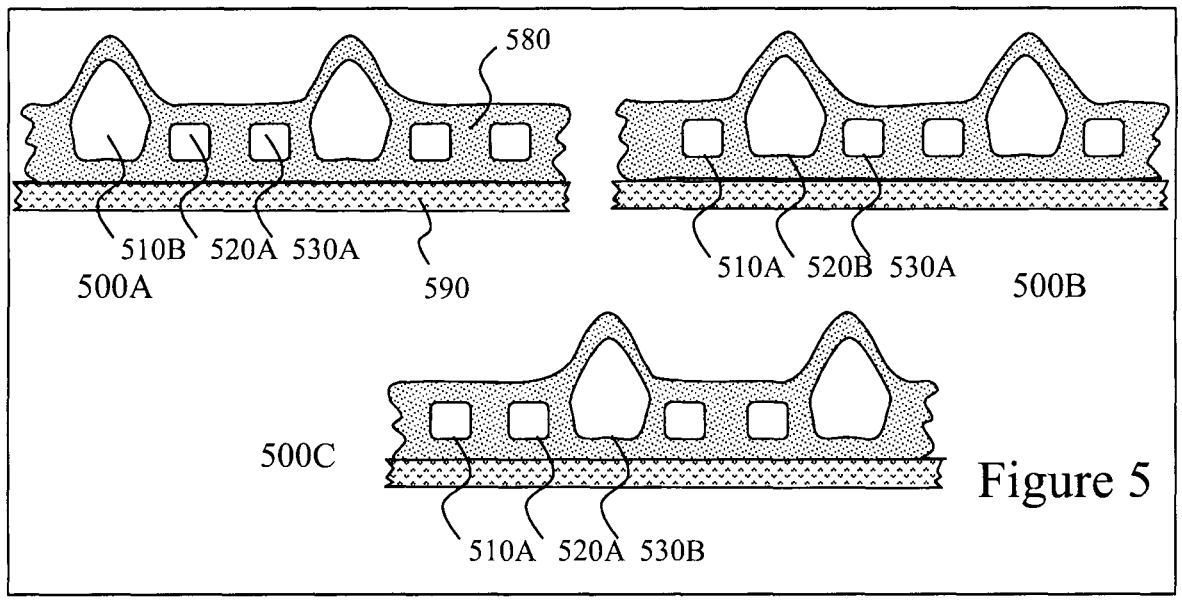
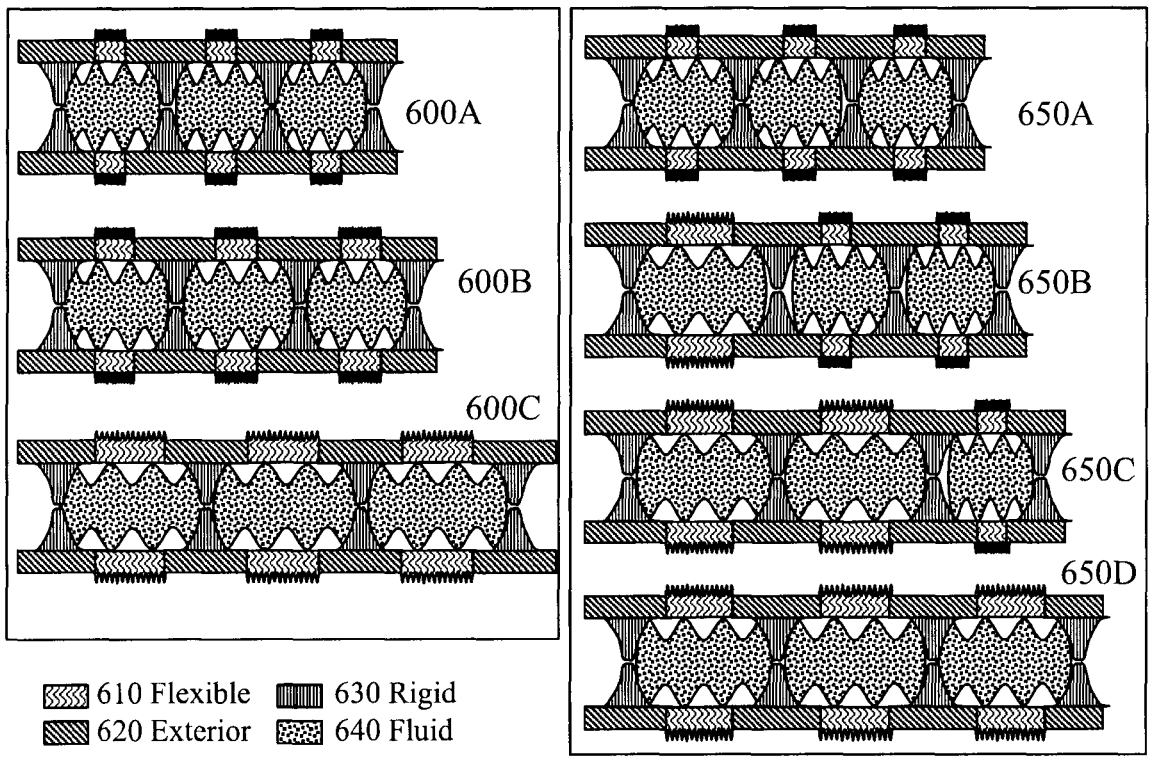
Figure 5
Figure 6

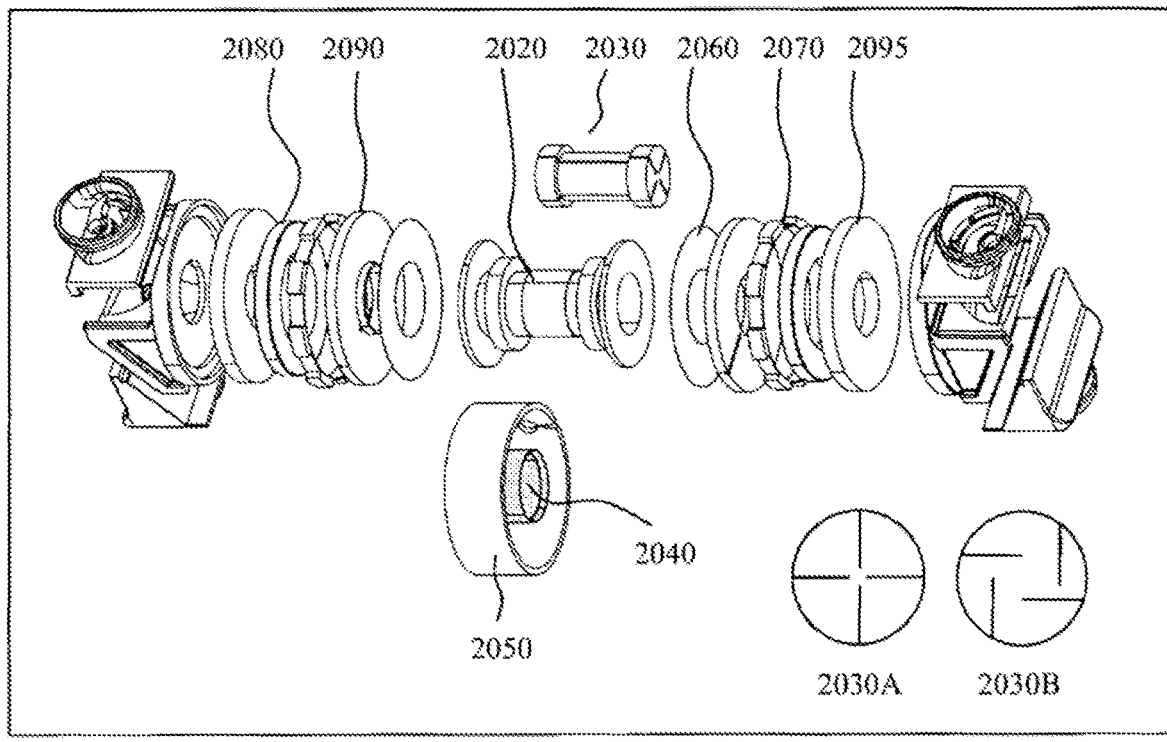
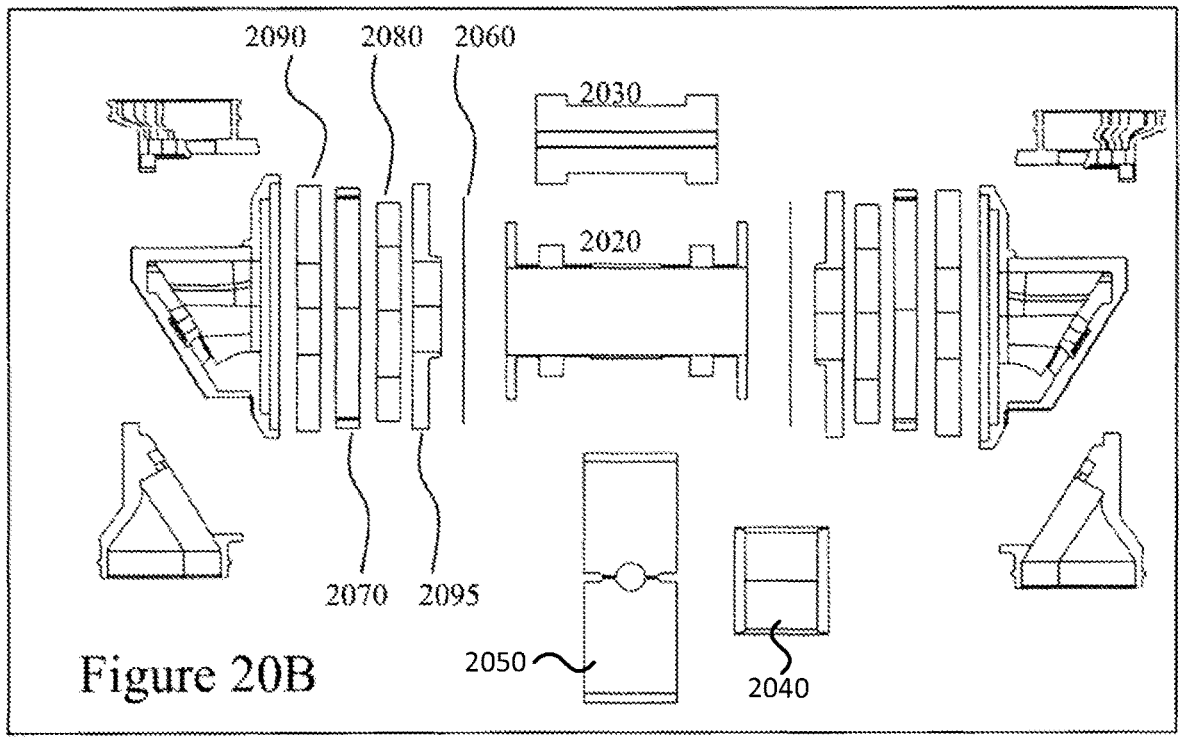
Figure 20B

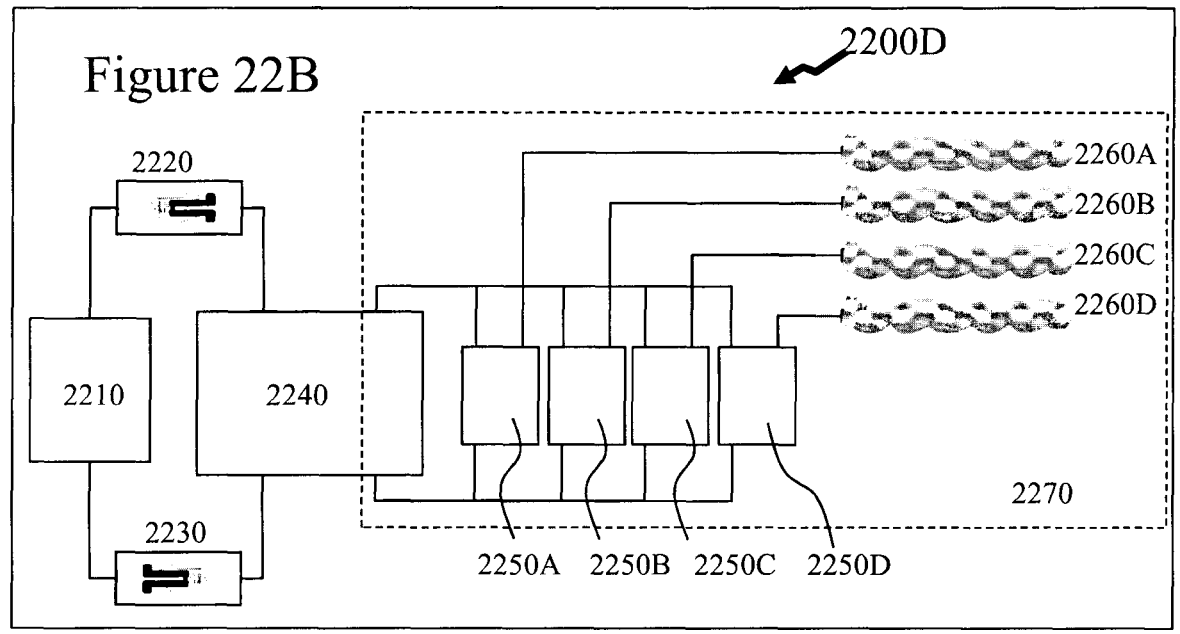
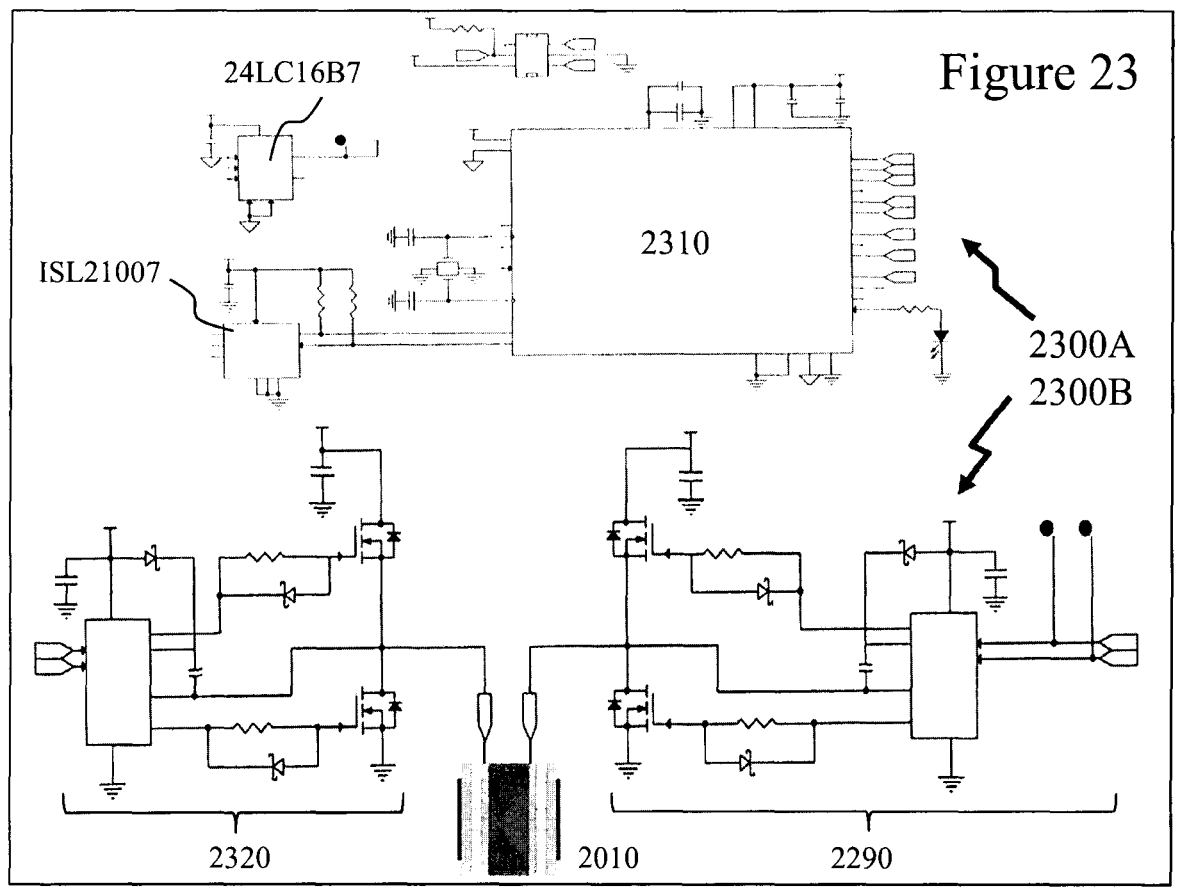

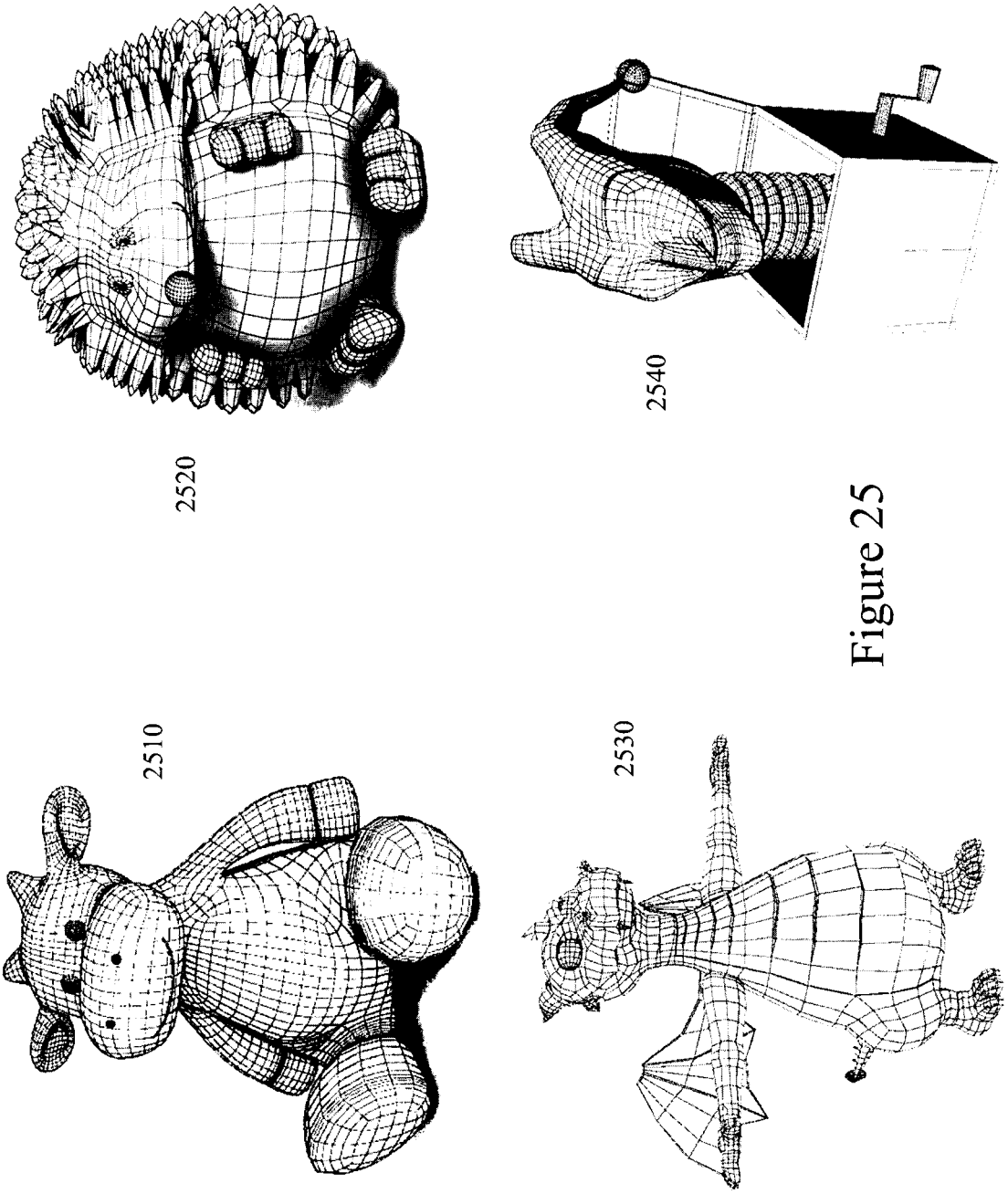

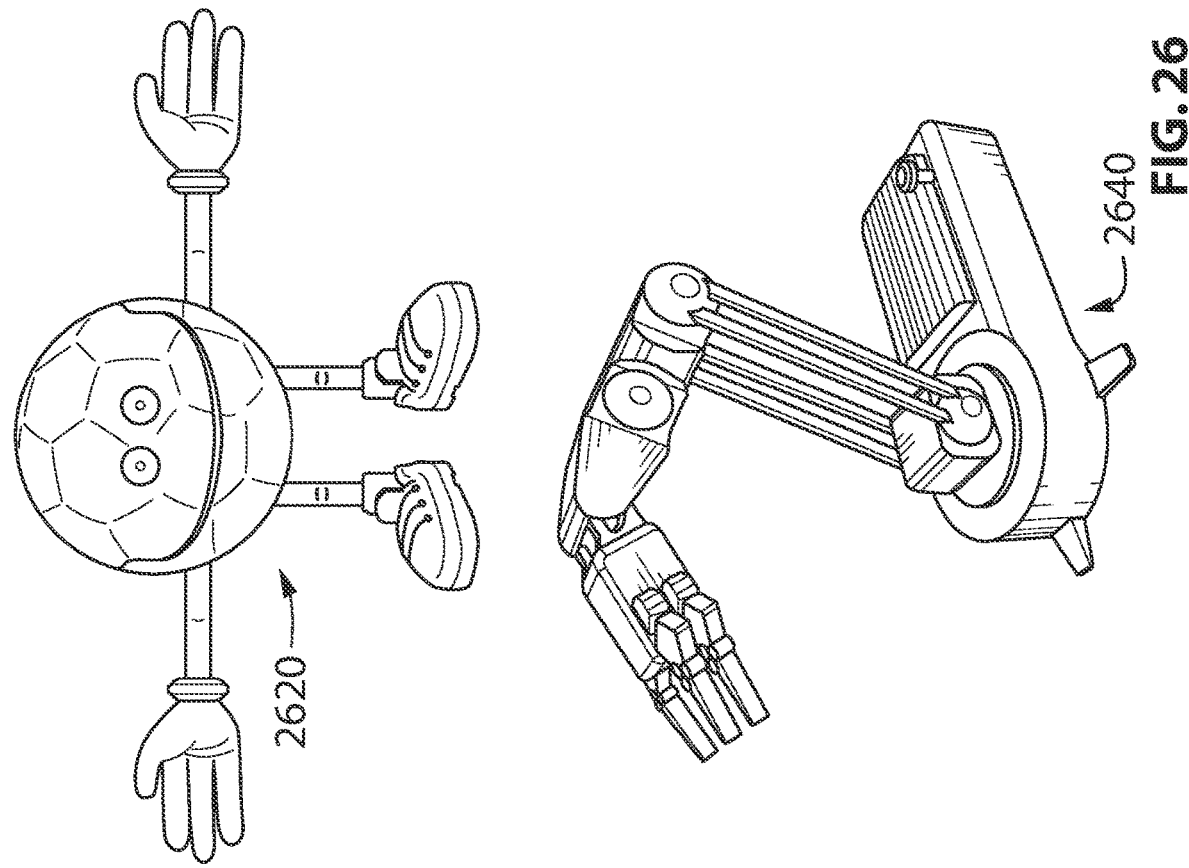
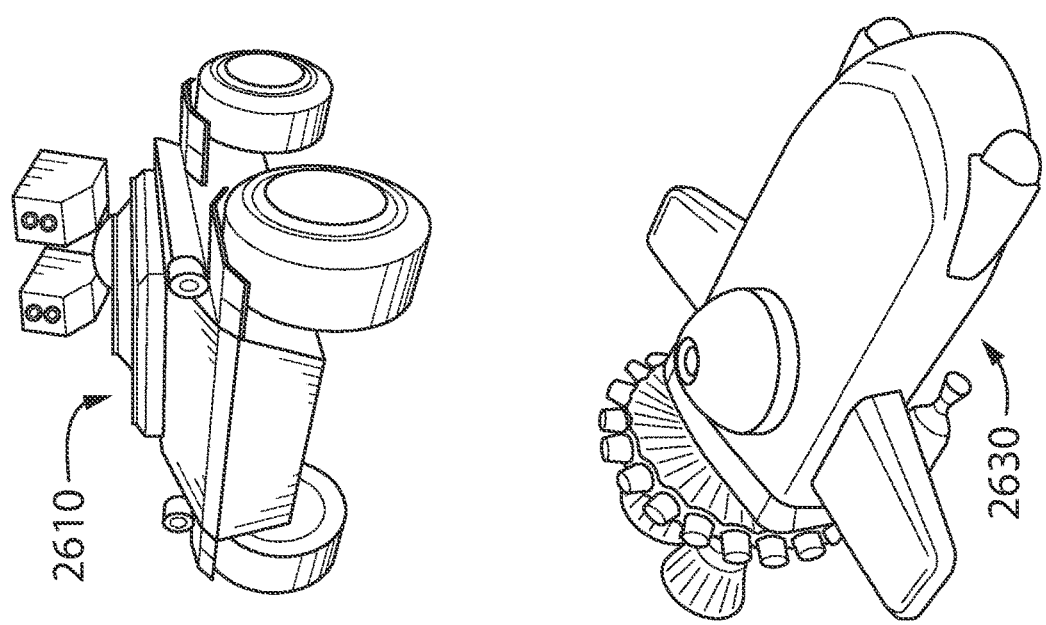

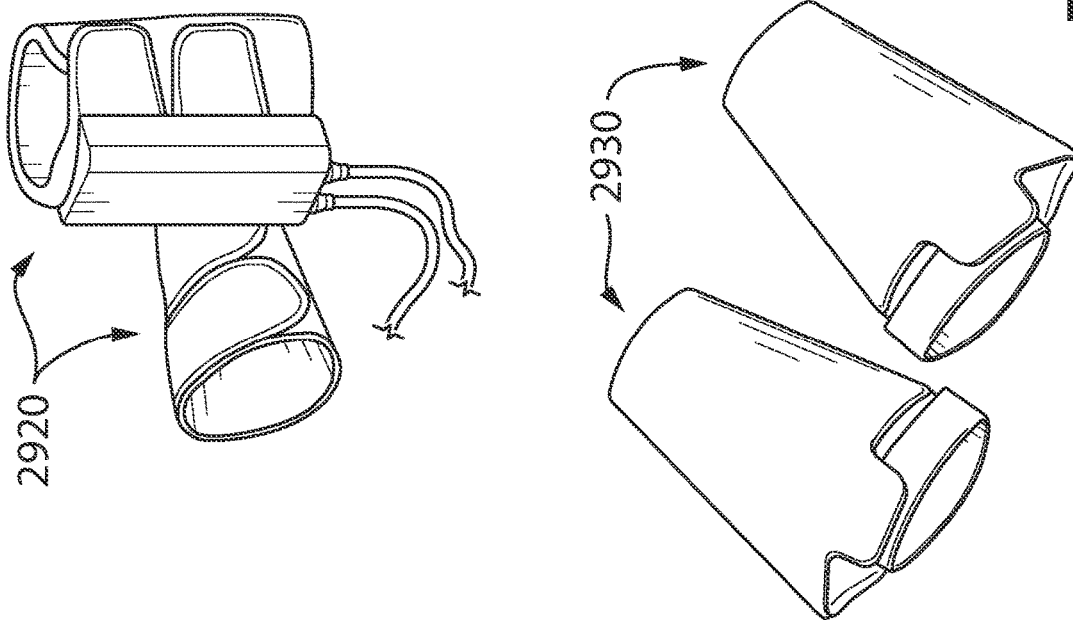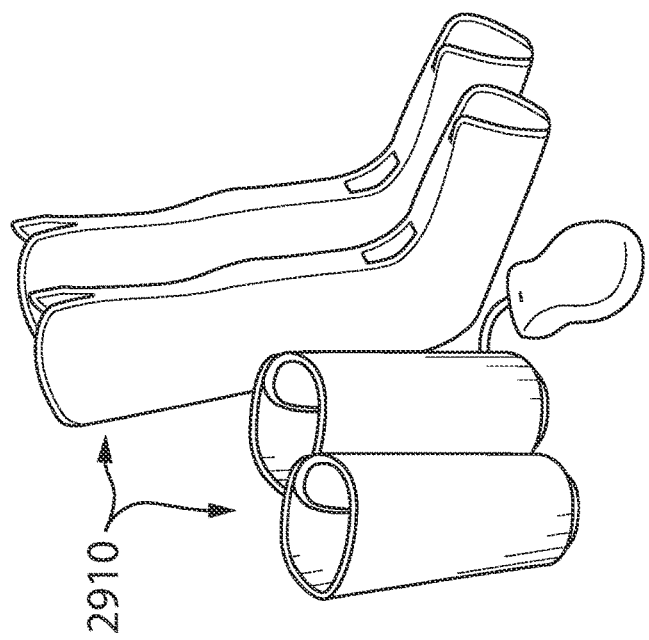
FIG. 29

METHODS AND DEVICES TO HYDRAULIC CONSUMER DEVICES

FIELD OF THE INVENTION

The present invention relates to devices for consumers and more particularly to devices for consumers exploiting fluidic control and activation.

BACKGROUND OF THE INVENTION

Fluidic devices within the prior art that consumers employ are generally limited to a number of air based massagers such as leg massagers that provide a simple cyclic application of pressure to the upper thigh and lower legs and its subsequent removal. However, these represent a very small fraction of the overall number and variety of other manual and electric massagers offered to consumers. These electric massagers are primarily vibration based and offer the user a limited number of settings and hence are generally dependent upon the user applying pressure and essentially work over a small area at any instant in time whilst the air based leg massagers apply over a wider area but are essentially steady state rising slowly to apply pressure and slowly removing the pressure.

Similarly, motorized toys for use as educational or recreational devices by infants, children, and/or adults are typically limited to wheeled toys using a single motor or larger robot toys using multiple motors. In both instances their applications are limited by the availability of compact, low cost motors to provide distributed power for motion generation or pressure generation. In comparison to other techniques fluidics offers an efficient means of distributing power to activate elements remote from the power source as the pressure/fluid flow may be used directly to generate pressure and/or motion without requiring an additional transducer, e.g. a motor to convert electric power to mechanical power. Accordingly, fluidics may allow either air and/or liquid based fluidic massagers to be provided which are suitable for other regions of the user's body with varying dimensions, design, and performance compared to vibratory massagers or that allow multiple motors (actuators) to be employed within a small region, e.g. a small toy.

Considering fluidic pumps that may be employed as part of hydraulic devices then within the prior art there are naturally several designs of pumps. However, to date as compact hydraulic devices have not been developed or commercially deployed despite the prior art fluidic concepts identified above in respect of fluidic devices and these prior art pumps. This is likely due to the fact that fluidic pumps are bulky, have low efficiency, and do not operate in the modes required for such devices, such as, for example, low frequency, variable duration, and pulsed for those providing primary pumps for dimensional adjustments or for example high frequency operation for those providing secondary pumps for vibration and other types of motion/excitation. For example, a conventional rotary pump offers poor pressure at low revolutions per minute (rpm), has a complicated motor and separate pump, multiple moving parts, relatively large and expensive even with small impeller, and low effective flow rate from a small impeller.

Accordingly, it would be desirable to provide pumps, valves, and actuators that allow for multiple ranges of motion of the device both in terms of overall configuration and dimensions as well as localized variations and multiple moving elements may be implemented using fluidics wherein a fluid is employed such that controlling the pressure and/or flow of the fluid results in the movement of an element(s) within the device or the expansion/contraction of an element(s) within the device. As noted, the commercial deployment of devices exploiting fluidics has been limited. Accordingly, there remains a need for methods and devices that provide these desirable and beneficial features. It would be particularly beneficial to provide fluidic devices having all of the functions described supra in respect of prior art devices but also have the ability to provide these within a deformable device and/or a device having deformable element(s). Further, it would be beneficial to provide devices that employ fluidic actuators, which are essentially non-mechanical and, consequently, are not susceptible to wear-out such as, by stripping drive gears, etc., thereby increasing their reliability and reducing noise. Fluidic devices allow for high efficiency, high power to size ratio, low cost, limited or single moving part(s) and allow for mechanical springless designs as well as functional reduction by providing a piston which is both pump and vibrator.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to devices for consumers and more particularly to devices for consumers exploiting fluidic control and activation.

In accordance with an embodiment of the invention there is provided a device comprising a plurality of fluidic actuators coupled to a fluidic pump and control system wherein each fluidic actuator of the plurality of fluidic actuators provides for a motion within a predetermined region of the device through a joint.

In accordance with an embodiment of the invention there is provided a device comprising a plurality of fluidic actuators coupled to a fluidic pump and control system wherein each fluidic actuator of the plurality of fluidic actuators provides for a dimensional adjustment within a predetermined region of the device whilst allowing deformation of the predetermined region of the device through an action of a user of the device.

In accordance with an embodiment of the invention there is provided a device comprising a plurality of fluidic actuators coupled to a fluidic pump and control system wherein each fluidic actuator of the plurality of fluidic actuators provides for physical engagement to a predetermined region of a user's body and the plurality of fluidic actuators can be actuated under the action of the fluidic pump and control system to generate simulated motion of an object across the predetermined region of the user's body.

In accordance with an embodiment of the invention there is provided a device for providing a massaging function to a user comprising at least an electronically controlled linear pump and a fluidic actuator coupled to the linear pump.

In accordance with an embodiment of the invention there is provided a toy for use by an individual comprising at least an electronically controlled linear pump and a fluidic actuator coupled to the linear pump.

In accordance with an embodiment of the invention there is provided an educational device to simulate an action of a biological system comprising at least an electronically controlled linear pump and a fluidic actuator coupled to the linear pump.

In accordance with an embodiment of the invention there is provided a pump comprising:

a piston having first and second ends;
a first cylinder head disposed to one end of a chamber containing the piston comprising an inlet port and an outlet port;
a second cylinder head disposed to a second distal end of the chamber containing the piston and also comprising an inlet port and an outlet port;
a first vane array at one end of the piston having a plurality of vanes angled in a first direction;
a second vane array at a second distal end of the piston having a plurality of vanes angled in a second direction;
a first swirl jet disposed within one of the inlet port and the outlet port of the first cylinder head; and
a second swirl jet disposed within the respective one of the inlet port and the outlet port of the second cylinder head.

In accordance with an embodiment of the invention there is provided a linear motor comprising a casing for a coil having at least first and second end walls, an outer wall, and a predetermined portion of an inner wall, and first and second magnets disposed adjacent to the first and second sidewall.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 depicts a fluidic actuator based deformable element according to an embodiment of the invention;

FIG. 2A depicts a fluidic actuator based pressure element according to an embodiment of the invention;

FIG. 2B depicts a fluidic actuator based surface friction element according to an embodiment of the invention;

FIG. 5 depicts a fluidic actuator based evolving location pressure elements according to an embodiment of the invention;

FIG. 6 depicts linear expansion fluidic actuator based elements according to embodiments of the invention;

FIGS. 20A and 20B depict a compact ECPUMP according to an embodiment of the invention;

FIG. 22B depicts use of latching check fluidic valves within a fluidic system according to an embodiment of the invention within a device;

FIG. 23 depicts an exemplary electrical drive circuit for an ECPUMP based toy according to an embodiment of the invention;

FIG. 25 depicts exemplary toys exploiting fluidic actuators and an ECPUMP according to an embodiment of the invention;

FIG. 26 depicts exemplary toys exploiting fluidic actuators and an ECPUMP according to an embodiment of the invention;

FIG. 29 depicts exemplary massage devices exploiting fluidic actuators and an ECPUMP according to an embodiment of the invention;

DETAILED DESCRIPTION

Figure 3:
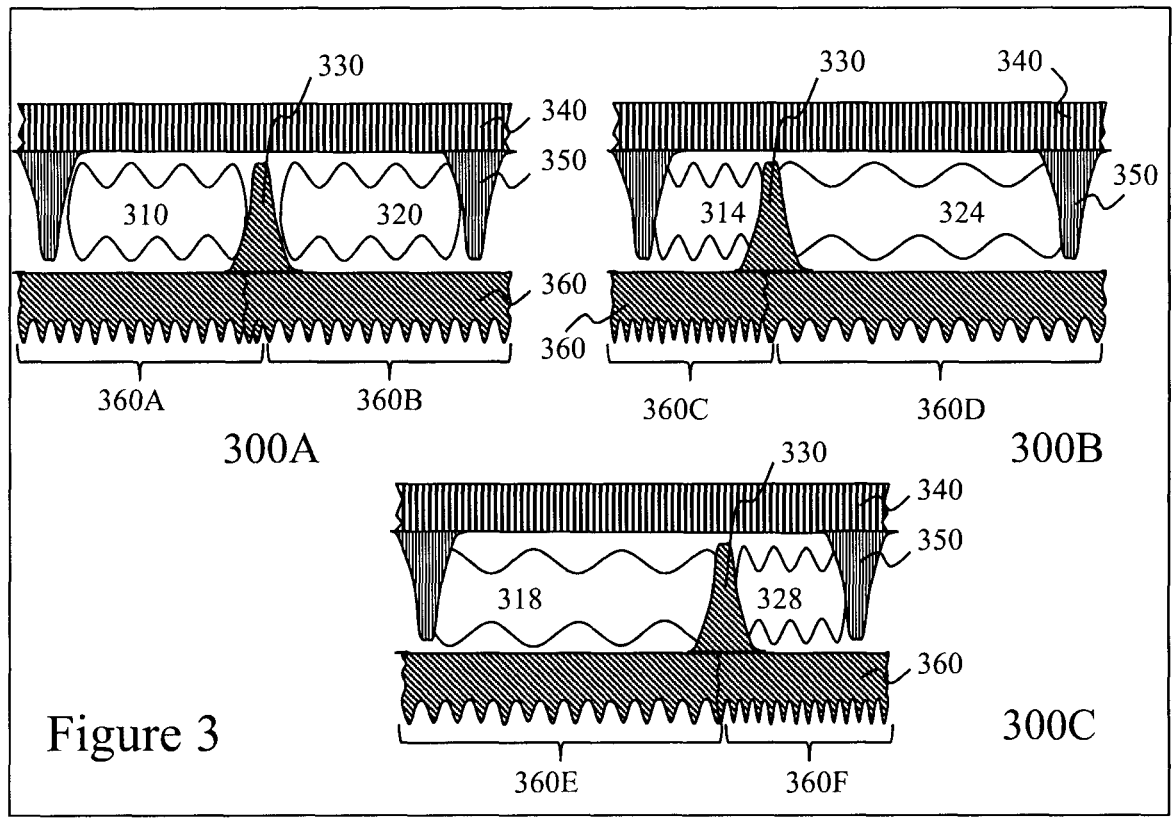
FIG. 3 depicts a fluidic actuator based surface friction element according to an embodiment of the invention.

The present invention is directed to devices for consumers and more particularly to devices for consumers exploiting fluidic control and activation.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "personal electronic device" (PED) as used herein and throughout this disclosure, refers to a wireless device used for communications and/or information transfer that requires a battery or other independent form of energy for power. This includes devices such as, but not limited to, a cellular telephone, smartphone, personal digital assistant (PDA), portable computer, pager, portable multimedia player, remote control, portable gaming console, laptop computer, tablet computer, and an electronic reader.

A "fixed electronic device" (FED) as used herein and throughout this disclosure, refers to a device that requires interfacing to a wired form of energy for power. However, the device can access one or more networks using wired and/or wireless interfaces. This includes, but is not limited to, a television, computer, laptop computer, gaming console, kiosk, terminal, and interactive display.

A "server" as used herein, and throughout this disclosure, refers to a physical computer running one or more services as a host to users of other computers, PEDs, FEDs, etc. to serve the client needs of these other users. This includes, but is not limited to, a database server, file server, mail server, print server, web server, gaming server, or virtual environment server.

A "user" as used herein, and throughout this disclosure, refers to an individual engaging a device according to embodiments of the invention wherein the engagement is a result of their personal use of the device or having another individual using the device upon them.

An "ECPUMP" as used herein, and throughout this disclosure, refers to an electrically controlled pump.

A "profile" as used herein, and throughout this disclosure, refers to a computer and/or microprocessor readable data file comprising data relating to settings and/or limits of a device. Such profiles may be established by a manufacturer of the device or established by an individual through a user interface to the device or a PED/FED in communication with the device.

A "nubby" or "nubbies" as used herein, and throughout this disclosure, refers to a projection or projections upon the surface of a device intended to provide additional physical interaction. A nubby can be permanently part of the device or it can be replaceable or interchangeable to provide additional variation to the device.

A "balloon" as used herein, and throughout this disclosure, refers to an element intended to adjust its physical geometry upon the injection of a fluid within it. Such balloons can be formed from a variety of elastic and non-elastic materials and be of varying non-inflated and inflated profiles, including for example spherical, elongated, wide, thin, etc. A balloon may also be used to transmit pressure or pressure fluctuations to the device surface and user where there is an inappreciable, or very low, change in the volume of the balloon.

A "toy" as used herein, and throughout this disclosure, refers to any item that can be used for play adults, children and pets. These include, but are not limited to, toys that are used to discover identity, help bodies grow strong, learn cause and effect, explore relationships, and practice skills they will need as adults. Adults toys include, but are not limited to, those relating to playing to form and strengthen social bonds, teach, remember and reinforce lessons from youth, discover identity, exercise minds and bodies, explore relationships, practice skills, and decorate living spaces. Pet's toys include, but are not limited to, those relating to exercising minds and bodies.

A "massager" as used herein, and throughout this disclosure, refers to any item that can be used for the manipulation of superficial and deeper layers of muscle and connective tissue using various techniques, to enhance function, aid in the healing process, decrease muscle reflex activity, inhibit motor-neuron excitability, promote relaxation and well-being, and as a recreational activity. Accordingly, such massagers may be used upon tissues including, but not limited to, muscles, tendons, ligaments, fascia, skin, joints, or other connective tissue, lymphatic vessels, organs of the gastrointestinal system, hands, fingers, elbows, knees, legs, arms, and feet.

Within the following description descriptions for the sake of providing references associated with embodiments of the invention references are made to a particular product category or product, e.g. massagers or toys, however such associations are purely for sake of improving the reader's understanding of the embodiments of the invention and are not intended to limit or define the applications of the different aspects of the invention and embodiments of the invention.

When considering users of the prior art devices described above these present several limitations and drawbacks in terms of providing enhanced functionality, dynamic device adaptability during use, and user specific configuration for example. For example, it would be desirable for a single device to support variations in size during use both in length and radial diameter to even with the device held static by the user as well as adapting to the user of the device or the individual playing with a toy. It would be further beneficial for devices to vary in form, i.e. shape, during use in manners not present within the prior art and yet it would be yet further desirable for these variation to be integral and/or additional to the traditional operation of the device in many instance. It would be yet further desirable to provide variable sized and shaped features in an asymmetric fashion on the device so that the device provides a further level of sensation control. Such variable sized and shaped features, such as bumps, undulations, knobs, and ridges, may beneficially appear and disappear during use discretely or in conjunction with one or more other motions. In some instances, it may be desirable to provide a radial/length increases along selected portions of the device to accommodate specific physical aspects of human physiology or user preferences. In some device embodiments it would be desirable for the outer surface or "skin" of the device to move within the plane of the skin so that one or more areas of the skin relative to the majority of the outer skin of the device to provide a capability of friction to the user. Optionally, these regions may also move perpendicular to the plane of the skin surface at the same time. In addition to these various effects it would also be beneficial to separately vary characteristics such as frequency and amplitude over wide ranges as well as being able to control the pulse shape for variable acceleration of initial contact and subsequent physical action as well as being able to simulate/provide more natural physical sensations. For example, a predefined "impact" motion at low frequency may be modified for vibration at the end of the cycle.

It would be desirable for these dynamic variations to be controllable simultaneously and interchangeably while being transparent to the normal use of the device, including the ability to insert, withdraw, rotate, and actuate the variable features either with one hand, without readjusting or re-orienting the hand, with two hands, or hands free. In some embodiments of the device it would be desirable to provide two, perhaps more, independently controllable ranges of shape changes within the same device, so that in one configuration a first range of overall shapes, vibrations, undulations, motions etc. is available and a second range is available in a second configuration. These configurations may be provided sequentially or in different sessions. Within another embodiment of the invention these configurations may be stored remotely and recalled either by an individual to an existing device, a new device, or another device as part of an encounter with another individual who possesses another device. Optionally, such profile storage and transfer may also provide for a remote user to control a device of an individual.

Accordingly, the desirable multiple ranges of motion of the device both in terms of overall configuration and dimensions as well as localized variations and movement may be implemented using fluidics wherein a fluid is employed such that controlling the pressure of the fluid results in the movement of an element within the device or the expansion/contraction of an element within the device. Embodiments of the invention allow for large amplitude variations of the device as well as providing operation over ranges of frequencies from near-DC to frequencies of hundreds of Hertz. Further embodiments of the invention provide for efficient continuous flow/pressure as well as more power hungry pulsed actuations. Further embodiments of the invention provide for designs exploiting compact ECPUMPS with no seals or sealing rings on the piston.

Fluidic Actuator Systems

Fluidic Actuator Based Suction:

Referring to FIG. 1 there is depicted a fluidic actuator based deformable/suction element in first and second states 100A and 100B respectively according to an embodiment of the invention. As depicted within first state 100A the fluidic actuator based deformable/suction element comprises a shaped resilient frame 110 and an elastic body 130 within which are disposed a plurality of expanded fluidic chambers 120 controlled dependently or independently. The side of the elastic body 130 opposite the shaped resilient frame 110 defining a first contour 140 in the first state 100A. In second state 100B the expanded chambers 120 have been collapsed to form reduced fluidic chamber(s) 125 wherein the elastic body 130 has now relaxed back towards the shaped resilient frame 110 such that the side of the elastic body 130, opposite the shaped resilient frame 110, defines a second contour 145 in the second state 100B. Accordingly, the fluidic actuator deformable/suction element can be transitioned from first state 100A to second state 100B by the removal of fluid from the expanded chambers 135 to compress them or conversely the fluidic actuator deformable/suction element can be transitioned from second state 100B to first state 100A by the injection of fluid into the compressed chambers 135. Optionally the chambers can be expanded/reduced in various configurations together or separately to apply varying sensations to the user. For example, if attached to the areola and nipple of the user these can be stimulated simultaneously, discretely, sequentially, or in any order by adjustment in the electronic controller program controlling the fluidic system to which the fluidic actuator is connected.

Depending on the overall design of the fluidic actuation system coupled to the fluidic chambers within the fluidic actuator based deformable/suction element, the power off state can be either first state 100A, second state 100B, or an intermediate state between first state 100A and second state 100B. In operation, therefore, the fluidic actuator based deformable/suction element when placed against a region of a user provides a deformable/suction effect as it transitions from the first state 100A to second state 100B and a pressure effect as it transitions from second state 100B to first state 100A. Accordingly, as the pressure within the chambers within the elastic body 130 is varied the user experiences varying suction/pressure. The size and shape of the shaped resilient frame 110 can be adjusted within different devices according to the intended functionality, product type, and user preference. Optionally, multiple fluidic actuators can be disposed on the same resilient frame.

Fluidic Actuator Based Pressure:

Now referring to FIG. 2A there is depicted a fluidic actuator based pressure element according to an embodiment of the invention depicted between a first withdrawn state 200A and second extended state 200B. As depicted in first withdrawn state 200A a resilient base element 210 and first shell layer 240 encase a filler 230 wherein a gap within the filler 230 has disposed within it reduced fluidic chamber 220 and pressure element 260. Disposed atop the first shell layer 240 is elastic layer 250. Accordingly, as depicted in first withdrawn state 200A the dimensions of the fluidic chamber 220 are such that the top of the pressure element 260 is flush or below that of the top of the first shell layer 240. In second extended state 200B the fluidic chamber is expanded fluidic chamber 225 such that the top of the pressure element 260 is above the top of the first shell layer 240 distorting the elastic layer 250 to deformed form 255.

Depending upon the overall design of the fluidic actuation system coupled to the chambers within the fluidic actuator based pressure element the power off state can be either first withdrawn state 200A, second extended state 200B, or an intermediate state between first withdrawn state 200A and second extended state 200B. In operation, therefore the fluidic actuator based pressure element when placed against a region of a user provides a pressure against the user as it transitions from the first withdrawn state 200A to second extended state 200B. Accordingly, as the pressure within the fluidic chamber varies the pressure element 260 provides a varying pressure and/or tissue displacement on the user. It would be evident that the size and shape of the pressure element 260 as well as the travel range determined by the fluidic chamber can be adjusted in different devices according to the intended functionality, product type, and user preference. It would be evident to one skilled in the art that the area of extension of the fluidic actuator relative to the surface area of the fluidic actuator can provide some effective amplification of the force applied to the user's body relative to the pressure of the fluid within the fluidic actuator. Additionally, it would be evident that multiple pressure elements as well as pressure elements on opposite sides of a device can be controlled via a single fluidic chamber. Optionally, first and second shell layers 240 and 250 as depicted within first withdrawn state 200A are single piece-part where the region associated with the pressure element 260 is thinned relative to the remainder of the layers. Likewise resilient base element 210 and filler 230 can be formed from the same single piece-part wherein a recess is formed within to accept the fluidic chamber and pressure element 260. Optionally, the elastic layer 250 may engage directly a balloon style fluidic actuator without the additional elements 250 or alternatively the elastic layer 250 may be a thinned region of an outer body of the device which is otherwise presenting a "hard" surface to the user but these thinned regions provide for the stimulation through pressure.

Fluidic Actuator Based Friction:

Referring to FIG. 2B there is depicted a fluidic actuator based friction element according to an embodiment of the invention depicted between a first withdrawn state 200C and second extended state 200D. As depicted in first withdrawn state 200C a resilient base element 2010 and first shell layer 2060 encase a filler 2020 wherein a gap within the filler 2020 has disposed within it reduced fluidic chamber 2030 and first pressure element 2040A. Disposed atop the first shell layer 2060 is second filler 2070 and outer shell 2080 with which a gap exists that contains second pressure element 2040B which has a plurality of projections 2045. Also disposed within the outer shell 2080 is a plurality of openings 2050 mapping to the plurality of projections 2045. Accordingly, as depicted in first withdrawn state 200C the dimensions of the assembly are such that the top of the second pressure element 2040B is flush or below that of the top of the outer shell layer 2080. In second extended state 200D the fluidic chamber is expanded fluidic chamber 2035 such that the first and second pressure elements 2040A and 2040B are disposed towards the outer shell such that the plurality of projections 2045 project through the plurality of openings 2050.

Within some embodiments of the invention the plurality of projections 2045 may be formed from a hard material such that they apply pressure in multiple locations to the skin of an individual for example. Within other embodiments of the invention the plurality of projections 2045 may be formed from a soft and/or tacky material such that they apply pressure in multiple locations to a surface but may also provide friction such that the device, e.g. toy sticks in the regions where the plurality of projections 2045 touch the surface allowing for example two such regions connected by a linear expansion and/or rotational element provide for alternating friction/non-contact action at one region and the opposite sequence at the other in conjunction with the compression/expansion of a linear expansion element for example. In this manner a hydraulic equivalent of some biological systems can be achieved such that the repeating sequence results in motion of a device, e.g. toy.

Now referring to FIG. 3 there is depicted a fluidic actuator based surface friction element according to an embodiment of the invention in first to third states 300A through 300C respectively. As depicted in FIG. 3, the fluidic actuator based surface friction element comprises an upper layer 340 upon which are disposed first projections 350 defining a recess therebetween on the lower surface of the upper layer 340. Disposed below and spaced apart from upper layer 340 is flexible layer 360, which has on its upper surface a second projection 330, which extends into the recess formed between a pair of first projections 350 and is positioned between the pair of first projections 350. Disposed to the left of second projection 330 between flexible layer 360 and upper layer 340 is first fluidic chamber 310 whilst to the right of second projection 330 between the flexible layer 360 and upper layer 340 is second fluidic chamber 320. As depicted in first state 300A the first and second fluidic chambers 310 and 320, respectively, have approximately the same dimensions such that the flexible layer 360 is defined as having first left and right regions 360A and 360B respectively which are similar as evident from the lower contour profile of the textured surface of the flexible layer 360.

Now referring to second state 300B the right fluidic chamber has expanded to become expanded right fluidic chamber 324 whilst the left fluidic chamber has reduced to become reduced left fluidic chamber 314. Accordingly, the resulting motion of the second projection 330 results in the flexible layer now being defined by second left and right regions 360C and 360D respectively wherein the textured surface now differs to the left and right. Now referring to third state 300C the left fluidic chamber has expanded to become expanded left fluidic chamber 318 whilst the right fluidic chamber has reduced to become reduced right fluidic chamber 328. Accordingly, the resulting motion of the second projection 330 results in the flexible layer now being defined by third left and right regions 360E and 360F respectively wherein the textured surface now differs to the left and right. Accordingly, based upon the overall design of the fluidic actuation system coupled to the left and right fluidic chambers within the device of which the fluidic actuator based surface friction element forms part then fluid can be pumped into and out of the first and second fluidic chambers 310 and 320 in a predetermined manner such that the lower surface of the elastic layer 360 moves back and forth wherein when placed against the user's skin the motion in combination with the surface texture of the elastic layer 360 causes friction thereby imparting sensations according to the region of the user the elastic layer 360 contacts. It would be evident that first projections 350 and upper layer 340 can be formed from the same single piece-part as can second projection 330 and elastic layer 360.

In contrast to mechanical coupled systems it would be evident that fluidic systems allow for user manual manipulation of the device shape to be easily accomplished/accommodated without significant additional complexity by provisioning flexible or semi-flexible tubing in such regions rather than complex mechanical joints etc. Accordingly within massagers, for example, this allows for the surface of the massager to form to the user's body such that the motion is across a large region of the user's skin without requiring significant pressure being applied to the massager to bring a solid surface into contact with the user's skin.

Figure 4:
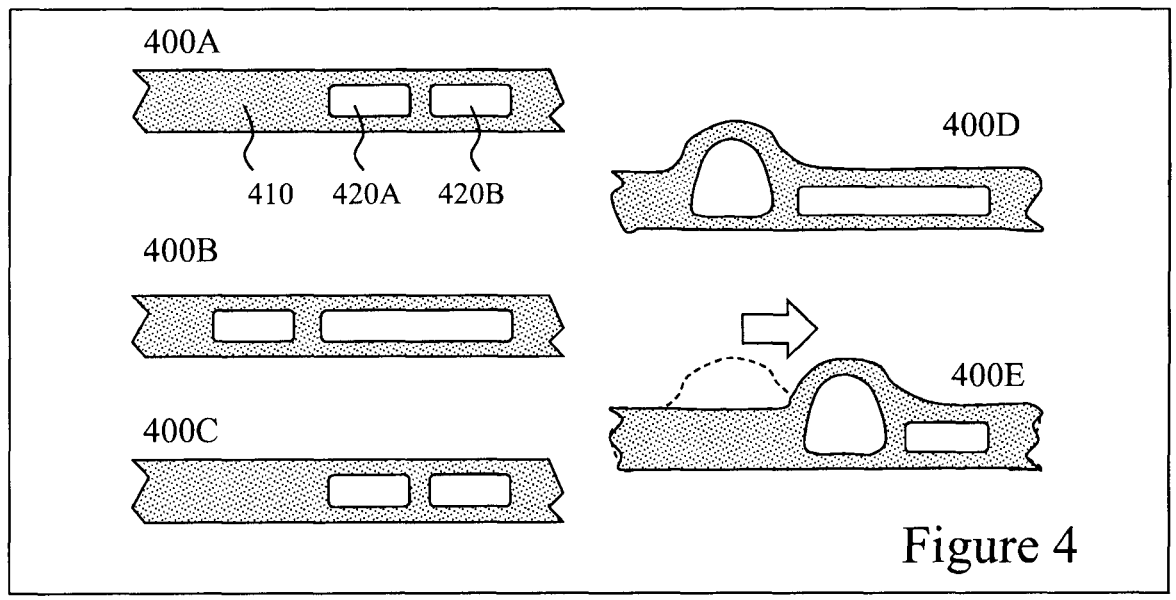
FIG. 4 depicts a fluidic actuator based translational pressure structure according to an embodiment of the invention.

Fluidic Actuator Based Translation Pressure for Male and Female Devices:

Referring to FIG. 4 there is depicted a fluidic actuator based translational pressure structure according to an embodiment of the invention exploiting fluidic actuator based translational pressure elements. In FIG. 4 a pair of fluidic actuator based pressure elements 420A and 420B are depicted adjacent to one another within a material 410. The material 410 locally to each of the pressure elements 420A and 420B are different such that upon injection of fluid into each of the pressure elements 420A and 420B their expansion behavior is different. Accordingly, as depicted in first to fifth images 400A to 400C respectively, the injection/removal of fluid into the second pressure element 420B results in lateral expansion/compression of the second pressure elements 420B. Expansion of the first pressure element 420A due to the characteristics of the material 410 locally results in the first pressure element 420A expanding away from the surface of the material 410. Hence, as depicted in fourth and fifth images 400D and 400E injection of fluid into first pressure element 420A and injection/removal of fluid from second pressure element 420B results in the lateral motion of the projected area of material created by the first pressure element 420A. Accordingly, it would be evident that disposing a pair of such fluidic actuator based translational pressure structures opposite with one allows for the massaging of a region of the user such as calf, thigh, arm, forearm, finger, and thumb. Similarly, lateral arrays of such fluidic actuator based translational pressure structures may be used to massage regions of the user's body. Within toys such fluidic actuator based translational pressure structures can provide tactile feedback and interaction/engagement with the user.

Fluidic Actuator Based Evolving Location Pressure:

Referring to FIG. 5 there is a fluidic actuator based evolving location pressure element according to an embodiment of the invention. The fluidic actuator based evolving location pressure element is depicted in its first to third states 500A through 500C, respectively, in FIG. 5. Within the fluidic actuator based evolving location pressure element a plurality of fluidic chambers are disposed within an elastic layer 580 disposed above a resilient layer 590 in a repeating pattern of 3 elements. Accordingly, inflation of the fluidic chambers results in expansion locally due to the thinning of the elastic layer 580 in conjunction with the resilient layer 590. Accordingly, as depicted in FIG. 5 with first to third states 500A through 500C the first to third fluidic chambers 510 through 530 respectively are cycled between compressed state "A" and expanded state "B" such that overall the user feels a pressure moving along the length of the device. Whilst only a single sequence of first to third fluidic chambers 510 through 530, respectively, is depicted it would be evident to one skilled in the art that one, two, three or more sets can be employed in sequence as well as in multiple positions on a device in predetermined array formations or at discrete locations on the device. Accordingly, a toy for a child may when held and active engage against their palms according to predetermined triggers such as particular vocal sounds, vocalized keywords, user actions, etc.

Fluidic Actuator Based Linear Expansion:

Now referring to FIG. 6 there are depicted first and second linear expansion fluidic actuator based elements according to embodiments of the invention in first and second state sequences 600A to 600C and 650A to 650D, respectively. In each instance a portion of the device comprises an outer body comprising exterior regions 620 with flexible sections 610 disposed between exterior regions 620. Disposed internally in association with each exterior region 620 are rigid projections 630. In between sequential rigid projections 630 there are fluidic chambers 640, which can be increased/decreased in dimension under control of an overall fluidic control system by adding/removing fluid from one or more fluidic chambers 640.

As depicted in respect of first linear expansion fluidic actuator based elements according to an embodiment of the invention in first state sequence 600A to 600C respectively all fluidic chambers 640 are expanded simultaneously. In contrast the second linear expansion fluidic actuator based element according to an embodiment of the invention in second state sequence 650A to 650D respectively is operated wherein each fluidic chamber 640 is expanded individually in sequence. It would be evident that with respect to first linear expansion fluidic actuator based element that the multiple fluidic chambers 640 can be connected in parallel to a fluid source as they operate in concert whilst in second linear expansion fluidic actuator based element the multiple fluidic chambers 640 can be connected individually to a fluid source via valves controlling the flow of fluid to each fluidic chamber 640 independently or that they can be connected in series with fluid regulators between each fluidic chamber 640 that limit flow to a subsequent fluidic chamber 640 until a predetermined pressure is reached. Where the multiple fluidic chambers 640 are connected individually to a fluid source via valves controlling the flow of fluid to each fluidic chamber 640 then it would be evident that in addition to a basic extension/retraction that more complex motions are possible whereby predetermined portions of the device expand as others contract and vice-versa.

Figure 7A:
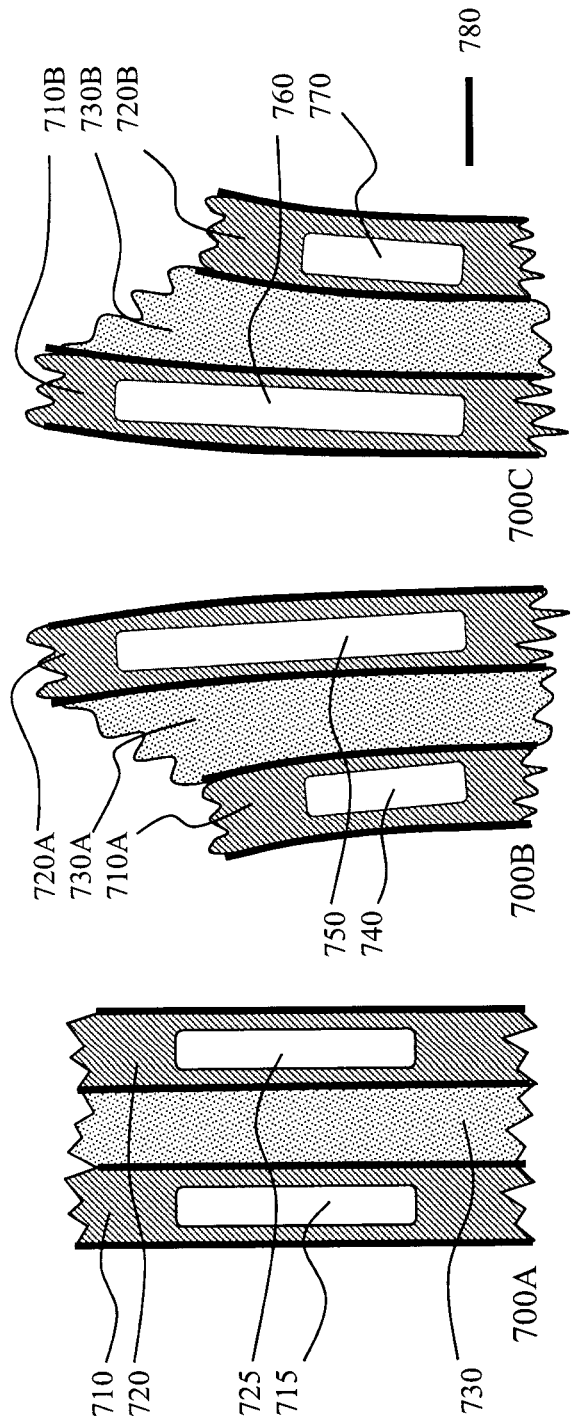
FIGS. 7A and 7B depict flexural fluidic actuator based elements according to embodiments of the invention.
Figure 7B:
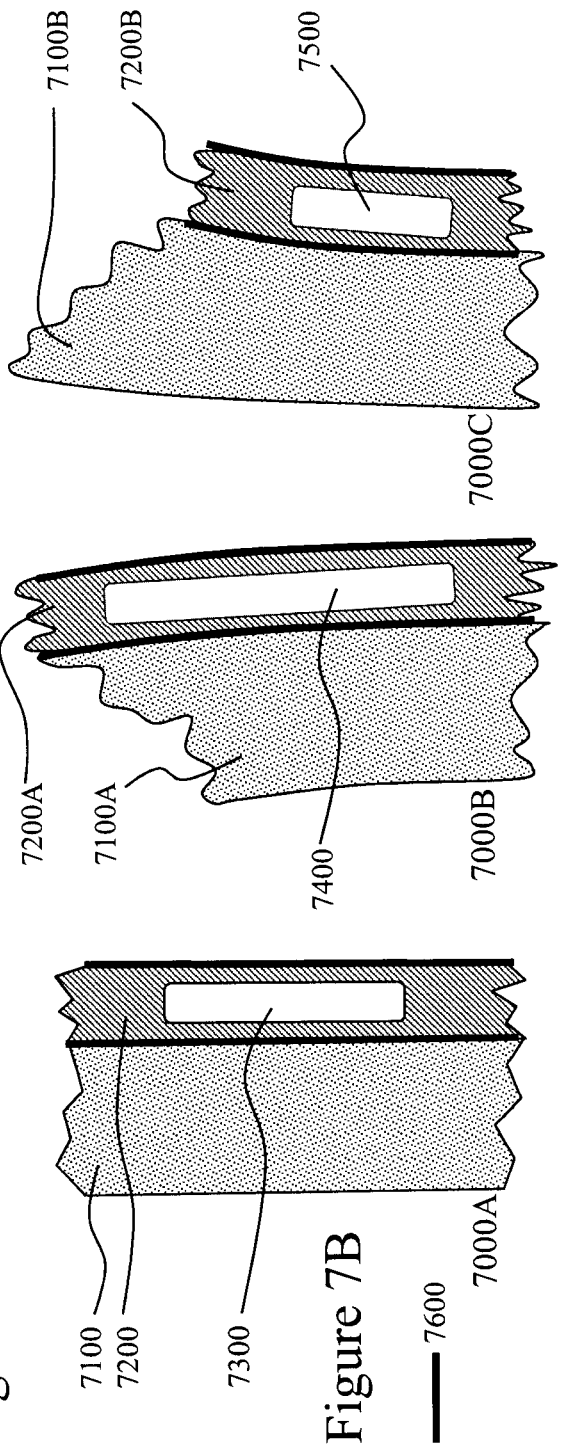

Fluidic Actuator Based Flexation:

Referring to FIGS. 7A and 7B there are depicted portions of a device comprising flexural fluidic actuator based elements according to embodiments of the invention. In FIG. 7A in first to third states 700A through 700C, respectively, a dual chamber flexural fluidic actuator is depicted. As depicted, the device in first state 700A comprises core 730, which has disposed on either side thereof first and second elastic elements 710 and 720, respectively. First and second elastic elements 710 and 720 contain first and second fluidic chambers 715 and 725, respectively. Also disposed within the device, on either side of the different elements are resilient walls or elements 780 that surround the fluidic chambers and limit lateral expansion of the fluidic chambers without limiting expansion in the plane of resilient elements 780. As a result, as a fluidic chamber expands, the respective elastic element lengthens but does not widen.

As first and second fluidic chambers 715 and 725 are comparable in size the elastic stresses are balanced and the device orientated linearly. In second state 700B the first fluidic chamber 715 has been reduced in size to third reduced fluidic chamber 740 and the second fluidic chamber 725 increased to fourth expanded fluidic chamber 750 such that the resulting action upon the device is to bend the device to the left resulting in left bent core 730A and left bent sides 710A and 720A respectively. In third state 700C the first fluidic chamber 715 has been increased in size to fifth expanded fluidic chamber 760 and the second fluidic chamber 725 reduced to sixth reduced fluidic chamber 770 such that the resulting action upon the device is to bend the device to the right resulting in right bent core 730B and right bent sides 710B and 720B respectively. Optionally, the resilient elements 780 are omitted. In particular, if core 730 is sufficiently rigid and/or if the fluid chambers are configured to only permit axial, or approximately axial, expansion/retraction, then resilient elements 780 may not be necessary.

Figure 8:
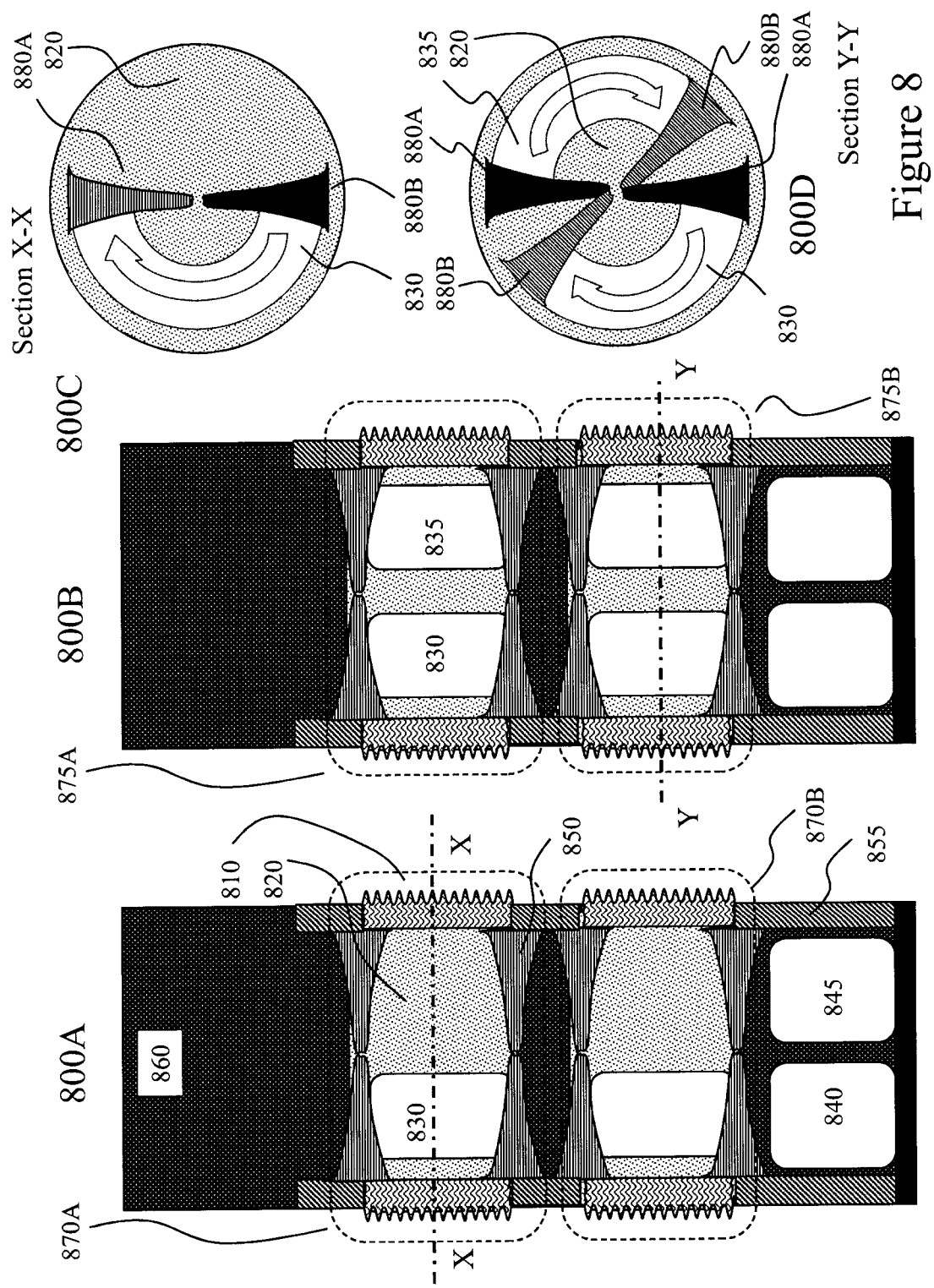
FIG. 8 depicts a device providing rotational motion using fluidic actuator based elements according to an embodiment of the invention.

Fluidic Actuator Based Rotation Motion:

Now referring to FIG. 8 there are depicted first and second devices 800A and 800B, respectively, which provide rotational motion using fluidic actuator based elements according to an embodiment of the invention. As depicted, first device 800A comprises a body 860 within which are disposed first and second fluidic rotational elements 870A and 870B, wherein each fluidic element is disposed between upper and lower end projections 850 coupled to outer body element 855. Each of the first and second fluidic rotational elements 870A and 870B comprises an outer ring 810 and inner filler 820 within which is disposed a fluidic chamber 830. Disposed at the bottom of the body 860 are first and second fluidic chambers 840 and 845, respectively, which house the fluidic control circuit. The fluidic control circuit comprises, for example, pump, valves, and reservoir, and electrical control circuit. The electrical control circuit provides, for example, on/off selector, power, power management, and processor to control the fluidic control circuit.

Second device 800B has essentially identical construction except that in addition to fluidic chamber 830 a second fluidic chamber 835 is provided. The result being third and fourth fluidic rotational elements 875A and 875B. Now referring to first and second cross-sections 800C and 800D, which represent Section X-X through first device 800A and Section Y-Y through second device 800B, respectively. As evident in first cross-section 800C the fluidic chamber 830 extends between movable projection 880A and restrained projection 880B in extended state. In reduced state fluidic chamber 830 is reduced back towards the restrained projection 880B such that movable projection 880A has rotated back due to the elasticity of the inner filler 820. Movable projection 880A is attached to outer ring 810 so that expansion/contraction of fluidic chamber 830 translates into motion of movable projection 880A and hence outer ring 810.

Second cross-section 800D depicts Section Y-Y wherein fluidic chamber 830 and second fluidic chamber 835 each engage at one end restrained projections 880A and movable projections 880B. Accordingly, expansion/contraction of fluidic chamber 830 and second fluidic chamber 835 translates into motion of movable projection 880A and hence outer ring 830. Accordingly, each of first and second devices 800A and 800B provides for rotational motion of portions of the body of a device under control of the electrical control circuit, which is executing either a predetermined program or sequence established by the user.

Figure 10:
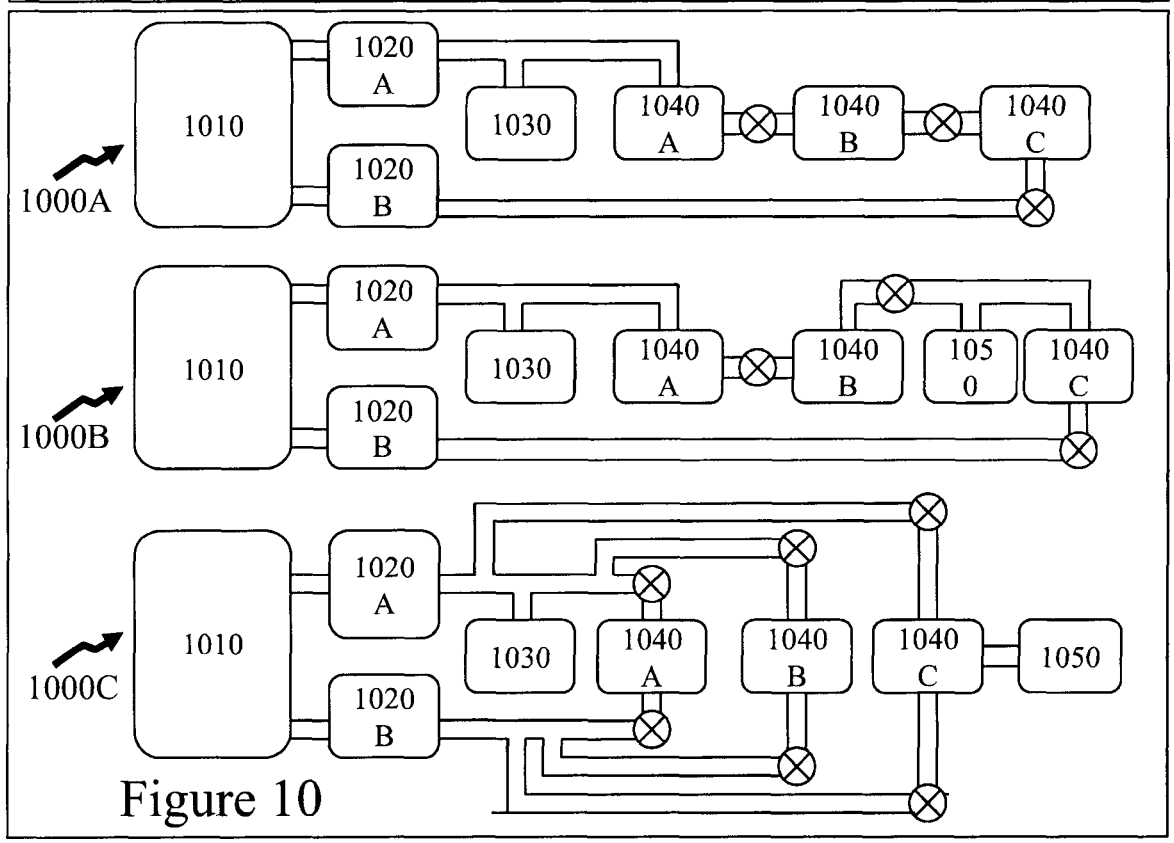
FIG. 10 depicts serial element constructions exploiting secondary fluidic pumps and fluidic elements in conjunction with primary fluidic pump, reservoir and valves according to embodiments of the invention.

Fluidic Actuator Based Twisting Motion:

The fluidic actuator concepts discussed supra in respect of FIG. 10 in respect of providing a rotary motion may through the design of the fluidic expansion elements, e.g. balloons, and the positioning of resilient restrained and moveable projections can provide for concurrent linear expansion and rotation in an element of a device. Similarly, simultaneous expansion of a pair of fluidic chambers that are coupled to one another rather than isolated, wherein each rotates by an angle of a, allows for a rotation of one end of the element of the device by an angle of 2a relative to the other end of the device when expanded and the rotating end rotating by 2a. Optionally, an electronically controlled or hydraulically activated link can be provided between vertically stacked elements such that they operate in either rotational mode, twisting mode, or multiple twisting mode according to the settings of the links. Such links can be, for example, electromagnetically activated pins engaging holes in adjacent elements or hydraulically activated protrusions engaging holes in adjacent elements.

Figure 9:
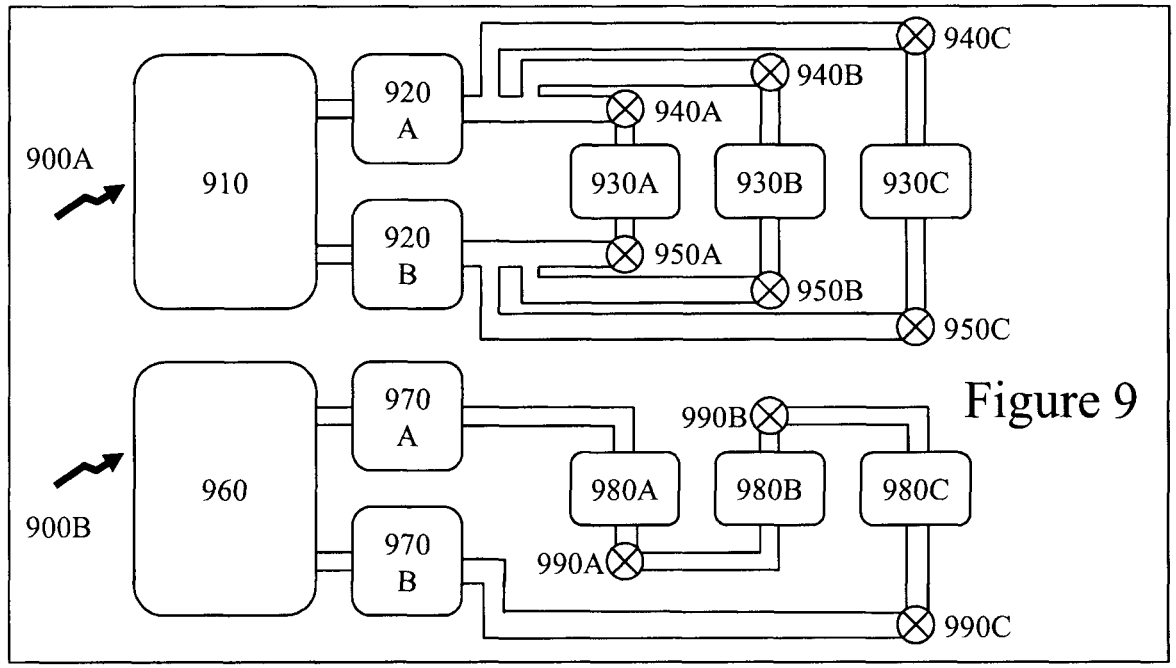
FIG. 9 depicts parallel and serial element actuation exploiting fluidic elements in conjunction with fluidic pump, reservoir and valves according to embodiments of the invention.

Fluidic Actuator Configuration:

Now referring to FIG. 9 there are depicted parallel and serial element actuation schematics 900A and 900B, respectively, exploiting fluidic elements in conjunction with fluidic pump, reservoir and valves according to embodiments of the invention. Within parallel actuation schematic 900A first to third fluidic actuators 930A through 930C are depicted coupled to first pump 920A on one side via first to third inlet valves 940A through 940C, respectively, and to second pump 920B on the other side via first to third outlet valves 950A through 950C, respectively. First and second pumps 920A and 920B being coupled on their other end to reservoir 910 such that, for example, first pump 920A pumps fluid towards first to third fluidic actuators 930A through 930C respectively and second pump 920B pumps fluid away from them to the reservoir. Accordingly, each of first to third fluidic actuators 930A through 930C, respectively, can be pumped with fluid by opening their respective inlet valve, thereby increasing internal pressure and triggering the motion according to their design such as described above in respect of FIGS. 1 through 8 or other means as FIGS. 1 to 8 are merely exemplary embodiments of the invention. Each of first to third fluidic actuators 930A through 930C, respectively, can be held at increased pressure until their respective outlet valve is opened and second pump 920B removes fluid from the actuator. Accordingly, first to third fluidic actuators 930A through 930C can be individually controlled in pressure profile through the valves and pumps.

In contrast serial actuation schematic 900B first to third fluidic actuators 980A through 980C are depicted coupled to first pump 970A on one side and to second pump 970B on the other side. First and second pumps 970A and 970B being coupled on their other end to reservoir 960 such that, for example, first pump 970A pumps fluid towards first to third fluidic actuators 980A through 980C, respectively, and second pump 970B pumps fluid away from them to the reservoir. However, in serial actuation schematic 900B first pump 970A is connected only to first reservoir 980A wherein operation of first pump 970A will increase pressure within first reservoir 980A if first valve 990A is closed, second reservoir 980B if first valve 990A is open and second valve 990B closed, or third reservoir 980C if first and second valves 990A and 990B, respectively, are open and third valve 990C closed. Accordingly, by control of first to third valves 990A through 990C, respectively, the first to third fluidic actuators 980A through 980C, respectively, can be pressurized although some sequences of actuator pressurization and intermediate pressurization available in the parallel actuation schematic 900A are not available although these limitations are counter-balanced by reduced complexity in that fewer valves are required. It would be apparent to one skilled in the art that parallel and serial element actuation schematics 900A and 900B respectively exploiting fluidic elements in conjunction with fluidic pump, reservoir and valves according to embodiments of the invention can be employed together within the same device either through the use of multiple pump or single pump configurations. In a single pump configuration an additional valve prior to first actuator 980A can be provided to isolate the actuator from the pump when the pump is driving other fluidic actuated elements.

Now referring to FIG. 10 there are depicted first and second serially activated schematics 1000A through 1000B respectively wherein secondary fluidic pumps and fluidic elements are employed in conjunction with first and second primary fluidic pumps 1020A and 1020B, reservoir 1010 and valves according to embodiments of the invention. In first serially activated schematic 1000A first to third fluidic actuators 1040A through 1040C are disposed in similar configuration as serial actuation schematic 900B in FIG. 9. However, a secondary fluidic pump 1030 is disposed between the first primary fluidic pump 1020A and first fluidic actuator 1040A. Accordingly, the secondary fluidic pump 1030 can provide additional fluidic motion above and beyond that provided through the pressurization of fluidic actuators by first primary fluidic pump 1020A. Such additional fluidic motion can be, for example, the application of a periodic pulse to a linear or sinusoidal pressurization wherein the periodic pulse can be at a higher frequency than the pressurization. For example, the first primary fluidic pump 1020A can be programmed to drive sequentially first to third fluidic actuators 1040A through 1040C to extend the device length over a period of 1 second before the second primary pump 1020B sequentially withdraws fluid over a similar period of 1 second such that the device has a linear expansion frequency of 0.5 Hz. However, the secondary fluidic pump 1030 provides a continuous 10 Hz sinusoidal pressure atop this overall ramp and reduction thereby acting as a vibration overlap to a piston motion of the device. According to embodiments of the invention the primary pump can provide operation to a few Hz or tens of Hz, whereas secondary pump can provide operation from similar ranges as primary pump to hundreds of Hz and tens of kHz.

Second serially activated schematic 1000B depicts a variant wherein first and second secondary fluidic pumps 1030 and 1050 are employed within the fluidic circuit before the first and third fluidic actuators 1040A and 1040C, respectively such that each of the first and second secondary fluidic pumps 1030 and 1050 can apply different overlay pressure signals to the overall pressurization of the device from first primary pump 1020A. Accordingly, using the example supra, first fluidic pump 1030 can apply a 10 Hz oscillatory signal to the overall 0.5 Hz expansion of the device but when third fluidic actuator 1040C is engaged with the opening of the valve between it and second fluidic actuator 1040B the second fluidic pump 1050 applies a 2 Hz spike to the third fluidic actuator 1040C wherein the user senses a "kick" or "sharp push" in addition to the linear expansion and vibration. Second fluidic pump 1050 can be activated only when the valve between the second and third fluidic actuators 1040B and 1040C is open and fluid is being pumped by the first primary pump 1020A.

Also depicted in FIG. 10 is parallel activated schematic 1000C wherein a circuit similar that of parallel actuation schematic 900A in FIG. 9 is shown. However, now a first fluidic pump 1030 is disposed prior to the fluidic flow separating to first and second fluidic actuators 1040A and 1040B respectively and a second fluidic pump 1050 is coupled to the third fluidic actuator 1040C. Accordingly, using the same example as that of second serially activated schematic 1000B supra first primary pump 1020A provides an overall 0.5 Hz pressure increase which drives first and second fluidic actuators 1040A and 1040B when their valves are opened as well as third fluidic actuator 1040C. First fluidic pump 1030 provides a 10 Hz oscillatory signal to the first and second fluidic actuators 1040A and 1040B whilst second fluidic pump 5 Hz oscillatory signal to third fluidic actuator 1040C. Optionally, first and second fluidic pumps, or one of first and second fluidic pumps, are combined serially in order to provide higher pressure within the fluidic system or they are combined serially such that they provide different fluidic pulse profiles that either can provide individually.

Figure 11:
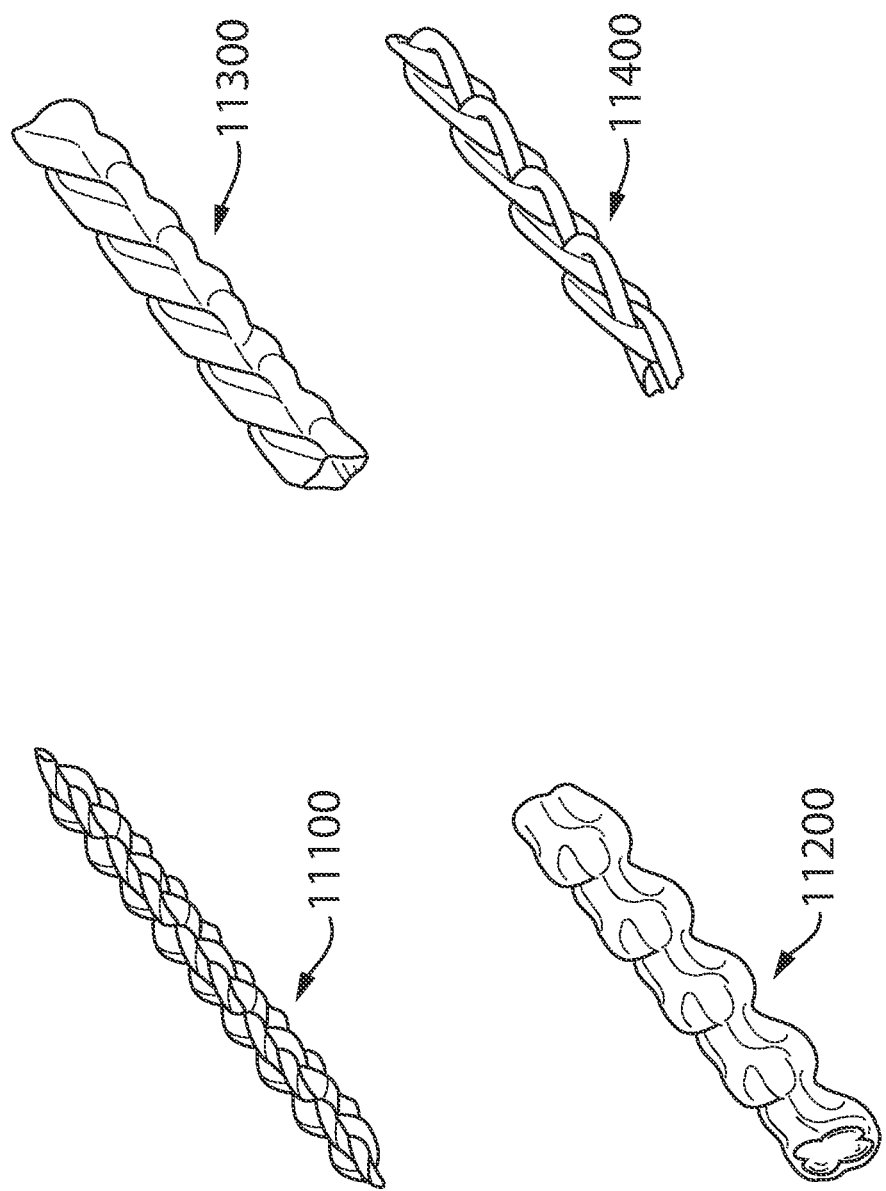
FIG. 11 depicts low resistance expansion fluidic actuators and a linear piston fluidic actuator according to embodiments of the invention.

Low Resistance Balloons:

Referring to FIG. 11 there are depicted first to fourth low resistance expansion fluidic actuators 11100 through 11400, respectively, together with a linear piston fluidic actuator 1100C according to embodiments of the invention. First to fourth low resistance expansion fluidic actuators 11100 through 11400, respectively, are formed from a resilient sheet material which may or may not have elastic characteristics. Previously employed elastic balloons require a certain pressure be exceeded to overcome the elastic force of the balloon material before it starts its inflation, which then typically begins close to the end of the balloon and progresses away from the source of the fluid applied to pressurize it. In contrast a low resistance fluidic actuator, such as first to fourth low resistance expansion fluidic actuators 11100 through 11400, respectively, begins to inflate immediately as fluid is pumped into it. Further, by virtue of the contouring the inventors have established that appropriate contouring also results in rapid fluid evolution along the length of the "balloons" of the invention which consequently expand with an increased uniformity in comparison to the prior art. Accordingly, a user of a device with such a balloon would experience a more uniform pressure as the balloon "inflates" towards its final geometry. It would be evident to one skilled in the art that such contouring can be applied to portions of the surface of a tubular material or to the entire surface of the tubular material. In the instance that it is applied partially then the regions between can form "passive" sections whilst those with contouring form "active" sections. Filling of first to fourth low resistance expansion fluidic actuators 11100 through 11400, respectively, can be thought more of flattening and filling rather than expanding thereby minimizing energy requirements for expanding and fluid volume for same physical effect.

Figure 12:
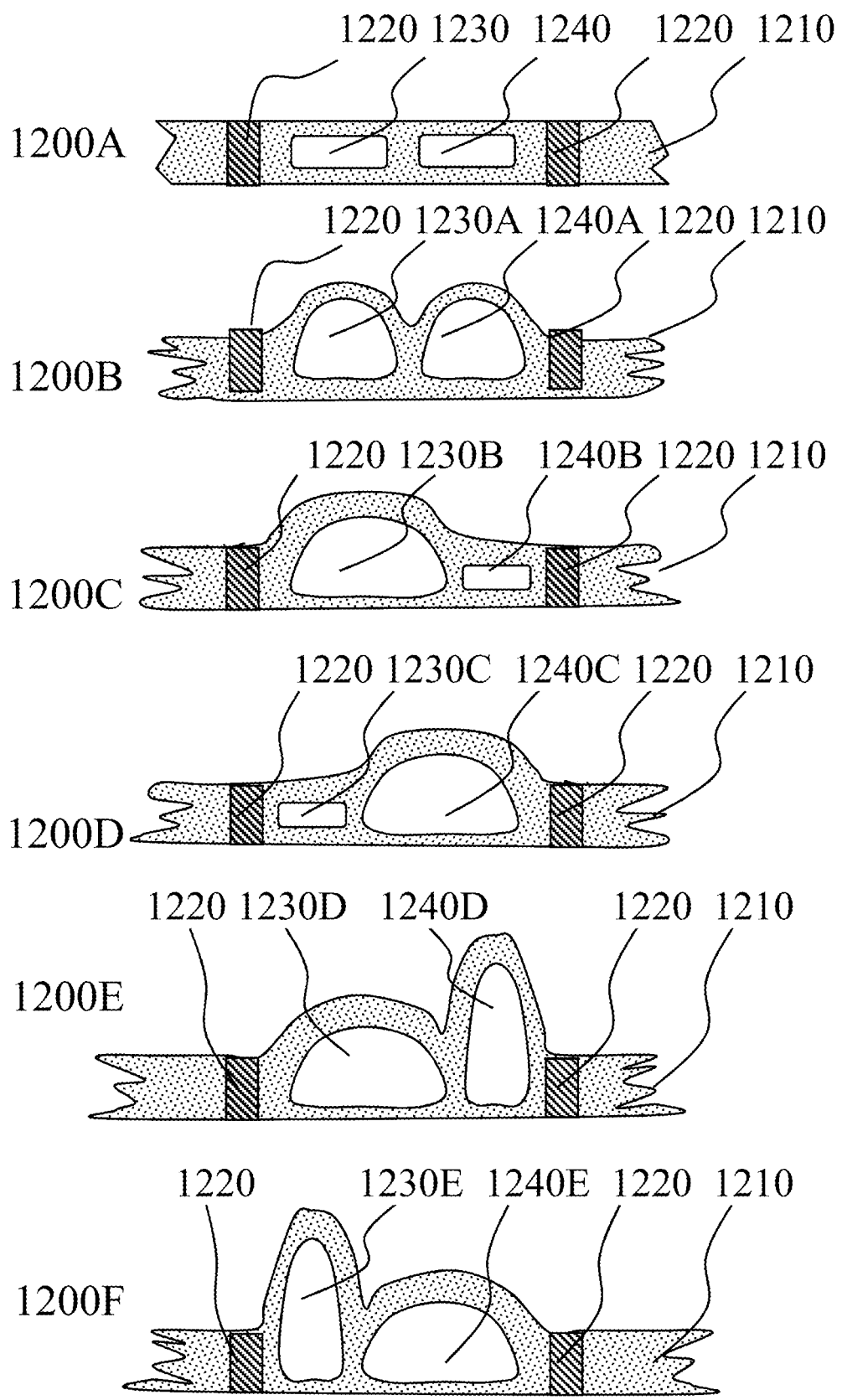
FIG. 12 depicts an embodiment of the invention wherein the action of a fluidic actuator is adjusted in dependence of the state of other fluidic actuators.

Combined Fluidic Actuator Action:

Now referring to FIG. 12 there is depicted an embodiment of the invention wherein the action of a fluidic actuator is adjusted independent of the state of other fluidic actuators as depicted in first to sixth states 1200A through 1200F respectively. As depicted in first state 1200A first and second actuators 1230 and 1240 are disposed within an elastic body 1210 which also has disposed within it resilient members 1220 either side of the first and second actuators 1230 and 1240 respectively. As depicted in second state 1200B both of the actuators have been pressurized concurrently yielding actuators in first inflated states depicted by third and fourth actuators 1230A and 1240A respectively.

Alternatively, one or other actuator is pressurized such as depicted in third and fourth states 1200C and 1200D wherein the pressurized actuator expands to compress the other actuator resulting in expanded actuators 1230B and 1240C in the third and fourth states 1200C and 1200D respectively with compressed actuators 1240B and 1230C. However, pressurization of the other actuator now results in extenuated actuators 1240D and 1230E in fifth and sixth states wherein the other pressurized actuators 1230D and 1240E, from a prior step in the device operating sequence, in conjunction with resilient member 1220 provide lateral resistance such that the extenuated actuators 1240D and 1230E distend the elastic body 1210 further than in the instance of a single actuator being pressurized.

It would be evident to one skilled in the art that the devices as described above in respect of FIGS. 1 through 12 can employ solely fluidic actuators to provide the desired characteristics for that particular device or they can employ mechanical elements including, but not limited to, such as motors with off-axis weights, drive screws, crank shafts, levers, pulleys, cables etc. as well as piezoelectric elements etc. Some can employ additional electrical elements such as to support electrostimulation. For example, a fluidic actuator can be used in conjunction with a pulley assembly to provide motion of a cable which is attached at the other end to the device such that retraction of the cable deforms the device to provide variable curvature for example or simulate a finger motion such as exciting the female "G-spot" or male prostate. Most mechanical systems must convert high-speed rotation to low-speed linear motion through eccentric gears and gearboxes whilst fluidic actuators by default provide linear motion in 1, 2, or 3-axes according to the design of the actuator.

Other embodiments of the invention may provide for user reconfiguration and/or adjustment. For example, a device may comprise a base unit comprising pump, batteries, controller etc. and an active unit containing the fluidic actuators alone or in combination with other mechanical and non-mechanical elements. Accordingly, the active unit may be designed to slide relative to the active unit and be fixed at one or more predetermined offsets from an initial reduced state such that for example a user may adjust the length of the toy over, for example, 0, 1, and 2 inches whilst fluidic length adjustments are perhaps an inch maximum so that in combination the same device provides length variations over 3 inches for example. It would also be evident that in other embodiments of the invention the core of the device, e.g. a plug, may be manually pumped or expanded mechanically to different widths with subsequent fluidic diameter adjustments. Other variations would be evident combining fluidic actuated devices with mechanical elements to provide wider variations to accommodate user physiology for example.

Figure 13B:
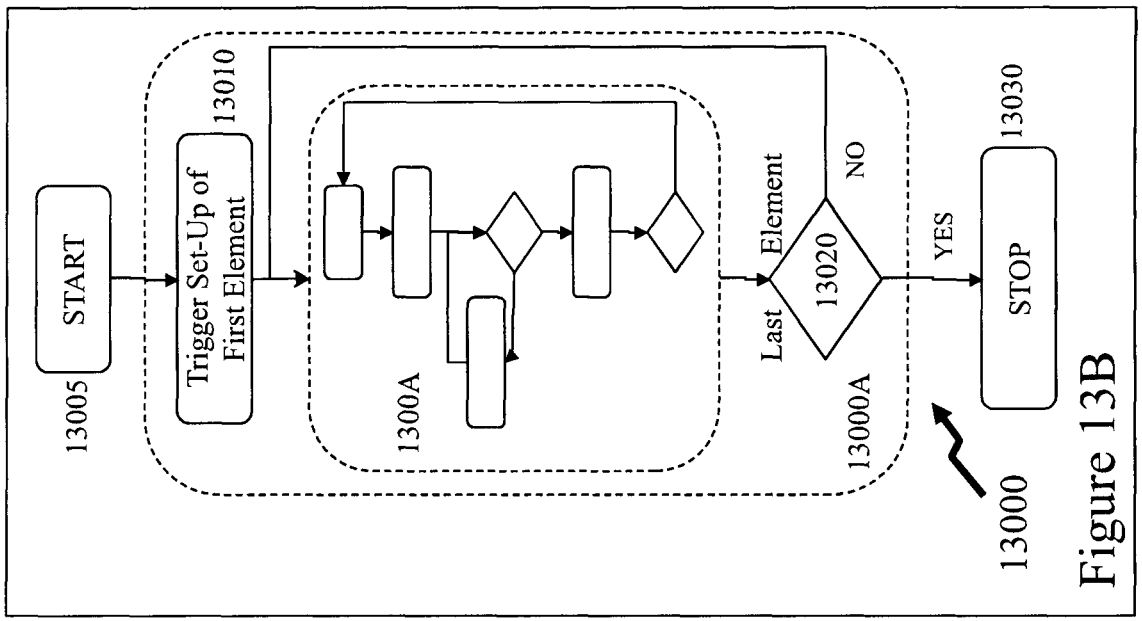
FIGS. 13A and 13B depict flow diagrams for process flows relating to setting a device exploiting fluidic elements with single and multiple functions according to embodiments of the invention according to the preference of a user of the device.
Figure 13A:
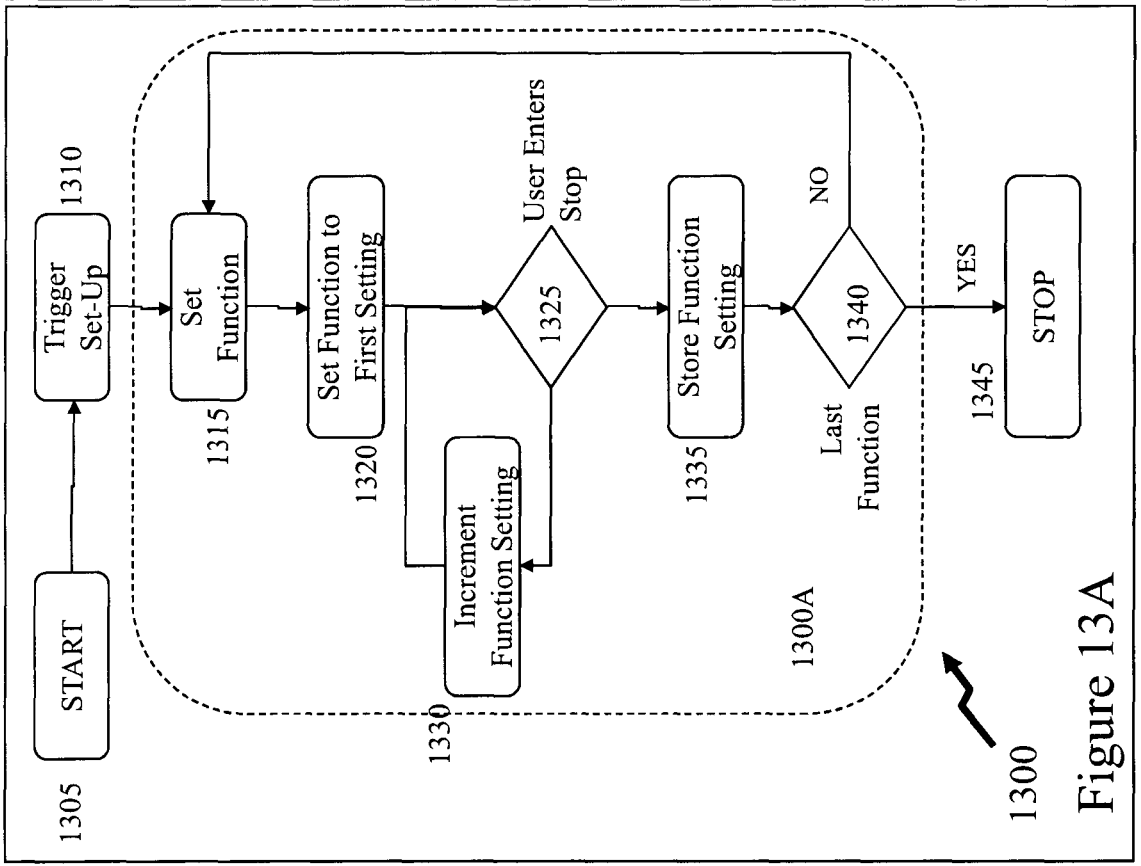

Personalized Control of Fluidic Actuators:

Referring to FIG. 13A there is depicted a flow diagram 1300 for a process flow relating to setting a device exploiting fluidic elements according to embodiments of the invention according to the preference of a user of the device. As depicted the process begins at step 1305 wherein the process starts and proceeds to step 1310 wherein the user triggers set-up of the device. Next in step 1315 the user selects the function to be set wherein the process proceeds to step 1320 and the device controller sets the device to the first setting for that function. Next in step 1325 the device checks for whether the user enters a stop command wherein if not the process proceeds to step 1330, increments the function setting, and returns to step 1325 for a repeat determination. If the user has entered a stop command the process proceeds to step 1335 wherein the setting for that function is stored into memory. Next in step 1340 the process determines whether the last function for the device has been set-up wherein if not the process returns to step 1315 otherwise it proceeds to step 1345 and stops.

Accordingly, the process summarized in flow diagram 1300 allows a user to adjust the settings of a device to their individual preferences. For example, such settings can include, but are not be limited to, the maximum radial expansion of the device, the maximum linear expansion of the device, frequency of vibration, amplitude of pressure elements, and frequency of expansion. Now referring to FIG. 13B there is depicted a flow diagram 13000 for a process flow relating to setting a device exploiting fluidic elements with multiple functions according to embodiments of the invention according to the preference of a user of the device. As depicted, the process begins at step 13005 and proceeds to step 13010 wherein the set-up of the first element of the device, e.g. the eyes as described below in respect of a third toy 2530 in FIG. 25. Next the process proceeds to step 1300A which comprises steps 1315 through 1340 as depicted supra in respect of FIG. 13A. Upon completion of the first element the process determines in step 13020 whether the last element of the device has been set-up. If not the process loops back to execute step 1300A again for the next element of the device otherwise the process proceeds to step 13030 and stops.

For example, considering third toy 2530 the process might loop back round based upon the user setting performance of the secondary element, e.g. the mouth of a third toy 2530. In other instances, the user can elect to set-up only one of the elements of the device, some elements or all elements of the device. Optionally, the user can elect to set only some settings for one device, and none or all for another device. It would be evident to one skilled in the art that wherein process flow 13000 is employed in respect of a multi-element device, such as a pair of third toys 2530, that the user making the setting determinations can change those relating to one of the pair of third toys 2530.

Figure 14:
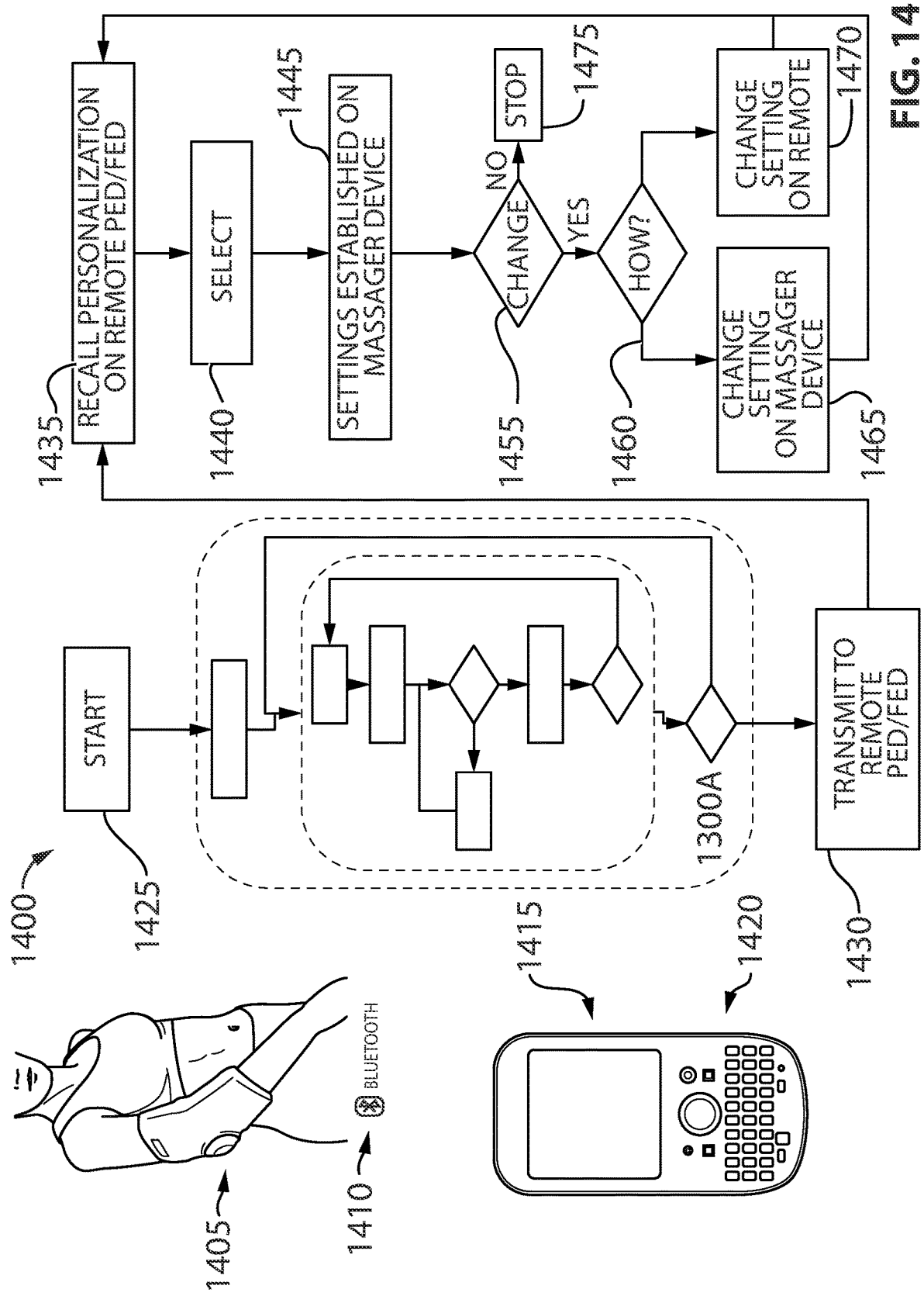
FIG. 14 depicts a flow diagram for a process flow relating to establishing a personalization setting for a device exploiting fluidic elements according to embodiments of the invention and its subsequent storage/retrieval from a remote location.

Now referring to FIG. 14 there is depicted a flow diagram 1400 for a process flow relating to establishing a personalization setting for a device 1405 exploiting fluidic elements according to embodiments of the invention and its subsequent storage/retrieval from a remote location, for example, from a PED 1420. The flow diagram 1400 begins at step 1425 and proceeds to step 1300A as described supra in respect of process flow 1300, wherein the user establishes their preferences for the device. Upon completion of step 1300A the process proceeds to step 1430 and transmits the preferences of the user to a remote electronic device, such as a PED, and proceeds to step 1435 wherein the user can recall personalization settings on the remote electronic device and select one in step 1440. The selected setting is then transferred to the device in step 1445 wherein the process then proceeds to offer the user the option in step 1455 to change the setting(s) selected. Based upon the determination in step 1455 the process either proceeds to step 1475 and stops wherein the setting previously selected is now used by the user or proceeds to step 1460 wherein the user is prompted with options on how to adjust the settings of the device.

These being for example changing settings on the device or the remote wherein the process proceeds to steps 1465 and 1470 respectively on these determinations and proceeds back to step 1435.

Accordingly, as depicted in FIG. 14 a device 1405 can comprise a wireless interface 1410, e.g., Bluetooth, allowing the device to communicate with a remote electronic device, such as PED 1420 of the user. The remote electronic device 1420 stores settings of the user or users, for example, three are depicted in FIG. 14 entitled "Natasha 1", "Natasha 2", and "John 1." For example "Natasha 1" and "Natasha 2" can differ in speeds of extension motion, radial extension, length of extension, and duration of action which combined represent different settings for the user "Natasha", such as, for example a gentle tissue massage versus a deep tissue massage. Alternatively, for a toy then the different setting may relate to the user having established different facial motions on toy 2530 in FIG. 25, for example, such that one is a slow yawn whereas the other is a rapid opening/closing of the mouth in combination with rapid bulging/collapse of the eyes. Accordingly, a device can be employed with initial settings and then varied by the user in the case of a massager or as a child grows then they go from simply being amused by a toy to adapting its behavior and programming multiple behaviours/characteristics.

In addition to these variations user programming can provide the ability to vary characteristics such as frequency and amplitude over wide ranges as well as being able to control the pulse shape for variable acceleration of initial contact and add other motions to better simulate/provide natural physical sensations or un-natural sensations. For example, a user can be able to vary pulse width, repetition frequency, and amplitude for a predefined "impact" motion and then modify this to provide vibration over all or a portion of the "impact motion" as well as between "impact" pulses. Accordingly, with massage type devices the user may adjust the devices characteristics to reflect either their personal preferences/experiences and/or the region of the body to which the massager is applied.

Figure 15A:
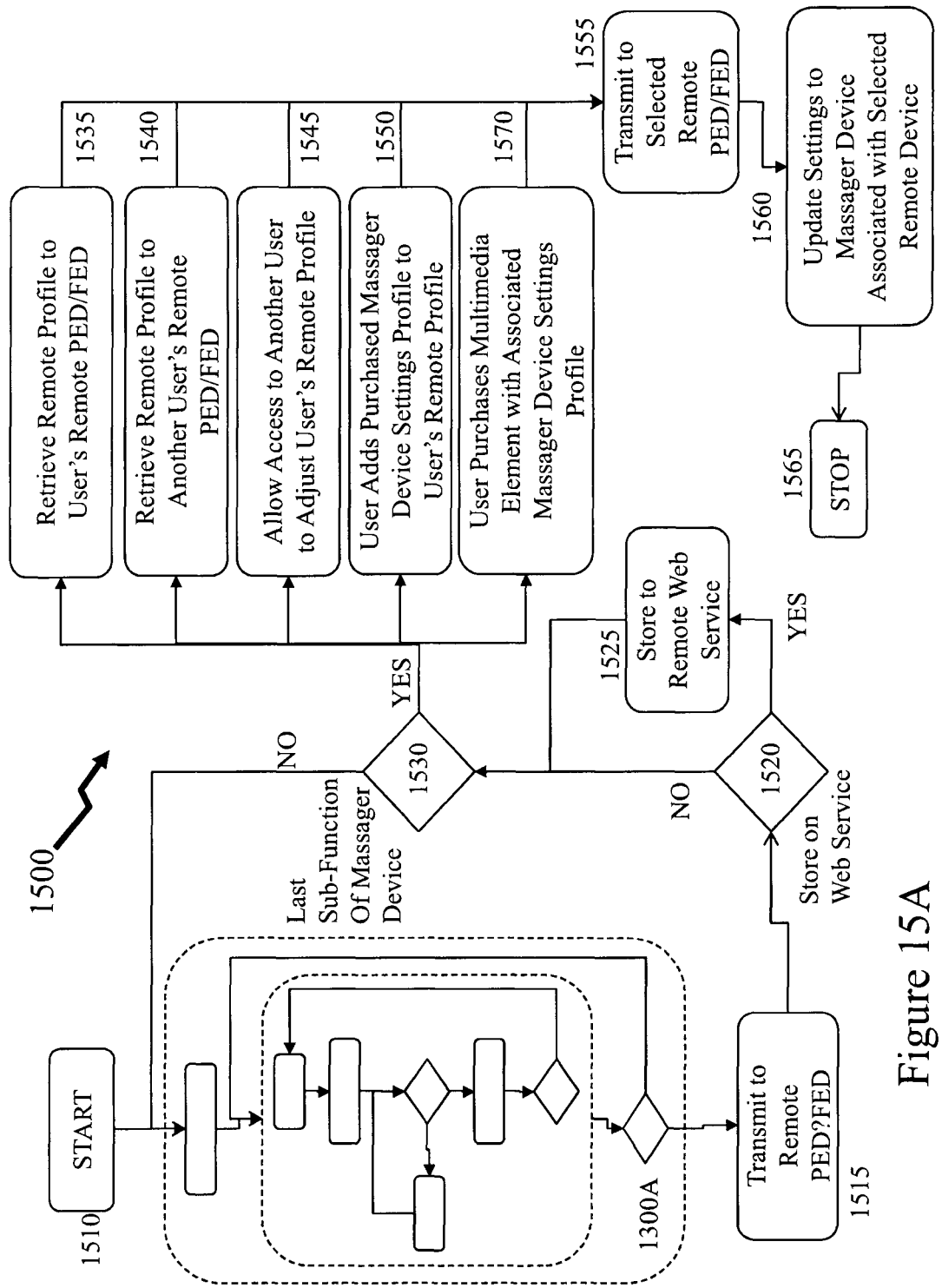
FIG. 15 depicts a flow diagram for a process flow relating to establishing a personalization setting for a device exploiting fluidic elements according to embodiments of the invention and its subsequent storage/retrieval from a remote location to the users device or another device.

Referring to FIG. 15 there is depicted a flow diagram 1500 for a process flow relating to establishing a personalization setting for a device exploiting fluidic elements according to embodiments of the invention and its subsequent storage/retrieval from a remote location to the user's device or another device. Accordingly, the process begins at step 1510 and proceeds to step 1300A as described supra in respect of process flow 1300, wherein the user establishes their preferences for the device. Upon completion of step 1300A the process proceeds to step 1515 and transmits the preferences of the user to a remote electronic device and proceeds to step 1520 wherein the user selects whether or not to store the device settings on a remote web service. A positive selection results in the process proceeding to step 1525 and storing the user preferences (settings) on the remote web service before proceeding to step 1530 otherwise the process proceeds directly to step 1530.

In step 1530 the process is notified as to whether all fluidic sub-assemblies of the device have been set-up. If not, the process proceeds to step 2100A, otherwise it proceeds to one of steps 1535 through 1550 based upon the selection of the user with regard to whether or not to store the user's preferences on the web service. These steps being:

step 1535—retrieve remote profile for transmission to user's remote electronic device;
step 1540—retrieve remote profile for transmission to another user's remote electronic device;
step 1545—allow access for another user to adjust user's remote profile;
step 1550—user adds purchased device setting profile to user's remote profiles; and
step 1570—user purchases multimedia content with an associated user profile for a device or devices.

Next in step 1555 wherein a process step was selected requiring transmission of the user preferences to a remote electronic device and thence to the device this is executed at this point prior to the settings of the device being updated on the device associated with the selected remote electronic device in step 1560 and the process proceeds to step 1565 and stops. Accordingly, in step 1535 a user can retrieve their own profile and select this for use on their device, or a new device they have purchased, whereas in step 1540 the user can associate the profile to another user's remote electronic device wherein it is subsequently downloaded to that remote electronic device and transferred to the device associated with that remote electronic device. Hence, a user can load a profile they have established and send it to a friend to use or a partner for loading to their device either discretely or in combination with another profile associated with the partner. Accordingly a user can load their profile to a device associated with an activity and then replace it for another activity or alternatively adjust the profile to different children or adults using a toy. Alternatively, in step 1545 the process allows for another user to control the profile allowing, for example, a remote user to control the device through updated profiles whilst watching the user of the device on a webcam whilst in step 1550 the process provides for a user to purchase a new profile from a device manufacturer, a third party, or a friend/another user for their own use. An extension of step 1550 is wherein the process proceeds via step 1570 and the user purchases an item of multimedia content, such as for example an audio book, song, or video, which has associated with it a profile for a device according to an embodiment of the invention such that as the user plays the item of multimedia content the profile is provided via a remote electronic device, e.g. the user's PED or Bluetooth enabled TV, to their device and the profile executed in dependence of the replaying of the multimedia content and the profile set by the provider of the multimedia content. Optionally, the multimedia content can have multiple profiles or multiple modules to the profile such that the single item of multimedia content can be used with a variety of devices with different functionalities and/or elements.

Devices according to embodiments of the invention, may acquire data to a user's physiological state in association with other lifestyle and/or contextual parameters of the user or an individual associated with the user. In embodiments of the invention this information/data may with the appropriate consents be collected and transmitted, either subsequently or in real-time, to another device and/or system, preferably remote from the user, where it may be stored for later characterization, processing, manipulation and presentation to a recipient (e.g. the user), preferably over an electronic network such as the Internet or for communication back to the device or devices associated with the user in order to adjust, modify or add/remove parameters, programs, etc. Contextual parameters may include, but not be limited, to parameters relating to the environment, surroundings and location of the individual, including, but not limited to, air quality, sound quality, ambient temperature, global positioning, associated individuals, etc. As such, referring to FIG. 15B, a user has a device 15100 according to one or more embodiments of the invention which includes one or more sensors 15112A to 155112N. The device 15100 may be adapted to be placed in proximity with at least a portion of the human body or for use by the user. The one or more sensors 15112A to 15112N, which are adapted to generate signals in response to physiological characteristics of an individual, provide signals to a microprocessor. Proximity as used herein refers to, but is not limited to, direct physical contact or separation from the user's body by a material forming part of the device or applied to the device/user's body such that sensors are not impeded in providing accurate measurements.

Device 15100 generates data indicative of various physiological parameters of an user, such as the user's heart rate, pulse rate, EKG or ECG, respiration rate, skin temperature, galvanic skin response (GSR), EMG, EEG, blood pressure, activity level, oxygen consumption, glucose or blood sugar level, body position, pressure on muscles or bones, for example. In some instances the data indicative of the various physiological parameters is the signal or signals themselves generated by the one or more sensors and in certain other cases the data is calculated by the microprocessor based on the signal or signals generated by the one or more sensors. Such techniques for generating data indicative of various physiological parameters and sensors to be used are well known to one of skill in the art, as evident from some common physiological parameters listed in Table 1.

TABLE 1

Examples of Measurands and Sensors

| Parameter | Method | Sensor |
| --- | --- | --- |
| Heart Rate | EKG | 2 Electrodes |
| Pulse Rate | BVP | LED Emitter and Optical Sensor |
| EKG | Skin Surface Potential | 3-10 Electrodes |
| Respiration Rate | Chest Volume | Strain Gauge |
|  | Acoustic | Microphone |
| Skin Temperature | Surface | Thermistors |
| Galvanic Skin Response | Skin Conductance | 2 Electrodes |
| Blood Pressure | Non-Invasive | Electronic |
|  | Korotkuff Sounds | Sphygromarometer |
| Activity | Body Movement | Accelerometers |
| Body Position | Orientation | Accelerometers |
| Muscle Pressure | N/A | Thin Film Piezoelectric Sensors |
| EMG | Skin Surface Potentials | 3 Electrodes |
| EEG | Skin Surface Potentials | Multiple Electrodes |

Figure 15B:
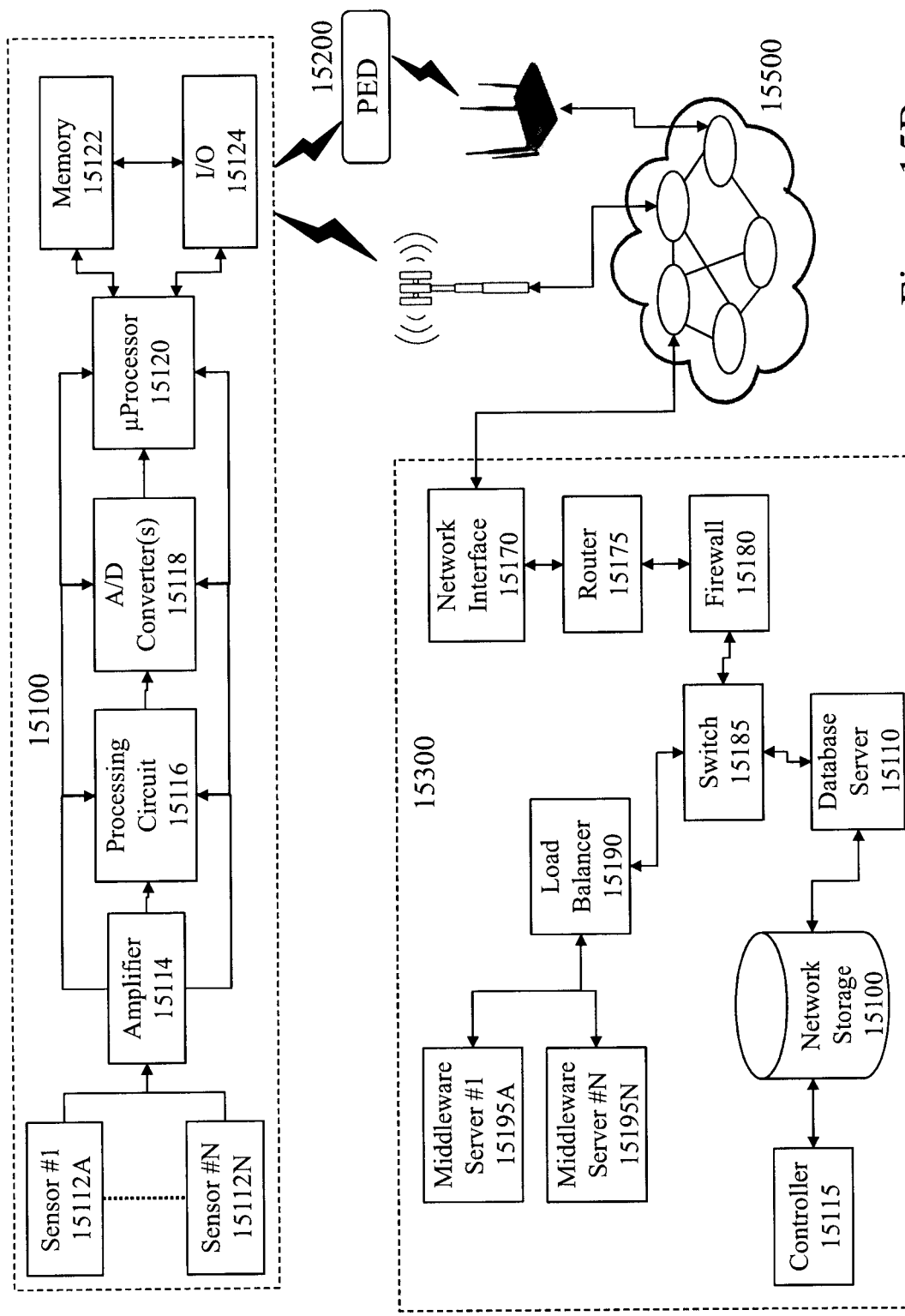

The microprocessor within device 15100 may be programmed to summarize and analyze the data or in other instances to pass raw or with limited signal processing. For example, the microprocessor can be programmed to calculate an average, minimum or maximum heart rate or respiration rate over a defined period of time, for example one minute, or as a moving average or filtered with a predetermined time constant filter. Device 15100 may, in other embodiments, be able to derive information relating to a user's physiological state based on the data indicative of one or more other physiological parameters. Further, the device 15100 may also generate data indicative of various contextual parameters relating to the environment surrounding the user. For example, device 15100 can generate data indicative of the sound level/quality, music/audiovisual environment, lighting, ambient temperature, global positioning, or local positioning within a building, e.g. the user's bedroom in their residence or living room, bathroom, etc. As depicted in FIG. 15B the device comprises one or more sensors 15112A to 15112N and a microprocessor 15120. Depending upon the nature of the signal generated by the one or more sensors 15112A to 15112N may be routed to the microprocessor 15120 via one or more of amplifier 15114, signal processing circuit 15116, and analog-to-digital converter (ADC) 15118, before being sent to microprocessor 15120. For example, where first sensor 15112A generates an analog signal in need of amplification and filtering, that signal can be sent to amplifier 15114, and then on to signal processing circuit 15116, which may, for example, be a band pass filter. The amplified and conditioned analog signal can then be transferred to ADC 15118, where it is converted to a digital signal. The digital signal is then sent to microprocessor 15120. Alternatively, if $N^{th}$ sensor 15112 generates a digital signal, that signal can be sent directly to microprocessor 15120. As with analog signals from sensors a digital signal or signals representing certain physiological and/or contextual characteristics of the user may be used by microprocessor 15120 to calculate or generate data indicative of physiological and/or contextual parameters of the user.

The data indicative of physiological and/or contextual parameters can, according to an embodiment of the invention be stored within memory 15122 it is stored until uploaded to remote processing unit (RPU) 15300 via device I/O 15124. Although memory 15122 is shown as a discrete element, it may in part or full be part of microprocessor 15120. In some embodiments of the invention the device 15100 communicates directly to RMU 15300 whereas in others it communicates to a PED 15200 prior to the PED 15200 communicating with the RPU 15300. In some embodiments of the invention PED 15200 provides additional physiological/contextual data in association with data provided by the device 15100 when communicating to RPU 15300 or provides this additional physiological/contextual data to device 15100 for storage and transmission to RPU 15300. In some embodiments of the invention the physiological/contextual data are uploaded continuously, periodically during device operation, after device operation, or based upon time/data triggers. For example, in an embodiment of the invention the device 15100 provides via PED 15200 data every 15 seconds on user heart rate, blood pressure, and breathing together with the device setting wherein based upon the analysis provided by the RPU 15300 the device configuration is changed and/or the program executed adjusted. In another embodiment of the invention the data is stored until, say 1 pm in the morning for transmission, until the device is docked to a docking station, connected to a power supply for re-charging, etc.

Data transfer from device 15100 to RPU 15300 either directly or via PED 15200 may be performed through one or more standard communications protocols as known within the prior art. Such protocols according to the device 15100 may include, but not be limited to, a physical connection, which, for example, may be a serial connection such as an RS232 or USB port or power line communications, or a wireless connection such as through Bluetooth, Wi-Fi, WiMAX, GSM, Zigbee etc. or alternatively through optical, infrared or RF transmission. Data transfer from device

15100 to RPU 15300 either directly or via PED 15200 may be performed in conjunction with one or more standard data compression and/or data encryption techniques as known within the art. Accordingly, the data collected by device 15100, after being encrypted and, optionally, compressed by microprocessor 15120, may be transferred to PED 15200, such as a cellular phone, laptop, etc. for subsequent long distance wireless transmission to local telecommunications provider using a wired or wireless protocol such as electronic mail, data file transfer, simple message service (SMS), etc. as known in the art for transferring data from an electronic device, e.g. PED or FED, to a remote service, remote server, remote PED, or remote FED. Whilst FIG. 15B depicts communications via a PED 15200 it would be evident that alternatively a FED may provide the same functions and capabilities, e.g. network set-top box, Internet enabled TV, etc.

Optionally, in addition to collecting data by automatically sensing such data in the manners described above, a user may provide additional data through PED 15200 either by providing this through a blog, user group, etc. which is monitored and associated with the user by RPU 15300 or in response to a questions, survey, etc. provided to the user from RPU 15300. Accordingly, if a new control algorithm was provided to device 15100 and employed by the user the instance is identified and a survey provided to the user. Such survey may include an incentive related to the provider of the device 15100 or provider of the enhanced control algorithm. Such queries may be through email, text, SMS, web site, etc. as known within the prior art.

Now referring to RPU 15300 in FIG. 15B this is depicted in an exemplary block diagram which includes network interface 15170 which is connected to a router 15175, the main function of which is to take data requests or traffic, both incoming and outgoing, and direct such requests and traffic for processing by RPU 15300 or to device 15100. Connected to router 15175 is firewall 15180. The main purpose of firewall 15180 is to protect the remainder of RPU 15300 from unauthorized or malicious intrusions. Switch 15185, connected to firewall 15180, direct data flow between middleware servers #1 to #N 15195A to 15195N respectively and database server 15110. The middleware servers #1 to #N 15195A to 15195N respectively are connected to load balancer 15190 which spreads the processing of incoming data/requests among the identically configured middleware servers #1 to #N 15195A to 15195N respectively.

As depicted RPU 15300 includes network storage device 15100, such as a storage area network or SAN, which acts as the central repository for data. For example, network storage device 15100 may comprise a database that stores all data gathered for each user in the manners described above. Alternatively, network storage device 15100 may be associated with a single device type, supplier, etc. Although only one network storage device 100 is shown it would be understood that multiple network storage devices of various capacities could be used depending on the data storage needs of RPU 15300. Further, multiple RPUs 15300 may be provided with geographic associations, device supplier associations, device type associations, or device identity associations. The primary functions of database server 15110 relate to providing access upon request to the data stored in network storage device 15100, and populating network storage device 15100 with new data. Coupled to network storage device 15100 is controller 15115 for managing the data stored in network storage device 15100.

Middleware servers #1 to #N 15195A to 15195N respectively each contain software for generating and maintaining an aspect of communications, support, data processing, registrations, etc. as required by RPU 15300. For example, a middleware server may host one or more websites and/or webpages providing users with downloadable upgrades to devices 15100, social networks associated with devices 15100 and/or users, etc. Alternatively, a middleware server may be processing data received from a device 15100 associated with a user and provide dynamic real-time adjustments to the device 15100. Optionally, a middleware server may be hosting a social network allowing users with devices 15100 to identify each other locally and/or remotely and interact wherein actions relating to a device 15100 associated with a first user may be temporarily transferred to another user within the social network under first user authorization and override. Optionally, the social network may be residual allowing ongoing user interactions through the social network in addition to via devices 15100 and/or temporarily established on demand.

Middleware servers #1 to #N 15195A to 15195N may also contain software for requesting data from and writing data to network storage device 15100 through database server 15110. When an user desires to initiate a session with the RPU 15300 for the purpose of entering data into the database of network storage device 15100, viewing his or her data stored in the database of network storage device 15100, or both, the user, may for example, visits the home web page of a service provider/device provider etc. associated with RPU 15300 using an Internet browser program and logs in as a registered user. Load balancer 15190 assigns the user to one of the middleware servers #1 to #N 15195A to 15195N, identified as the chosen middleware server. A user will preferably be assigned to a chosen middleware server for each entire session. The chosen middleware server authenticates the user using any one of many well-known methods in the prior art, to ensure that only the true user is permitted to access the information in the database relating to themselves externally although the user in registering with a service provider/device provider etc. associated with RPU 15300 may have provided authorisation for the service provider/device provider etc. to access their data although this may be depersonalized by removal of personal identity data. A user may also grant access to his or her data to a third party such as a partner, health care provider, personal trainer, etc. according to the type of device 15100 etc. Each authorized third party may be given a separate password and may view the member user's data using a conventional browser. It is therefore possible for both the user and the third party to be the recipient of the data. It would be evident that the browser may provide the other user with the ability to adjust/control the user's device 15100 in some embodiments of the invention whereas in other embodiments of the invention these functions may be provided through a software application downloaded and installed to each user PED/FED with the appropriate user credential entry/authorisation etc.

When the user is authenticated, the chosen middleware server may request, through database server 15110, the user's data from network storage device 15100 for a predetermined time period. The requested data, once received from network storage device 15100, is temporarily stored by the chosen middleware server in cache memory. The cached data is used by the chosen middleware server as the basis for presenting information, controlling device 15100, engaging user, etc. Alternatively, the chosen middleware server may request, through database server 15110, permission to store either the raw and/or processed user's data to network storage device 15100. For example, in some instances this may be a summary of the user's use of device 15100 such as:

"John Doe, Massage, Seq. 1, Monday, Mar. 9, 2015, 10:15, 15 minutes" wherein the user, program, and time/date information are stored;

"Debbie Dallas, Vibrator, Tuesday, Mar. 10, 2015, 17:45, 25 minutes, 2 events, {Field 1:Field2}"; wherein the user, program, and time/date information are stored together with summary information (e.g. 2 events) and device data (e.g. Field 1 and Field 2 being data derived from the device;

"Mary Jane, Vibrator, Tuesday, Mar. 10, 2015, 17:45, Paired to Debbie Dallas, Master, Seq. (2,4,3), 25 minutes" wherein the user "Mary Jane" is identified as pairing to another user "Debbie Dallas" with control ("Master") and an indication of the device programs executed; and "Bill Smith, Robot 1234, Wednesday, Mar. 11, 2015, 09:15, 15 minutes, Remote, Video" wherein the user is identified and having used a device "Robot 1234" remotely and being provided with video content during their use of "Robot 1234", wherein optionally the video provided may be captured and stored in association with the user's records.

As described the microprocessor of device 15100 may be programmed to derive information relating to an user's physiological state based on the data indicative of one or more physiological parameters. RPU 15300, and preferably middleware servers #1 to #N 15195A to 15195N, may also be similarly programmed to derive such information based on the data indicative of one or more physiological parameters.

Accordingly, embodiments of the invention in relation to devices 15100 with connections to PEDs 15200, FED, RPU 15300 etc. provide a range of options to users. For example, a pet's toy with Bluetooth can be triggered to perform actions engaging the pet or allowing the toy to be found. Accordingly, a user can be remote and watch the results of their control of the device or be provided data relating to their control. A medical practitioner may be able to access and download a record of all use of devices 15100 by the user, e.g. massagers, in conjunction with data from wearable devices, PEDs, FEDs, etc. acquired and stored within the RPU 15300. It would be evident that the embodiments of the invention provide for remote use, remote control, local use, and local control of devices 15100 discretely or in combination for a user or between two or more users. Within embodiments of the invention the control may be based upon physiological data/characteristics rather than prior art "manual" control. Accordingly, rather than a remote or second user simply adjusting the controls on a device 1510 associated with the first user the control is based upon the second user's use of another device 15100 and their physiological data/characteristics. Such control may include changing the specific program the device is performing or adjusting aspects of the device program without changing the program.

Within the process flows described above in respect of FIGS. 13A through 15B the user can be presented with different actuations patterns relating to different control parameters which can be provided in respect of a single fluidic actuator or multiple fluidic actuators. For example the user can be provided with varying frequency, varying pressure (relating to drive signal amplitude/power), varying pulse profiles, and slew rates. Within the embodiments of the invention described with respect to the device communicating with a remote electronic device this may for example be the user's PED. Optionally, the device can receive data other than a profile to use as part of the user experience including for example music or other audiovisual/multimedia data such that the electronic controller within the device reproduces the audio portion directly or adjusts aspects of the device in dependence upon the data received. An ECPUMP can be viewed as acting as a low-mid frequency actuator which can act in combination with a higher frequency actuator or by appropriate ECPUMP and electrical control provide full band coverage. Optionally, where multimedia content is coupled to the device rather than the device operating directly in response to the multimedia content the controller can apply the multimedia content raw or processed whilst maintaining the device's operation within the user set preferences. Similarly, where multimedia content contains a profile which is provided to the device and executed synchronously to the multimedia content then this profile can define actions which are then established as control profiles by the controller within the user set preferences.

Optionally, the user can elect to execute a personalization process, such as that depicted in FIG. 14 with respect to process flow 1400, upon initial purchase and use of a device or subsequently upon another use of the device. However, it would also be evident that the user can perform part or all of the personalization process whilst they are using the device. For example, a user can be using a massage type device and whilst in use characteristics such as maximum length extension and maximum radial extension of the device can be limited to different values than previously whilst the massager is left in position. Due to the nature of the sensations felt by a user from such devices it would also be evident that some personalization profile generating process flows can sub-divide the device such that a sub-set of parameters can be set and adjusted in conjunction with one another prior to adjustment of other aspects. For example, frequency/pulse duration (duration of extension of projecting elements) may be linked whilst amplitude and frequency, for example, may be varied over a wide range for a constant pulse duration.

Fluidic Assembly

The devices described herein comprise a fluidic assembly that controls the expansion/reduction of the fluidic chamber(s) within the devices. The fluidic assembly comprises a combination of fluidic channels, pumps and valves, together with the appropriate control systems. Examples of particular fluidic assemblies are described in detail below, however, it should be understood that alternative assemblies can be incorporated in the present devices.

Figure 16:
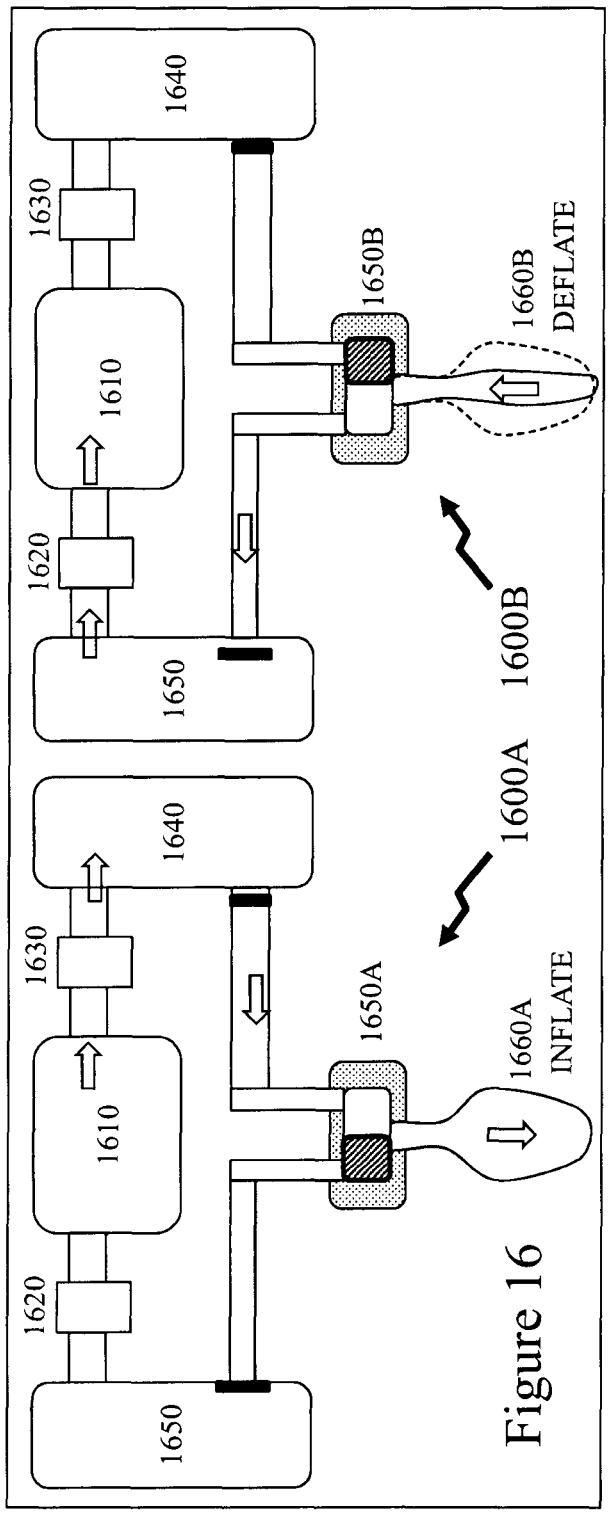
FIG. 16 depicts inflation/deflation of an element under fluidic control according to an embodiment of the invention with fluidic pump, reservoirs, non-return valves, and valves.

Within the device embodiments of the invention described supra and the fluidic schematics of FIGS. 9 and 10 fluidic control system incorporating pumps and valves with interconnecting fluidic couplings have been described for providing pressure to a variety of fluidically controlled elements such as described above in respect of FIGS. 1 through 12. Referring to FIG. 16 this inflation/deflation of an element under fluidic control according to an embodiment of the invention with a single valve is depicted in first and second states 1600A and 1600B respectively. As depicted, a fluidic pump 1610 is coupled to outlet and inlet reservoirs 1640 and 1650 respectively via outlet and inlet fluidic capacitors 1620 and 1630 respectively. Second ports on the outlet and inlet reservoirs 1640 and 1650 respectively are coupled via non-return valves to valve, which is depicted in first and second configurations 1650A and 1650B in first and second stated 1600A and 1600B respectively. In first configuration 1650A the valve couples the outlet of the pump via outlet reservoir 1640 to the fluidic actuator in inflate mode 1660A to increase pressure within the fluidic actuator. In second configuration 1650B the valve couples to the inlet of the pump via inlet reservoir 1650 from the fluidic actuator in deflate mode 1660B to decrease pressure within the fluidic actuator. Accordingly, the fluidic control circuit of FIG. 16 provides an alternative control methodology to those described supra in respect of FIGS. 9 and 10. Optionally, the non-return valves can be omitted.

Figure 17:
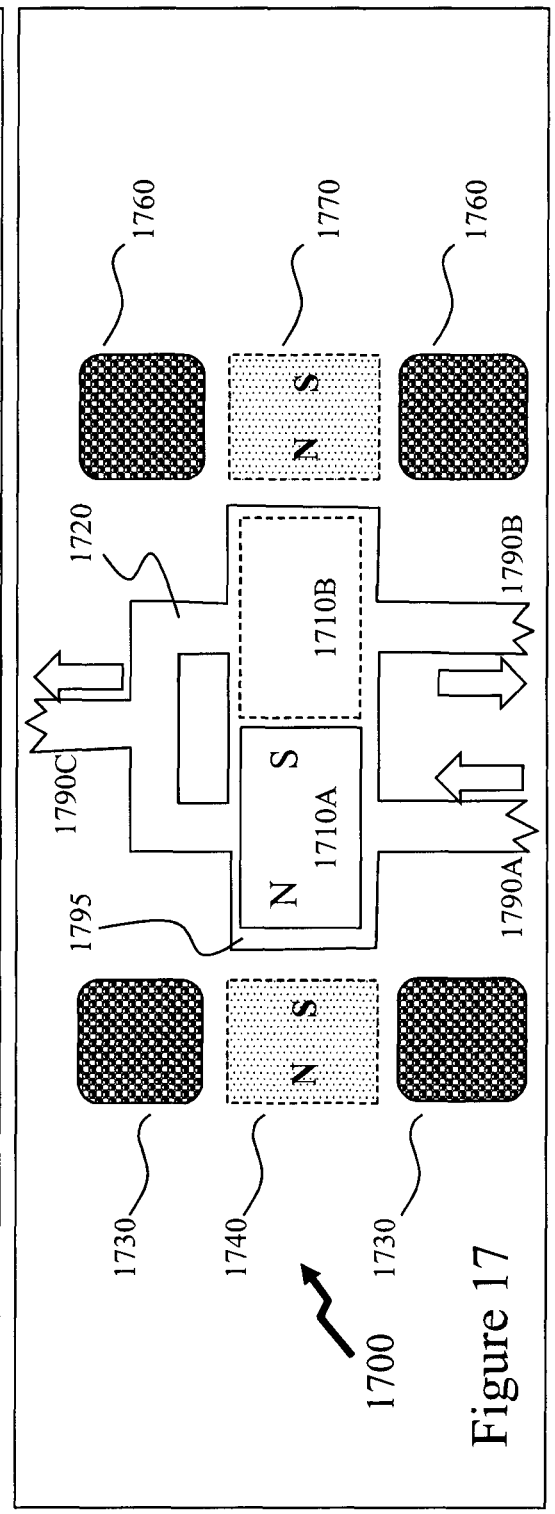
FIG. 17 depicts an electronically activated valve (EAV) or electronically activated switch for a fluidic system according to an embodiment of the invention.

Now referring to FIG. 17 there is depicted an electronically activated valve (EAV) 1700 for a fluidic system according to an embodiment of the invention such as described above in respect of FIG. 16, but which can also form the basis of valves for deployment within the fluidic control schematics described supra in respect of FIGS. 12 and 13. Accordingly, as shown a fluidic channel 1720 has an inlet port 1790A and first outlet port 2050B which are disposed on one side of a chamber 1795. On the other side of chamber 1795 are two ports that merge to second output port 1790C. Disposed within chamber 1795 is a magnetic valve core that can move from a first position 1710A blocking inlet port 1790A and associated chamber outlet to second position 1710B blocking first outlet port 1790B and associated chamber outlet. Disposed at one end of the chamber 1795 is first coil 1730 and at the other end second coil 1760. Accordingly in operation the magnetic valve core can be moved from one end of the chamber 1795 to the other end through the selected activation of the first and second coils 1730 and 1760 respectively thereby selectively blocking one or other of the fluidic channel from inlet port 1790A to second outlet port 1790C or first outlet port 1790B to second outlet port 1790C such as depicted and described in respect of FIG. 24 to provide selected inflation/deflation of the fluidic actuator through the injection/removal of fluid.

In operation with the magnetic pole orientation of the magnetic valve core depicted then to establish first position 1710A the North (N) pole is pulled left under operation of the first coil 1730 generating an effective South (S) pole towards the middle of the EAV 1700 and the S pole is pushed left under operation of the second coil 1760 generating an effective S pole towards the middle of the EAV 1700, i.e. the current within second coil 1760 is reversed relative to first coil 1730. Accordingly, to establish the second position 1710B the current within first coil 1730 is reversed relative to the preceding direction thereby generating an effective north pole towards the middle of the EAV 1700 generating a force pushing right and the S pole of the magnetic valve core is pulled right under operation of the second coil 1760 generating an effective N pole towards the middle of the EAV 1700. Optionally, according to the design of the control circuit and available power only one coil can be activated in each instance to generate the force moving the magnetic valve core. Further, it would be evident that in some embodiments of the invention only one electrical coil is provided.

Optionally, to make EAV 1700 latching and reduce power consumption on the basis that activation of the first or second coils 1730 and 1760 is only required to move the magnetic valve core between the first and second positions 1710A and 1710B first and second magnets 1740 and 1770 can be disposed at either end of the chamber with pole orientations to provide attraction to the magnetic valve core when at the associated end of the chamber 1795. Each of the first and second magnets 1740 and 1770 providing sufficient force to hold the magnetic valve core at each end once moved there under electromagnetic control of the first and/or second coils 1730 and 1760 respectively. Optionally, which of the piston/washers are magnetic can be inverted in other embodiments of the invention.

Optionally, these first and second magnets 1740 and 1770 can be pieces formed from a soft magnetic material such that they are magnetized based upon the excitation of the first and second coils 1730 and 1760 respectively. Alternatively first and second magnets 1740 and 1770 can be soft magnetic materials such that they conduct magnetic flux when in contact with the magnetic valve core and are essentially non-magnetised when the magnetic valve core is in the other valve position. It would be evident that variants of the electronically activated valve 1700 can be configured without departing from the scope of the invention including but not limited, non-latching designs, latching designs, single inlet/single outlet designs, single inlet/multiple outlet, multiple inlet/single outlet, as well as variants to the design of the chamber and inlet/outlet fluidic channels and joining to the chamber. Optionally, under no electrical activation the magnetic valve core can be disposed between first and second positions 1710A and 1710B and have a length relative to the valve positions such that multiple ports are "off" such as both of first and second outlet ports 1790B and 1790C respectively in FIG. 17.

Figure 18:
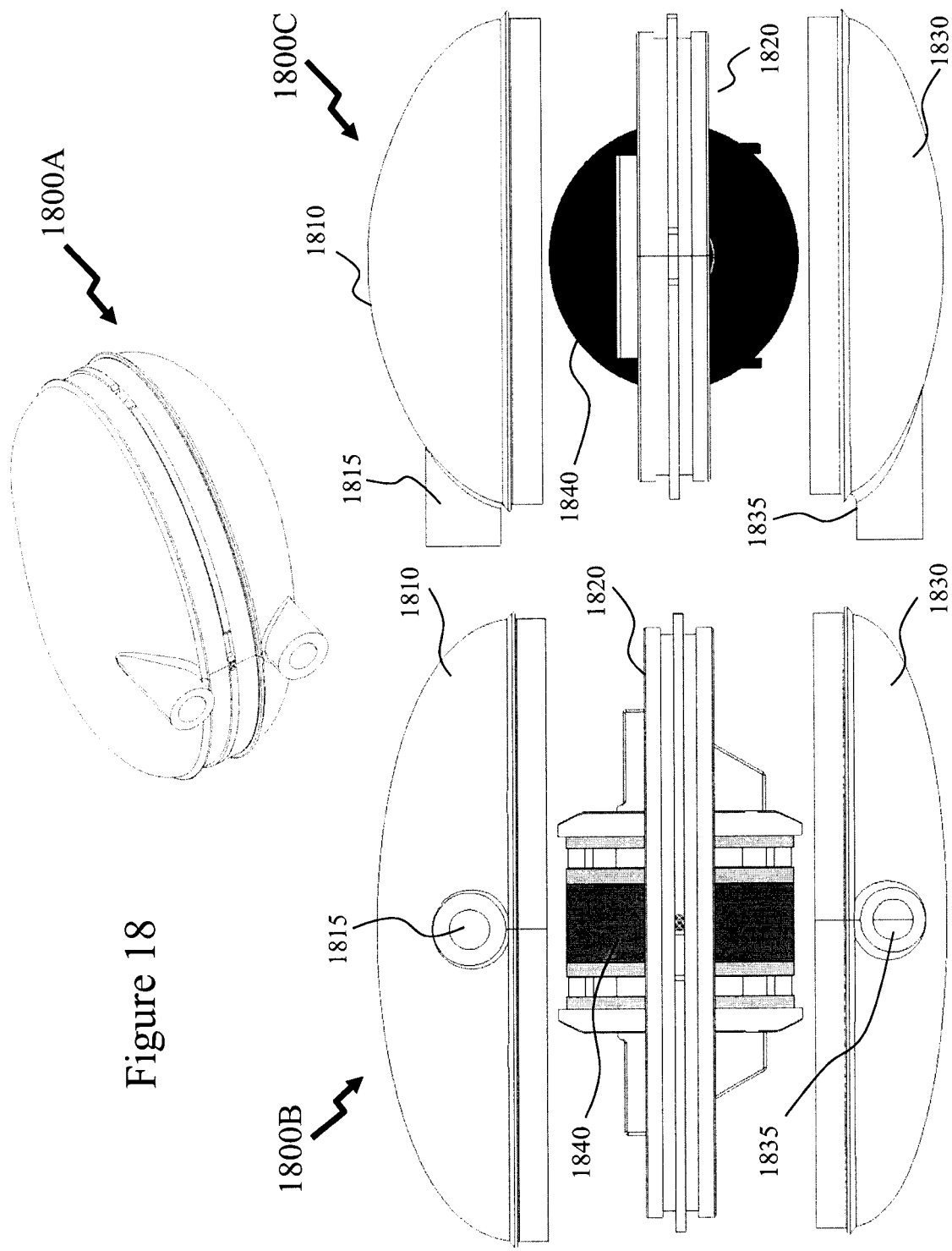
FIGS. 18 and 19 depict an electronically controlled pump (ECPUMP) according to an embodiment of the invention exploiting full cycle fluidic action.
Figure 19:
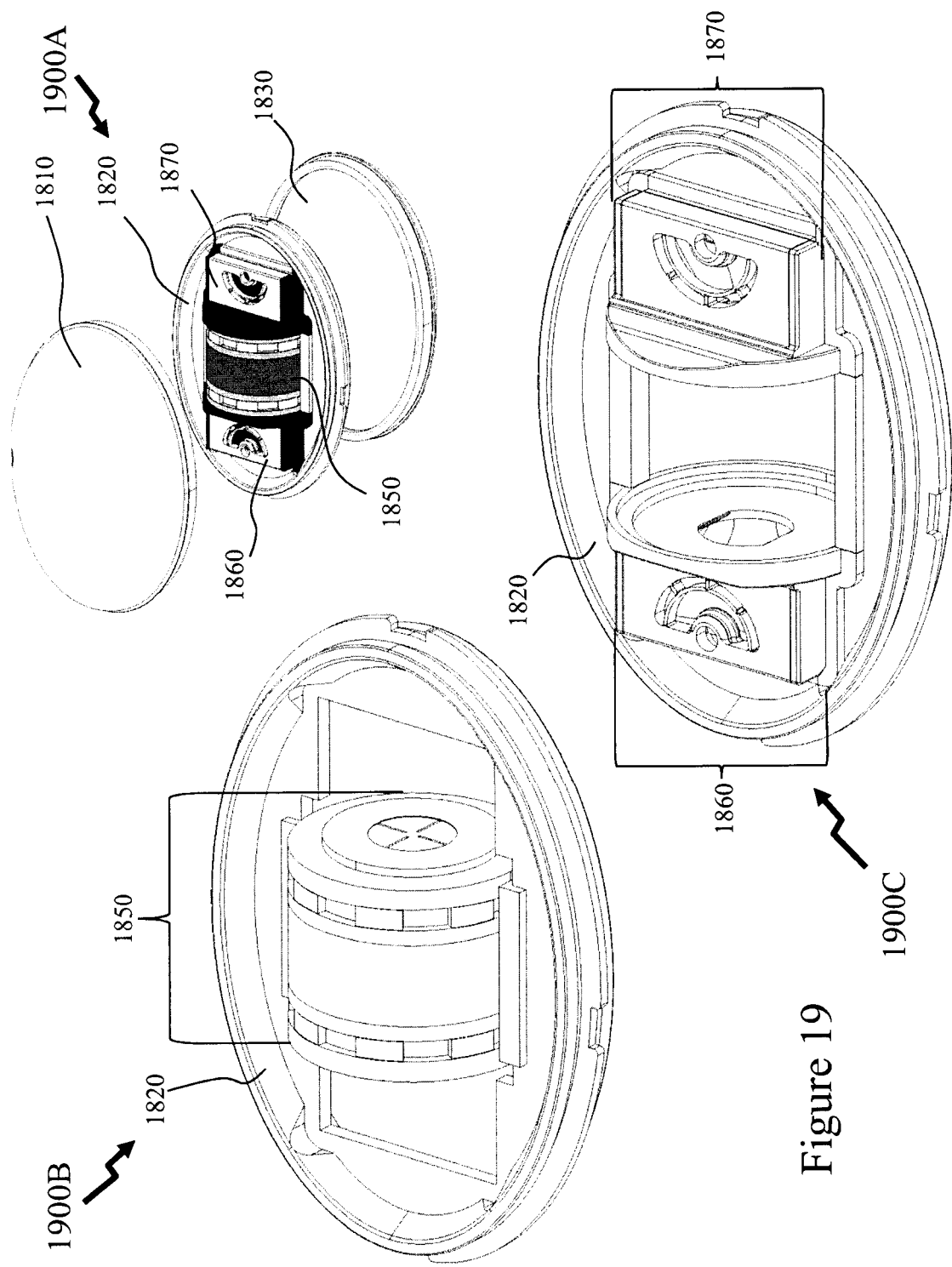

FIGS. 18 and 19 depict an electronically controlled pump assembly (ECPA) according to an embodiment of the invention exploiting full cycle fluidic action. Referring first to FIG. 18 first to third views 1800A to 1800C the ECPA is depicted in assembled, partially exploded end view, and partially exploded side views respectively. As shown ECPA comprises upper clam shell 1810, with inlet port 1815, and lower clam shell 1830 with outlet port 1835 which mount either side of motor frame 1820 upon which electronically controlled fluidic pump assembly (ECFPA) 1840 is mounted. As evident from first to third perspective views 1900A to 1900C in FIG. 19 ECFPA 1840 comprises first and second valve assemblies (VALVAS) 1860 and 1870 disposed at either end of electronically controlled magnetically actuated fluid pump (ECPUMP) 1850. Beneficially, the ECPA depicted in FIGS. 18 and 19 reduce the mass of water being driven by the pump close to a minimum amount as the outlet after the valve opens directly into the body of fluid within the ECPA.

Optionally, where upper clam shell 1810 and lower clam shell 1830 are implemented to provide elasticity under action of the ECPUMP then these act as fluidic capacitors as described within this specification. In other embodiments such fluidic actuators can have sufficient volume to act as the reservoir for the device rather than requiring the present of a separate reservoir. Alternatively, upper clam shell 1810 and lower clam shell 1830 are rigid such that no fluidic capacitor effect is present in which case these would vibrate at the pump frequency and the fluid leaving/entering the clam shell would be pulsating. Beneficially in both the flexible and stiff shell configurations the upper and lower clam shells 1810 and 1830 can provide directly vibratory excitation to the user. In fact, directly coupling the inlet port 1815 to outlet port 1835 provides a self-contained fluidically actuated device, i.e. a vibrator with flexible upper and lower clam shells 1810 and 1830 which is capable of providing users with vibrations at frequencies not attainable from prior art mechanical off-axis motors. Conversely, a rigid or stiff walled clam shell will not vibrate with much amplitude, but it will provide a pulsating water flow.

Now referring to FIG. 20 there are depicted different views of a compact ECPUMP 2010 according to an embodiment of the invention, which together with inlet and outlet VALVAS 2800 provides ECFPA 2010 with full cycle fluidic action when combined with appropriate external connections. Referring to FIG. 20 the ECPUMP 2010 is shown schematically exploded inside perspective, exploded in perspective and shown in cross-sectional exploded form. ECPUMP 2010 comprises piston 2030, bobbin core 2040, bobbin case 2050 and isolating washers 2060 together with outer washers 2095, inner washers 2090, magnets 2080 and magnet casings 2070. These are all supported and retained by body sleeve 2020 which can, for example, be injection molded once the remaining elements of ECPUMP 2010 have been assembled within an assembly jig. As depicted in FIG. 20B with exploded detail cross-sections it can be seen that the inner washers 2090 self-align with the inner profile of the bobbin core 2040. Isolation washers 2060 having been omitted for clarity. Accordingly, with subsequent positioning of magnets 2080 and magnet casings 2070 it would be evident that the resultant magnetic field profiles are appropriately aligned through the washers though the self-alignment from the bobbin core. Piston 2030 is also depicted in end-views 2030A and 2030B which show two different geometries of slots machined or formed within the piston 2030 which disrupt the formation of radial/circular Eddy currents, electrical currents, and/or radial/circular magnetic fields within the piston 2030.

Dimensions of an embodiment of ECPUMP 2010 may be implemented according to the overall requirements of the fluidic system. For example, with a 1.4" (approximately 35.6 mm) diameter and 1.175" long (approximately 30 mm) ECPUMP with diameter 0.5" (approximately 12.7 mm) and 1" (approximately 25.4 mm) long piston the pump generates 7 psi at a flow rate of 3 l/minute. Accordingly, such a pump occupies approximately 2.7 cubic inches and weighs about 150 grams. Other variants have been built and tested by the inventors for ECPUMP with diameters 1.25" to 1.5" although other sized ECPUMPs can be built.

The VALVAS can, for example, mount over the ends of the bobbin core 2040. Alternatively, a multi-part bobbin core 2040 can be employed which assembles in stages along with the other elements of the ECPUMP 2010. In each scenario the design of ECPUMP 2010 is towards a low complexity, easily assembled design compatible with low cost manufacturing and assembly for commodity (high volume production) and niche (low volume production) type applications with low cost such as a device. Embodiments of Mini-ECPUMP 2000 assembled and tested by the inventors have outer diameters between 0.5" (approximately 12.7 mm) and 0.625" (approximately 16 mm) with length 0.75" (approximately 19 mm) using a 0.25" (approximately 6 mm) diameter piston of length 0.5" (approximately 12.5 mm). Such Mini-ECPUMPs 3000 maintain a pressure of approximately 7 psi with a flow rate proportionally smaller and weigh approximately 20 grams. Optionally, magnetic support 2040 can be omitted.

In addition to all the other design issues identified supra and subsequently for ECPUMPs and ECFPAs according to embodiments of the invention thermal expansion is an issue to address during the design phase based upon factors such as recommended ambient operating temperature range and actual temperature of ECPUMP during projected duration of use by the user. For example, the piston must be allowed to expand and the inner and outer washers 2090 and 2095 respectively in FIG. 20 are designed for larger inner diameter to allow for expansion during operation as ECPUMP heats up. It would be evident that as elements of ECPUMPs/EAVs according to embodiments of the invention can exploit multiple different materials, e.g. iron for piston and plastic for barrel core, that design analysis should include accommodation for thermal expansion of adjacent elements with close tolerances.

It would be evident that ECPUMPs such as described within this specification may be implemented without non-return valves on either the input and output ports. It would be further evident that ECPUMPs such as described within this specification can form the basis for variants of other electromagnetically driven fluidic pumps such as described supra in respect of embodiments of the invention.

Figure 21:
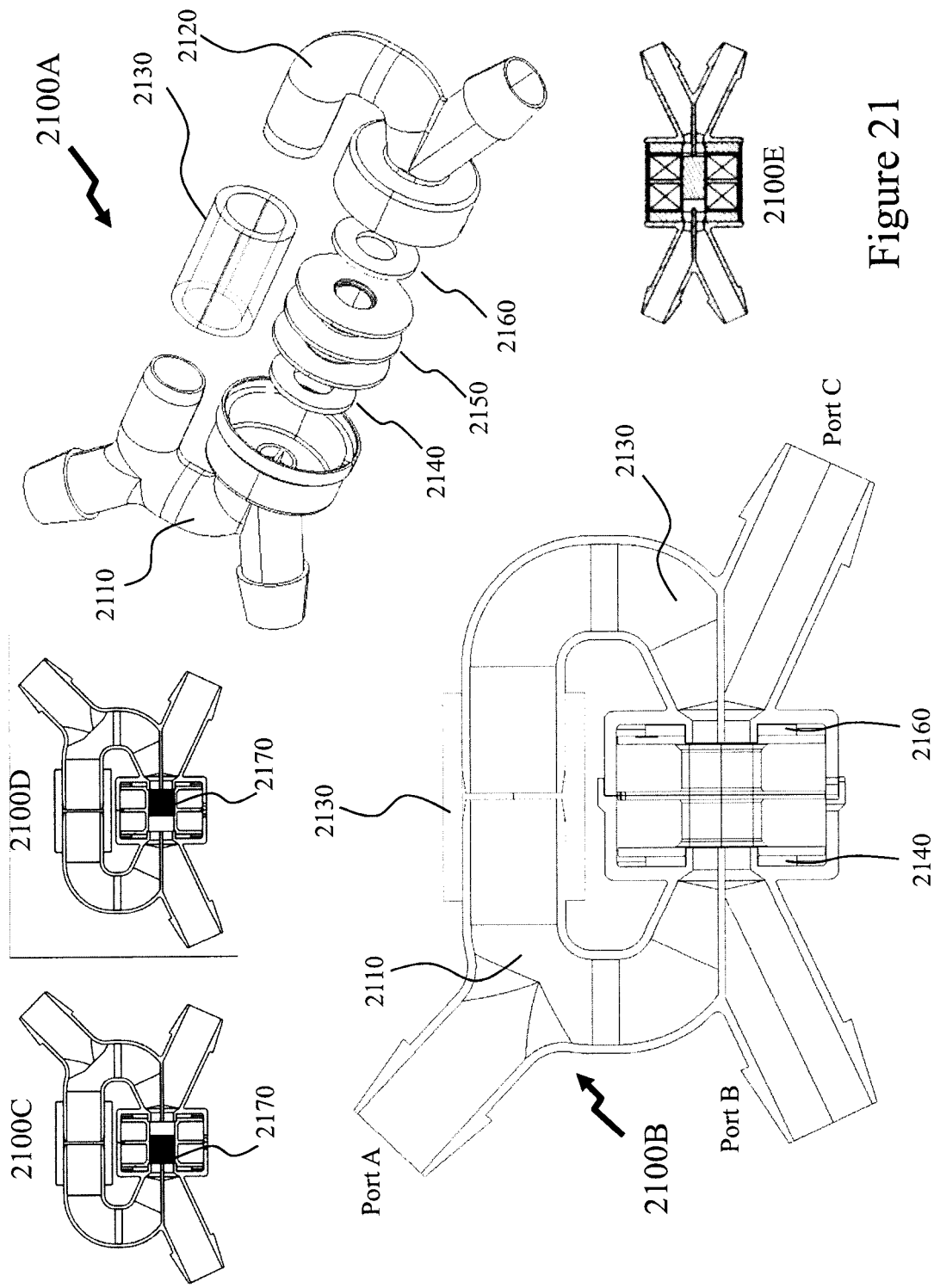
FIG. 21 depicts a compact electronically controlled fluidic valve/switch according to an embodiment of the invention.

Now referring to FIG. 21 there are depicted first to fourth views 2100A through 2100D respectively of a compact electronically controlled fluidic valve/switch (ECFVS) according to an embodiment of the invention. As depicted in first and second views 2100A and 2100B respectively the ECFVS comprises first and second bodies 2110 and 2120 respectively. Disposed between these are coupler 2130 for connecting two ports of these elements and an electronically controlled actuator (ECA) comprising magnetic washers 2140 and 2160. Additional aspects of ECA such as coil etc. have been omitted for clarity but would be evident to one of skill in the art. As evident in third and fourth views operation of the coils results in movement of magnet 2170 to either the left or right thereby blocking/opening either of the right and left routes within the second and first bodies 2130 and 2110 respectively. Magnetic washers 2140 and 2160 provide for latching operation of the ECA.

The ECFVS depicted in FIG. 21 can be considered as two valves coupled back to back where the ECFVS requires only one of Port B and Port C active at any one time. This being depicted in third and fourth views 2100C and 2100D respectively. One such implementation of ECFVS is that Port A is coupled to a fluidic actuator, Port B to the outlet of an ECPUMP, and Port C to an inlet of the (or another) ECPUMP. Accordingly, with Port C "closed" fluid is pumped from Port B to Port A driving the fluidic actuator and then with Port C "open" fluid is withdrawn from the fluidic actuator from Port A to Port C. In another configuration fluid input to Port A can be switched to either Port B or Port C and with suitable electronic control to adjust the position of the piston to both Ports B and C. Optionally, with variable pulse width modulation "PWM" of the control signal the ECFVS in the first configuration could be "dithered" so that even when all fluidic actuators are fully expanded a small amount of fluid is continuously inserted/extracted such that the fluid is always moving within the fluidic system. In the latter configuration variable PWM mode operation can allow to actuators to be simultaneously filled and/or driven with different fill or flow rates. Also depicted is fifth view 2100E of an alternate valve where only one or other of two independent flow paths are to be active. As noted variable pulse operation of the activation coil allows for variable opening ratios such that the valve can also as act a variable fluidic splitter. Embodiments of the invention have open/close times down to 5 milliseconds although typically 10-15 ms coil energizing cycles have been employed.

It would be evident to one skilled in the art that an efficient latching valve has a latching magnetic attraction, which is as small as possible to maintain the piston within the valve against the pressure head it is shutting off. For most devices it is desirable for a valve to be small, fast, have low power operation, and be simple to manufacture. The valve can be one of multiple valves integrated into a manifold. In some valves it can take more power to switch the valve off against a pressure than it is to open it when the pressure is now helping to push the piston. Any of the coil/magnetic driven motors described within this specification can be implemented in alternate designs latch and behave as a valve rather than a pump. A "switching valve" typically would not use one way valves such as a reciprocating pump would likely incorporate. Optionally, a switching valve could be partially powered in DC mode to reduce the latching piston holding force in a controlled manner and allow the closed valve to partially open or conversely the open valve to partially close. Alternatively, switching valves can incorporate closed loop feedback to influence the coil drive signal and therefore the piston's holding force.

Within an EAV such as depicted in FIG. 21 a perfect seal is not always required. In some applications, some leakage of the closed valve, e.g. 1%, can be accommodated as this does not affect materially the operation or the overall efficiency of the system. Consider the design of an EAV depicted in FIG. 21, or another valve/switch, then the gate which seals the switching valve can be formed from a softer conforming material to seat well with the piston face or the gate can be made of the same harder plastic as that the rest of the body is made of. Optionally, the piston can be iron and the washers are magnets or the piston can be a magnet and the washers a soft magnetic material. Similarly, single coil, double coil, and a variety of other aspects of the ECPUMP designs can be employed in EAV designs. An EAV can optionally only latch at one end, or there can be alternate designs with gates/ports at one end of the EAV rather than both ends. By appropriate design cascaded EAV elements can form the basis of fluidic switching and regulating circuits.

Figure 22A:
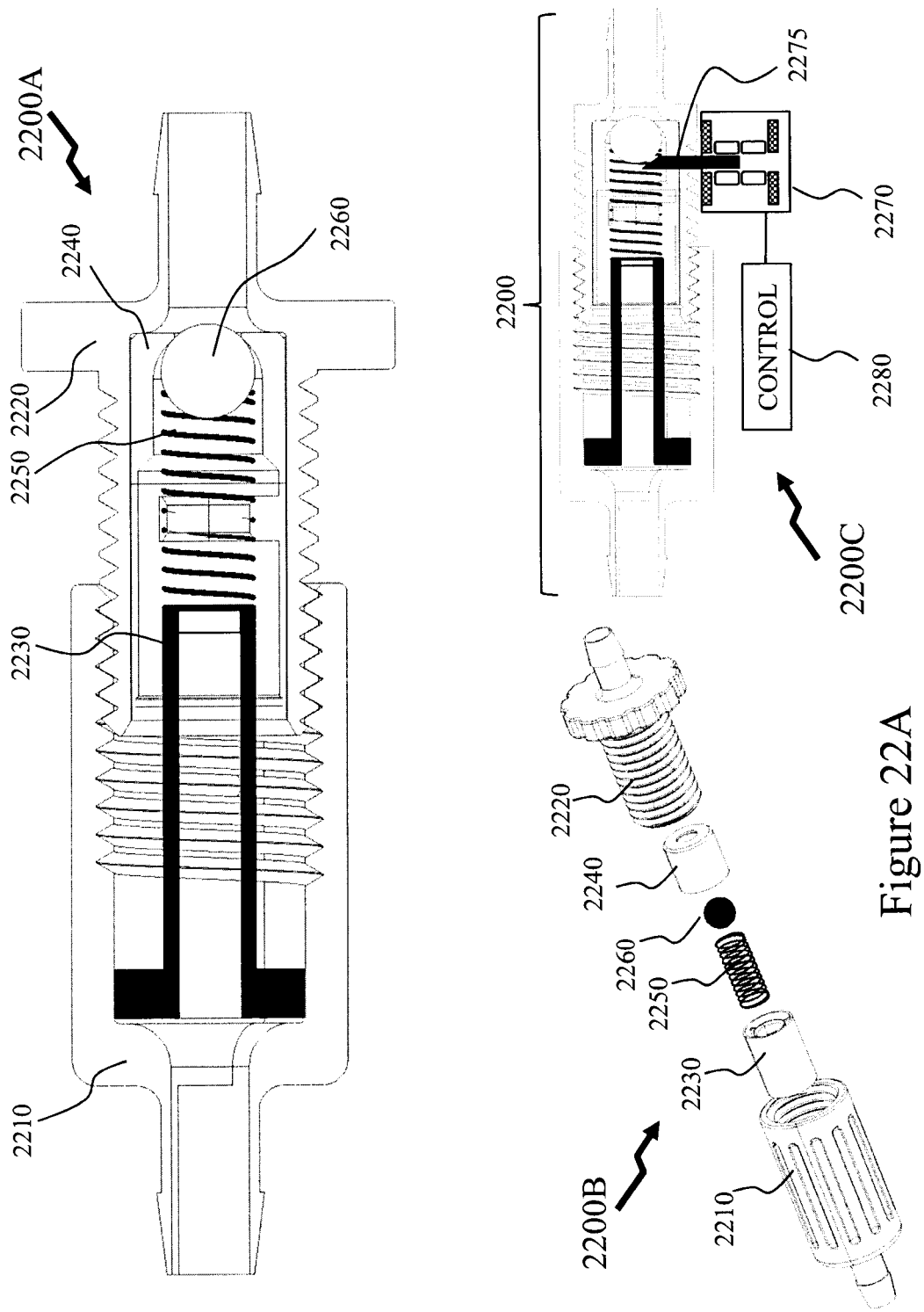
FIG. 22A depicts programmable and latching check fluidic valves according to an embodiment of the invention.

Referring to FIG. 22A there are depicted programmable and latching check fluidic valves according to embodiments of the invention. First view 2200A depicts a programmable check valve comprising body 2210, threaded valve body 2220, spring 2250, spring retainer 2230, bearing housing 2240, and ball bearing 2260. As threaded valve body 2220 is screwed into body 2210 then spring 2250 is compressed by the action of spring retainer 2230 and bearing housing 2240 such that the pressure required to overcome the spring pressure and open the programmable check valve by moving ball bearing 2260 increases. Second view 2200B depicts the programmable check valve in exploded view. Third view 2200C depicts a latching programmable check valve wherein a check value 2200 such as described supra in respect of first and second views 2200A and 2200B respectively has additionally mounted to the threaded valve body a pin 2275 which controlled by electromagnetic drive 2270 which is connected to driver circuit 2280. Accordingly, under direction of driver circuit 2280 the pin 2275 can be engaged behind the ball bearing via the electromagnetic drive 2270. When engaged the pin 2275 prevents the ball bearing moving and accordingly the check valve operating. Accordingly, it would be evident to one skilled in the art that such a latching programmable check valve or latching check valve can resolve hysteresis issues present within prior art pressure relief valves.

It would be evident that the programmable check valve depicted in first view 2200A in FIG. 22 according to embodiments of the invention provides a programmable pressure relief valve/regulator. Accordingly, once the pressure within device exceeds the set pressure the valve opens and fluid flows but once the pressure falls below the set pressure the valve closes and there is no fluid flow. Due to the hysteresis arising from the design the pressures for opening and closing are actually offset above and below respectively from the set pressure such that "chatter" in the valve when the pressure is at the set pressure is removed. Accordingly, the programmable check valve allows the device to regulate a softer balloon, e.g. one intended to operate at a maximum 3 pounds per square inch (PSI) when the pump pressure is higher, e.g. 7 PSI. Alternatively, the regulator can be used to maintain a small, e.g. 0.5 PSI, suction of the balloons within a device by forcing the pump intake to pull through such a regulator (implemented by a programmable check valve or a fixed pressure check valve). In this manner the regulator can be used as a maximum pressure bypass so that if the positive displacement pump is operating but there is not sufficient balloon capacity to be filled at that instant in time, the pressure increases, and the regulator opens to dump the pump outlet water back into the inlet pump chamber.

Referring to FIG. 22B first and second check valves 2220 and 2230 are employed within a fluidic system 2200D as pressure valves and are disposed between a reservoir 2210 and ECPUMP 2240. The ECPUMP 2240 is also connected to first to fourth valves 2250A through 2250D respectively, such as the ECFVS depicted in FIG. 21 for example. The first to fourth valves 2250A through 2250D respectively are also coupled to the return of the ECPUMP and first to fourth fluidic actuators 2260A through 2260D respectively. ECPUMP 2240 can for example have a structure that the fluidic capacity of the fluidic system 2200D operates under normal conditions without requiring fluid from the reservoir 2210. If that normal operation is that the pressure within the fluidic loop 2270 is 6 psi then first check valve 2220 can be set at 0.5 psi and second check valve 2230 at 6.5 psi. Accordingly if the pressure within loop 2270 increases above 6.5 psi second check valve 2230 opens releasing pressure via the reservoir 2210. If, in contrast, the pressure drops below 0.5 psi then first check valve 2220 opens adding fluid to the loop 2270 from the fluidic reservoir 2210. As typical prior art check valves require large surface areas of the pressure element, e.g. ball bearing 2260, in order to achieve accurate on/off pressure setting a compact check valve such as depicted in FIG. 22A with a small ball bearing will typically have poor accuracy. However, as discussed in respect of FIG. 21 if the first and second check valves are latching check valves then the valves can be high accuracy as pin 2275 can force the check valve closed earlier than it would automatically and undersetting the check valve means that a rapid opening will be achieved at pressure with disengagement of pin 2275. Alternatively, a latching pressure release valve can be employed which is by default either open or closed and is controlled via a pressure sensor disposed within the fluidic system 2200D to determine when the pin 2275 is engaged or released. Whilst pin 2275 is shown perpendicular to latching programmable check valve in third view 2200C in FIG. 22A other embodiments can include, for example, a pin angled to axis of the latching programmable check valve or multiple pins. A check valve as described supra can also be considered as being a pressure relief valve or pressure regulator.

Referring to FIG. 23 there is depicted an example of a control circuit for an ECPUMP according to an embodiment of the invention. As depicted digital circuit 2300A comprises high performance digital signal controller, such as for example Microchip dsPIC33FJ128MC302 16-bit digital signal controller which generates output pulse width modulation (PWM) drive signals PWML and PWMH which are coupled to first and second driver circuits 2320 and 2330 which generate the current drive signals applied to the coil within the ECPUMP 2010. Rather than a continuous signal the generated drive current according to an embodiment of the invention may be amplitude varying pulses with an 18 kHz frequency. Accordingly, with an embodiment of the invention a 450 ms drive current signal is composed of approximately 8000 discrete amplitude weighted cycles of this 18 kHz signal.

The operation of an ECPUMP using a drive signal such as generated by a drive circuit as depicted in FIG. 23 provides for continuous operation of the ECPUMP which via fluidic capacitors a constant fluid pressure/flow to the fluidic system and the valves. However, it would be evident that under the direction of a controller exploiting PWM techniques for driving an EAV that the EAV can be turned on and off quickly in order to keep a fluidic actuator, such as a balloon, at a predetermined fill level, e.g. 25%, 50%, and 100%. For example, with an EAV oscillating at 40 Hz then pulse width modulating the valve can be within the range 0.1 Hz to 40 Hz according to fill level desired. In this manner a single ECPUMP can fill and/or maintain the fill level of a plurality of balloons based upon the actuation of the valves, switches, etc. within the overall fluidic system. Similarly, the ECPUMP can be operated at different frequencies e.g. 10 Hz to 60 Hz. Additional frequency stimulation can be through the timing sequence of a series of valves. It would also be evident that a physical interaction, such as the pressure applied by a finger contacting a user's skin can be mimicked as the PWM based controller technique allows complex actuator expansion or effect profiles to be generated. Hence, a fluidic actuator can be inflated to provide a pressure profile mimicking another individual's finger touching them.

It would be evident to one skilled in the art that the depictions of ECPUMPs and ECFPAs in respect to embodiments of the invention within the descriptions and drawings have not shown or described the construction or presence of the excitation coil. The design and winding of such coils is known within the art and their omission has been for clarity of depiction of the remaining elements of the ECPUMPs and/or ECFPAs. For example, in FIG. 20 the coil would be wound or formed upon bobbin core 2040 and housed within bobbin case 2050 which includes an opening(s) for feeding the electrical wires in/out for connection to the external electrical drive and control circuit. Examples of such coils include, for example, 170/22, 209/23, 216/24, 320/24, 352/24, 192/28 (e.g. 8 layers of 24 turns per layer), 234/28, 468/32, and 574/33. Each pair of numbers representing the number of windings and American wire gauge (AWG) of the wire employed.

It would be evident to one skilled in the art that other structures comprising elastic elements, resilient members, and fluidic actuators can be implemented wherein one or more aspects of the motion, dimensions, etc. of elements of the device and the device itself change according to the sequence of actuation of the same subset of fluidic actuators within the element of the device and/or device itself. Further, it would be evident that one or more active elements such as the fluidic pump(s) and fluidic valve(s) can be designed as a single module rather than multiple modules.

It would be evident to one skilled in the art that by suitable design of the ECPUMPs depicted supra that in addition to providing pump action, and acting as primary pumps such as described in respect of FIGS. 12 and 13 that these can also act as second pumps as depicted in these Figures as well as providing vibrator type functionality. Further, within the embodiments of the invention described supra in respect of electronically controlled pumps it would evident to one skilled in the art that whilst these have been described with the provisioning of fluidic capacitors these can be omitted according to the design of the overall device in terms of aspects including, but not limited to, the tubing employed to connect the various elements of the fluidic system together or those portions of the fluidic system proximate the fluidic pump(s). In some instances the fluidic capacitor removal can result in a cyclic/periodic pressure profile being applied to the overall profile established by the electronic controller wherein the cyclic/periodic pressure profile provides additional stimulation to the user of the device. It would be evident that in other embodiments of the invention a fluidic capacitor can act as a high pass filter dampening low frequency pressure variations but passing higher frequency pressure variations. In other embodiments of the invention an ECPUMP can form the basis of a compact RAM/Hammer pump.

Within other embodiments of the invention a fluidic actuator can act as a fluidic capacitor and can in some instances be disposed such that any other fluidic actuators are coupled from this fluidic actuator rather than directly from the pump or from the pump via a valve. Within other embodiments of the invention a fluidic capacitor can be provided on one side of the pump such as for example, the inlet.

Optionally, the inlet fluidic capacitor can be designed to provide minimal impact to the device movement or designed to impact the device movement, such as for example by not adjusting dimensions in response to pump action. In this instance the when the pump piston seeks to draw fluid and one or more fluidic actuators have their control valves open such that there is an active fluidic connection between the pump and fluidic actuator(s) then fluid will be drawn from the fluidic actuator(s) towards the piston. However, if one or more valves is not open or the fluidic actuators are all collapsed, then the "vacuum" at the pump piston inlet would increase and accordingly a pressure relief valve can allow fluid to flow from a high pressure inlet fluidic capacitor or directly from the valve and allow the fluid to circulate when the fluidic actuators are not changing in volume. In this manner the pump can continue to run, such as for example providing, a vibration, even when the device is in a state that there is no adjustment in the volume of the fluidic actuators.

Within devices according to embodiments of the invention the fluid within the device can be heated or cooled to provide additional sensations to the user during their use of the device. Optionally, by varying the thermal conductivity of the body of the device in different regions and/or by varying the thickness of the external device skin etc. between the fluid and user's skin the degree of hot or cold applied to the user's skin can be varied across the surface of the device. In other embodiments dual fluidic circuits can provide hot and cold within the same device. Whilst heating the fluid is relatively straight-forward cooling, such as for example through the use of a thermoelectric cooler to cool a metallic element against or around which the fluid flows, requires that heat be extracted from the fluid. In some embodiments of the invention this can through use of a heatsink and/or forced air cooling or through the skin/exterior of the device. In another embodiment the thermoelectric cooler on one side cools a first fluidic loop's fluid whilst on the other side it heats a second fluidic loop's fluid.

In some embodiments of the invention the fluidic capacitor function can be removed such that the fluidic system directs all pressure possible, i.e., all that the pump piston can exert, through rigid pipes and control valves to the fluidic actuator such that the motion of the pump piston, is translated into fluid movement into/out of the fluidic actuator. This can be employed where the distance between fluidic actuator and pump is relatively short and the volume/weight of fluid being driven by the pump piston is not too large. Accordingly, depending upon the fluidic circuit design if more than one valve is open the fluid flow would be shared, and if no valves were open or valves were open but the fluidic actuator cannot expand or contract more, through some pressure/vacuum limits controlled through design of the fluidic actuator and surrounding materials, then the back pressure/vacuum on the pump piston would go up/down until the pressure relief valve opens and allows the fluid to recirculate from the pump outlet to the pump inlet. Accordingly, the pump piston can keep running without the device undergoing any movement. It would be evident that in such embodiments of the invention that the fluidic system with capacitors can contain only a small reservoir or no reservoir.

Fluidic systems such as described above in respect of embodiments of the invention with reservoirs and/or fluidic capacitors can still employ a pressure relieve valve or optionally have the pressure monitored to shut the pump down under circumstances such as being stalled against closed valves or fluidic actuators that will not move for example or where the pressure exceeds a predetermined threshold. For example, squeezing the device hard can prevent it from expanding when desired thereby leading to stalling the pump but the pressure monitoring can shut the pump down already. Optionally a thermal cut-off can be also employed within the overall control circuit. Optionally, the pump frequency might be adjusted or valves triggered to put the ECPUMP into a closed loop isolated from the actuators for either a predetermined period of time or until pressure has reduced to an acceptable level. It would be evident that more complex decisions could be made such as assessing whether the pressure is periodic/aperiodic and indicative of an intense vaginal orgasm for example rather than an individual squeezing the device. It would be evident that with ECPUMPS we can vary the pump frequency, pump stroke length, pump pulse profile, etc. to vary effective pressure, flow rate, and pulse frequencies of fluid motion within the device and accordingly actions from the fluidic actuators to which these fluidic motions are coupled by valves, switches, splitters, etc. In other embodiments of the invention the ECPUMP can be allowed to stall and through appropriate design not overheat.

Where a pressure sensor is embedded then this can itself establish the desired pressure that the user wishes to experience and then determine the pump drive signals required to achieve this desired result under variations of other pump parameters such as if the user adjusts the frequency at which operating in the user configuration stage the pressure profile is maintained. It would be evident that ECPUMP performance can be monitored. For example, the back electromagnetic field (EMF) generated can be measured to determine the position of the piston within the ECPUMP and compared relative to expected position as well as deriving position-time profile to establish whether adjustments are required to the control signals to achieve the desired device and/or ECPUMP performance. Alternatively capacitive or other sensors can derive piston position, acceleration etc. as well as fluidic flow and pressure at the ECPUMP head could also be monitored to verify performance.

Alternatively, the fluidic system can be designed such that the pump always runs and is varied in revolutions per minute (RPM) according to some desired pattern including the stimulation vibration pattern and the valves are opening and closing so that the device is always moving in one aspect or another and therefore the pump would not need to be shut off in the design scenarios wherein there was no fluidic capacitor or an inadequate fluidic capacitor, reservoir or pressure relief bypass valve.

Materials

Within the fluidic assemblies, actuators, devices, fluidic valves and fluidic pumps described above in respect of FIGS. 1 through 22, the fluid can be a gas or liquid. Such fluids can be non-toxic to the user in the event of physical failure of the device releasing the fluid as well as being non-corrosive to the materials employed within the device for the different elements in contact with the fluid. Within other embodiments of the invention the fluid can be adjusted in temperature, such as heated for example. For example, the fluid can be a simple salt water (saline) solution or a 50% propylene glycol and 50% water mixture although other ratios can be employed according to the desired viscosity of the liquid. A range of other materials can be employed based upon desired properties of the fluid, which can include, but are not limited to, it being anti-fungal, a lubricant, a lubricant additive, anti-freeze over storage and/or operating range, anti-bacterial, anti-foaming, inhibiting corrosion, non-toxic, and long lifetime within sealed fluidic systems. Examples of such fluids can include, but are not limited to, vegetable oils, mineral oils, silicones, water, and synthetic oils.

In terms of materials for the fabrication of the device a variety of materials can be employed in conjunction with the fluidic actuators including for example closed-cell foam, open-celled foam, polystyrene, expanded polystyrene, extruded polystyrene foam, polyurethane foam, phenolic foams, rubber, latex, jelly-rubber, silicone rubber, elastomers, stainless steel, aluminum, Cyberskin, fabrics, real fur, artificial fur, and plastics. The fluidic actuator in many embodiments of the invention is designed to expand under an increase in pressure (or injection of fluid) and collapse under a decrease in pressure (or extraction of fluid). Accordingly, the fluidic actuator will typically be formed from an elastic material examples of which include rubber, latex, silicone rubber and an elastomer. In some embodiments of the invention the fluidic connections between the fluidic actuator(s) and the fluidic pump and/or valve can be formed from the same material as the fluidic actuator rather than another material. In such instances the fluidic actuator can be formed by reducing the wall thickness of the material. Examples of manufacturing processes include, but are not limited to, dip-coating, blow molding, vacuum molding, thermoforming and injection molding. It would also be evident that multiple actuators can be formed simultaneously within a single process step as a single piece-part. Alternatively multiple discrete actuators can be coupled together directly or via intermediate tubing through processes such as thermal bonding, ultrasonic bonding, mechanical features, adhesives, etc. Similar processes can then be applied to attach the fluidic actuators to the valves, switches, ECPUMP, ECFPA, EAVs etc.

Device Configurations

Figure 24:
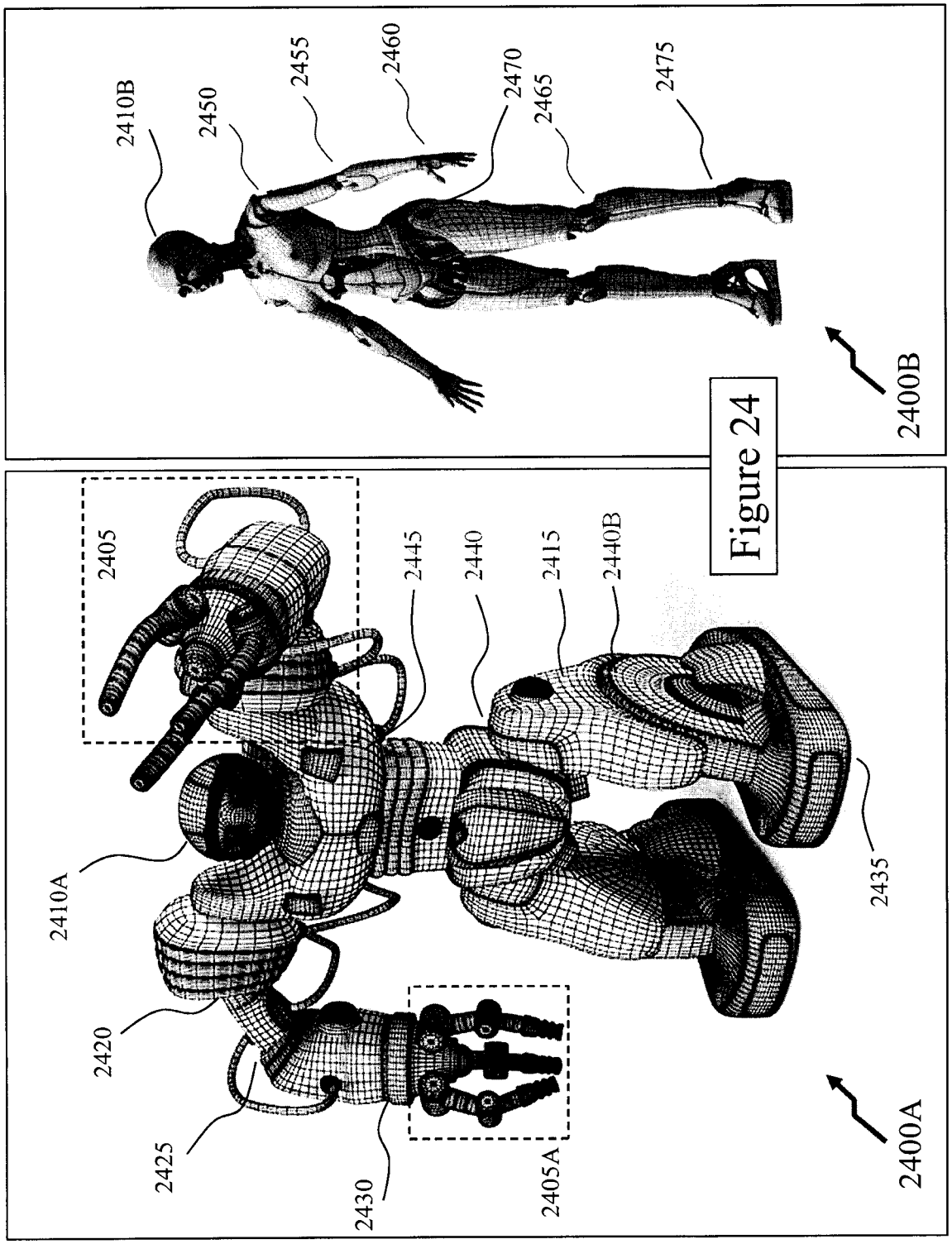
FIG. 24 depicts exemplary figure based toys exploiting fluidic actuators and an ECPUMP according to an embodiment of the invention.

Referring to FIG. 24 there are depicted robot 2400A and android 2400B exploiting one or more fluidic actuators, control systems, etc. such as discussed supra in respect of FIGS. 1 through 23 for use as toys. As depicted robot 2400A has a head 2410A, a body 2435, a pair of legs 2415, a pair of arms 2405, and a pair of feet 2435. Within each arm 2405 are multiple joints, namely shoulder 2420, elbow 2425, and wrist 2430. Within each leg are hip 2440A and knee 2440B. The joints are named after human joints for ease of reference and understanding even though they may function differently as evident with knee 2440B. The plurality of joints within prior art manually manipulated toys would typically be formed by ball-and-socket joints or swivel joints. Accordingly, with swivel joints forced motion out of the intended plane of rotation typically leads to the user breaking the swivel joint. With ball-and-socket joints excess force by the user of the toy leads either to the ball being forced out of the socket or the socket breaking. In the former instance generally the ball may be re-inserted allowing the toy to be "repaired." With motorized toys generally motion is through wheels although pivoting legs and other structures may be implemented but typically with an electrical rotary motor within each joint. As a result such toys tend to be expensive and relatively large. For example the WowWee Robosapiens robot which looks similar to robot 2400A is approximately 34 cm high (13.5"), 32 cm long (12.5"), and 15 cm (6") wide with a weight of approximately 2.25 kg (5 pounds). In a similar manner forcing of a limb or moving element will generally result in gears being broken or damaged and portions of the toy being damaged. In contrast, a fluidic based toy using fluidic actuators within deformable limbs and other structures may be designed to bend in different directions and recover with subsequent actuation of fluidic actuators continuing unimpeded.

Accordingly, using an ECPUMP, for example, within the body 2435 of robot 2400A allows fluidic actuators to be employed for one or more of shoulder 2420, elbow 2425, wrist 2430, hip 2440A, and knee 2440B. Additionally, as discussed below in respect of FIG. 27 animation of the head 2410A may be performed including tilting and turning together with bulging eyes, smiling, opening mouth etc. Further the grippers 2405A may be animated as well as other aspects of the robot 2400 such as bulging muscles. Similarly, a compact fluidic pump would allow fluidic actuators to be provided with smaller more compact toys such as android 2400B wherein head 2410B, shoulders 2450, elbows 2455, wrists 2460, knees 2465, hips 2470 and ankles 2475 may include fluidic actuators in all or a predetermined portion of the joints. Other fluidic actuators may be included within the android 2400B in male, female, or androgynous forms.

Now referring to FIG. 25 there are depicted first to fourth toys 2510 to 2540 respectively, being a stylized bull, a stylized hedgehog, an imaginary creature, and a jack-in-the-box respectively. Considering first toy 2510, the stylized bull, fluidic actuators may be provided to generate animation of the face, lifting of the arms, dimensional adjustments to the horns, and dimensional adjustments to the ears for example. Additionally other features may be provided such as pop-out nostrils, poking out tongue, bumpy body, etc. Similarly with second toy 2520, stylized hedgehog, fluidic actuators may provide similar variations in the toy as well as elongation/contraction of one or more "fingers" or "toes" and the "spines" of the hedgehog. With multiple internal valves the array of "spines" may be controlled in sub-arrays such as the head and back or rows of the back such that varying patterns may be provided acquiring and maintaining the attention of an infant for example. Considering third toy 2530, an imaginary creature, fluidic actuators may be employed to control the size of either both eyes simultaneously or each eye individually, to expand/contract arms or expand/contract teeth within the third toy 2530. Beneficially such fluidic actuators allow for such a third toy to be formed in a manner providing a flexible, grippable toy for a child whilst providing functionality to engage, entertain etc. With fourth toy 2540, the jack-in-the-box, fluidic actuators may control the expansion/contraction of the "spring" as well as aspects of the head attached to the "spring" such as the unfurling or furling of the tongue.

Referring to FIG. 26 there are depicted first to fourth toys 2610 to 2640 respectively, being an armoured car, animated football, spaceship, and robotic arm respectively. Considering first toy 2610, the armoured car, then this may exploit electrical motors for the wheels with fluidic actuated elements such as linear expansion elements to fire the rockets from their launchers, give the first toy an animated face, or varying shaped turret etc. Similarly, second toy 2620 may have fluidic actuators for the eyes, eye lids, arms, fingers, thumbs, as well as portions of the outer surface of the "football." Accordingly, second toy 2620 may react to user touch and handling. Likewise, third toy 2630, the spaceship, may have fluidic actuators that pulse portions of the exterior surface, enlarge/reduce the rearward dome portion and/or create patterns within the rear ring structure. With fourth toy 2640, the robotic arm the connecting members between the base joint and first joint may containing fluidic pathways to drive/control aspects of the other subsequent stages and gripper such that the pump, valves, fluidic reservoirs, etc. are all contained within the base.

Figure 27:
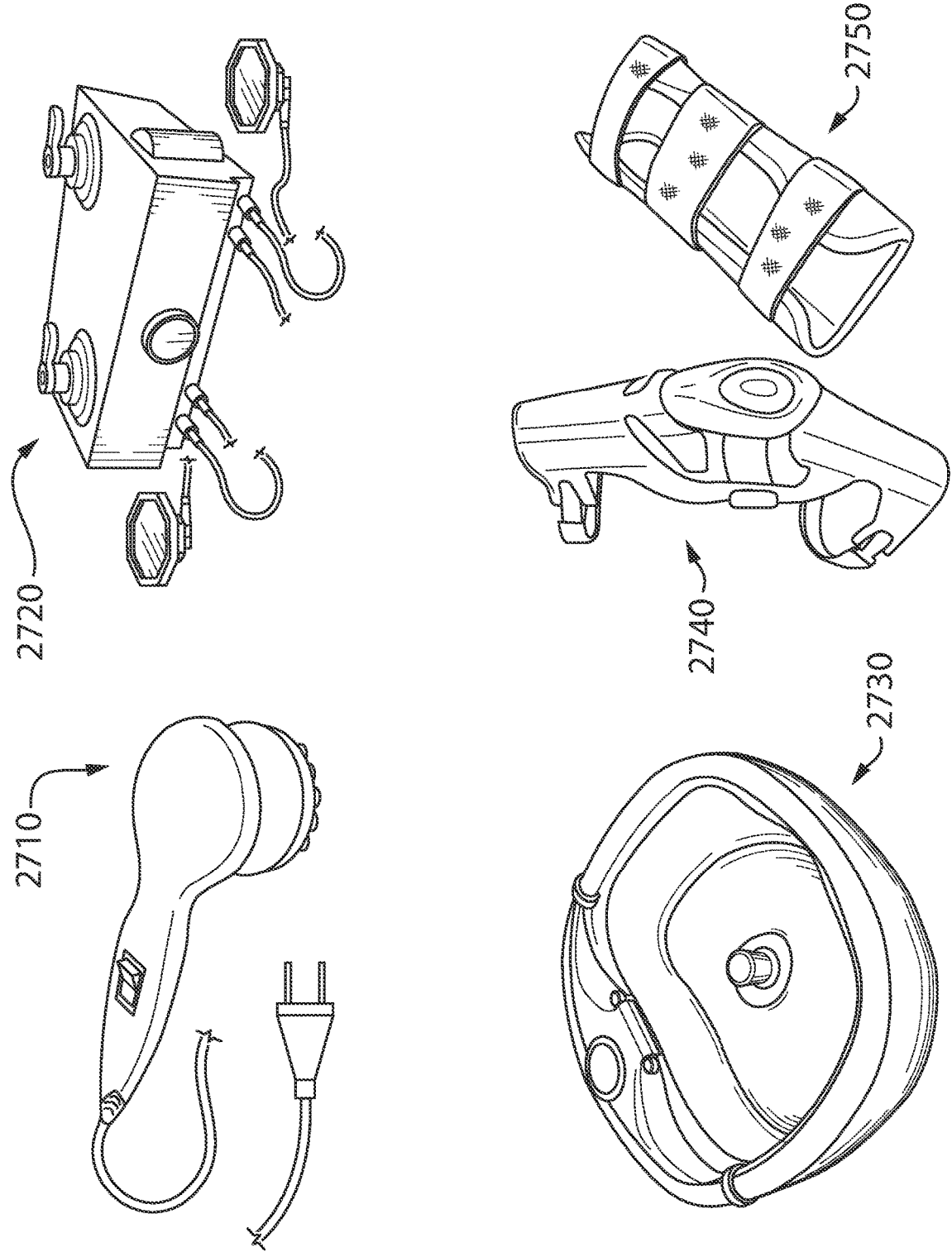
FIG. 27 depicts exemplary massage devices exploiting fluidic actuators and an ECPUMP according to an embodiment of the invention.

Moving away from toys then referring to FIG. 27 there are depicted first to fifth massage devices 2710 to 2750 respectively, being a handheld massager, a tabletop mounted massaging system, a footbath, a knee brace, and wrist brace respectively. Considering first massage device 2710, the handheld massager, then the main handheld body may contain the electric pump whilst the valve assemblies are with the head of the first massage device 2710 in order to control the activation of the multiple massage points with pre-programmed settings or as discussed supra in respect of user configurability etc. the settings may be adjusted, stored, modified and upgraded according to embodiments of the invention. Accordingly, the user may establish a high frequency pulsed pattern for massaging their calf or shoulder for example and a sinusoidally varying lower frequency pattern for their neck, for example. Second massage device 2720, the tabletop mounted unit, comprises a central control unit with four massaging heads wherein each massaging head is, for example, a fluidic actuator based friction element as depicted and described supra in respect of FIG. 2B providing multiple points of pressure with variable profile according to the controller within the central control unit. As depicted the massage heads are coupled via tubing. Third massage device 2730, the footbath, comprises as depicted a plurality of projecting nodes on the floor of the footbath that can be, via a fluidic control system, provide variable pressure, variable pressure profiles of pulse duration, pulse intensity, and frequency, etc. In other variations of third massage device 2730 other actuators such as a fluidic actuator based friction element as depicted and described supra in respect of FIG. 2B or a fluidic actuator based pressure element as depicted and described in respect of FIG. 2A for example. Similarly, the fourth and fifth massage devices 740 and 750 respectively, the knee and wrist braces respectively, may include within the portion against the user's body a plurality of fluidically actuated massaging elements intended to massage the user's body. For example, in the knee brace the massaging elements may work, for example, against the ligaments either side of the patella whilst in the wrist brace the massaging elements may for work, for example, against the flexor muscles.

Figure 28:
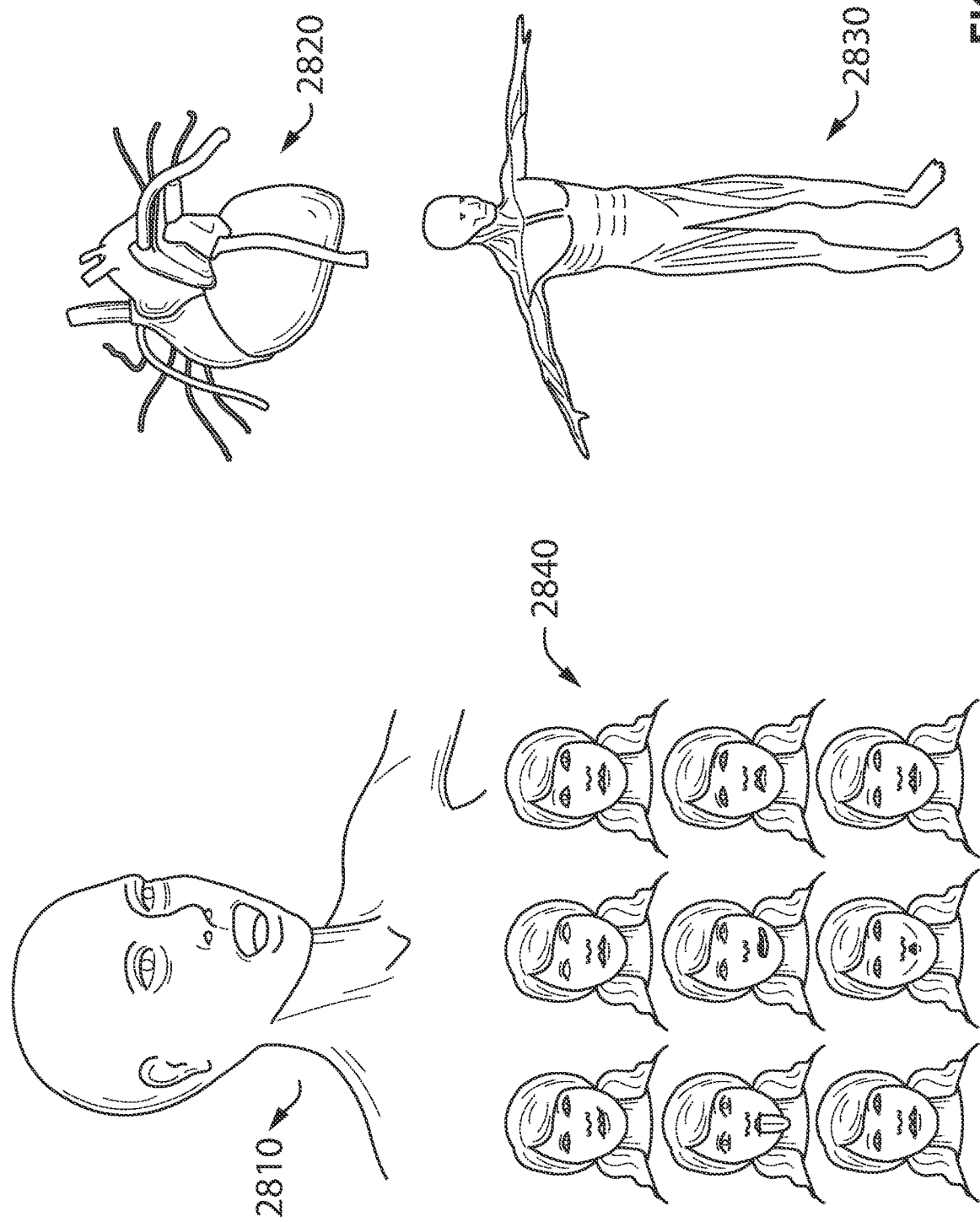
FIG. 28 depicts exemplary facial variations achievable for toys and educational devices exploiting fluidic actuators and an ECPUMP according to an embodiment of the invention.

Referring to FIG. 28 there are depicted first to third anatomical devices 2810 to 2830 respectively. First anatomical device 2810 represents a human head wherein fluidic actuators may be employed to animate the face such as opening/closing the mouth, poking out a tongue, open/closing the eyes, and puffing the cheeks for example. In some embodiments of the invention multiple actuator elements may be coupled to the same valve. Accordingly, a head forming part of a toy or animatronic device may, for example, be animated to produce a range of facial expressions such as those depicted in facial array 2840 or a predetermined subset thereof. Second anatomical device 2820 represents a human heart which through a combination of fluidic actuators may be animated as an educational toy wherein the fluidic actuators may be sequenced to mimic the heart and/or common heart abnormalities. Similarly, third anatomical device 2830 may exploit a combination of fluidic actuators together with elastic elements in order to provide an anatomical educational device.

Referring to FIG. 29 there are depicted there are depicted first to third massage devices 2910 to 2930 respectively, being a combination leg massager, an arm massager, and a calf massager. First massage device 2910 comprises a pair of lower leg/ankle/foot massagers and a pair of upper thigh massagers. Formed from a flexible fabric allowing tensioning manually initially or formed from an elastic material for automatically conforming to the user within each a plurality of fluidic actuators are employed in combination with an external ECPUMP such that through actions of the actuators and associated valves the first massage device 2910 can provide a range of pressure/frequency/duration sequences as well as varying which regions of the user are currently being manipulated/massaged where this can be varied according to a predetermined sequence or based upon user control. Similar to first massage device 2910 the second massage device 2920 provides similar functionality but for the arm of a user whilst third massage device 2930 is intended solely for the calf of the user.

Figure 20A:
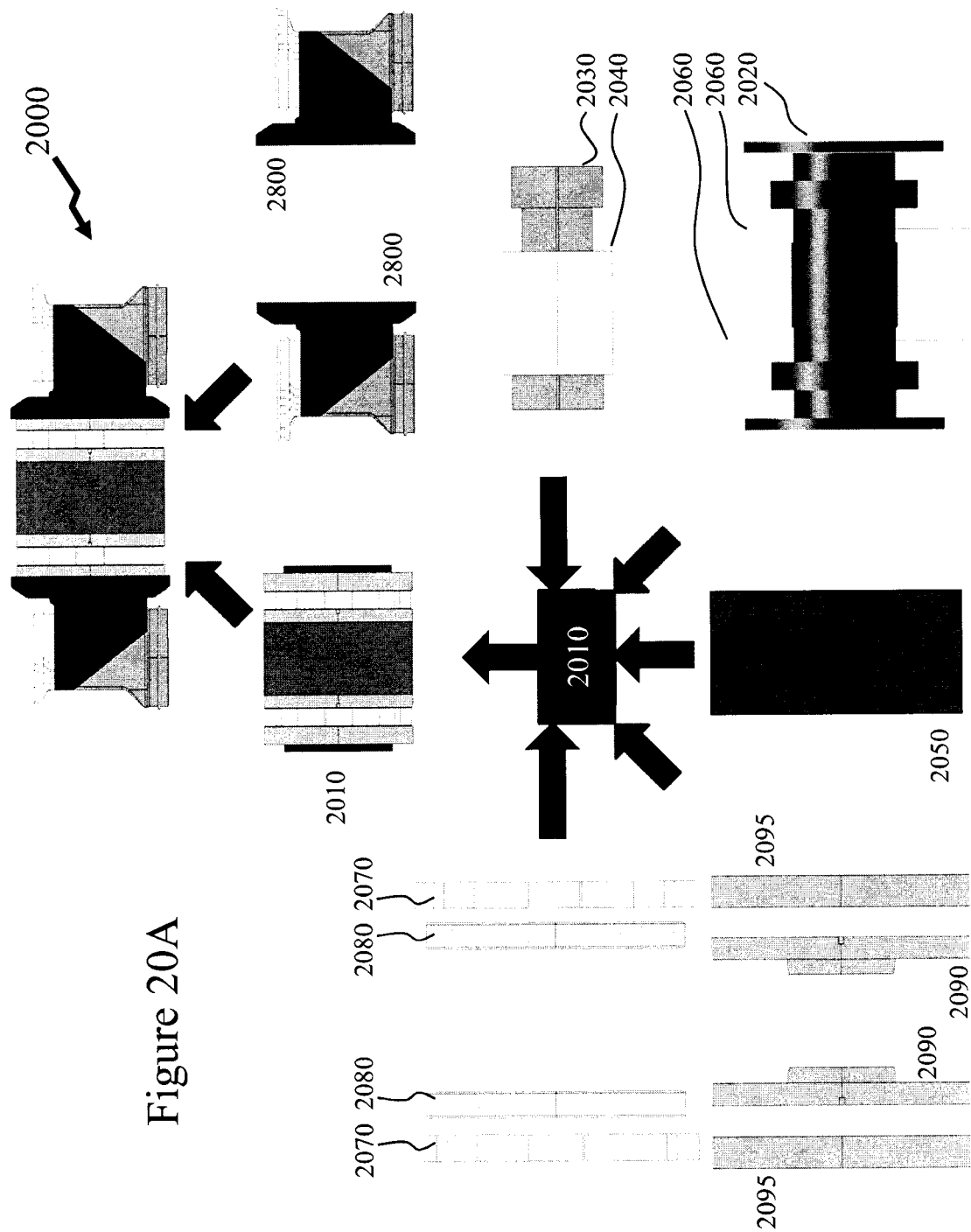
Figure 30:
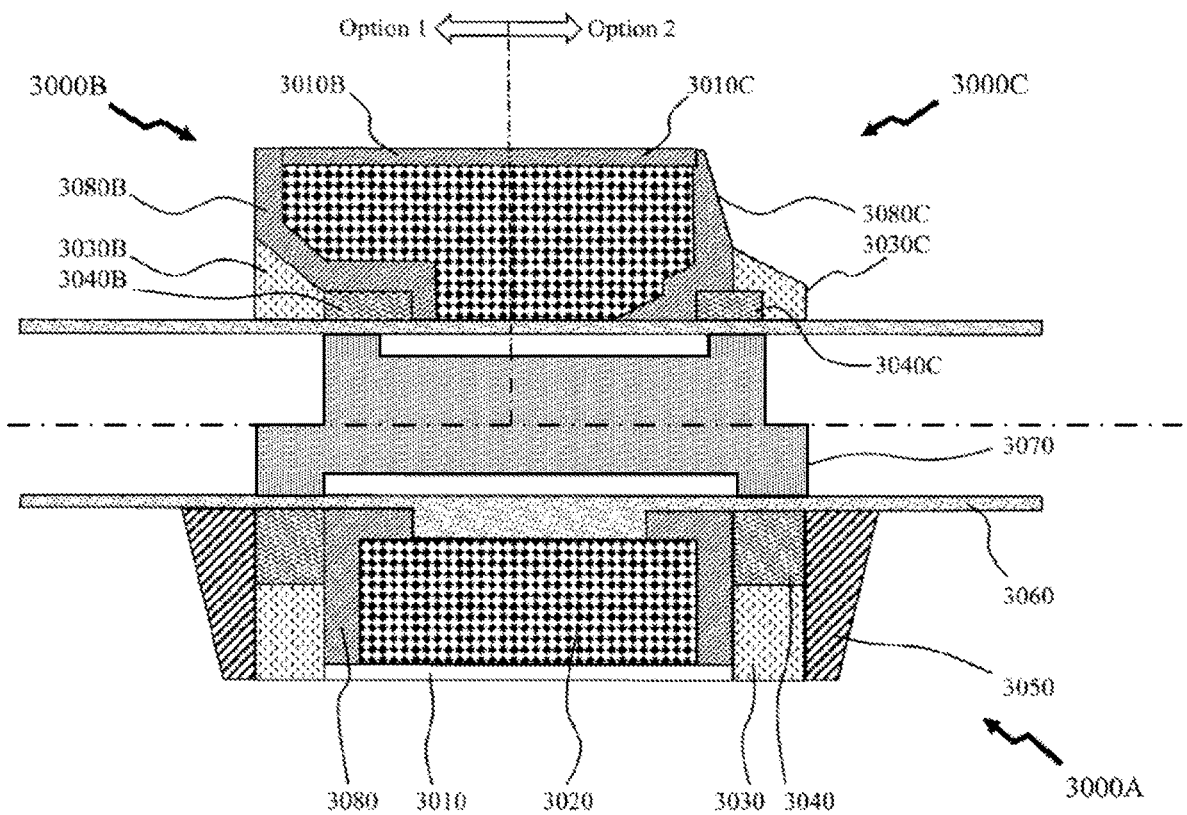
FIG. 30 depicts ECPUMP variants according to embodiments of the invention.

As depicted supra in respect of FIG. 20A an ECPUMP may be formed with relatively low complexity from a piston 2030, a bobbin core 2040, a bobbin case 2050, isolating washers 2060, outer washers 2095, inner washers 2090, magnets 2080 and magnet casings 2070 wherein these are all supported and retained by body sleeve 2020. Accordingly, an ECPUMP may be assembled with relatively low skill requirements using a set of standard parts. Now referring to FIG. 30 an ECPUMP according to an embodiment of the invention is depicted in first cross-section 3000A representing for comparison to design options 1 and 2 in second and third cross-sections 3000B and 3000C. First cross-section 3000A comprises outer body 3010, electromagnet 3020, magnet 3030, spacer 3040, outer washer 3050, bobbin core 3060, piston 3070, and inner washer 3080 with geometries similar to those in FIG. 20A. Accordingly first and second optional variants of such an ECPUMP are depicted in second and third cross-sections 3000B and 3000C respectively. Considering second cross-section 3000B the magnet 3030 has been replaced by magnet 3030B, formed for example by molding, which works in conjunction with soft magnetic material of washer 3080B allowing a shorter piston to be realized and a more compact ECPUMP. The magnet 3030B is now radial and forms in conjunction with washer 3080B a region 3040B which may, for example, be an air space or plastic, such as being molded as part of the core 3060.

In third cross-section 3000C the washer 3080C is simplified and magnet 3030C shaped to provide in conjunction with washer 3080C a region 3040C which may, for example, be an air space or plastic, such as being molded as part of the core 3060. As evident in third cross-section 3000C the wire wound electromagnetic core of the ECPUMP is now formed between the support 3030C and bobbin core 3060. This option 2 design now increases the coil area relative to option 1 whilst reducing the length of the piston and removing the requirement for an outside washer. The outer casing for the coil in each of second and third cross-sections 3000B and 3000C is depicted as soft magnetic material 3010B and 3010C respectively which may for example be sintered magnetic composite (SMC) material. SMC being an epoxy bonded powdered iron composite material capable of being molded and cured into a variety of complex and/or simple shapes offering good electrical insulating properties in conjunction with good magnetic flux handling capabilities.

Figure 31:
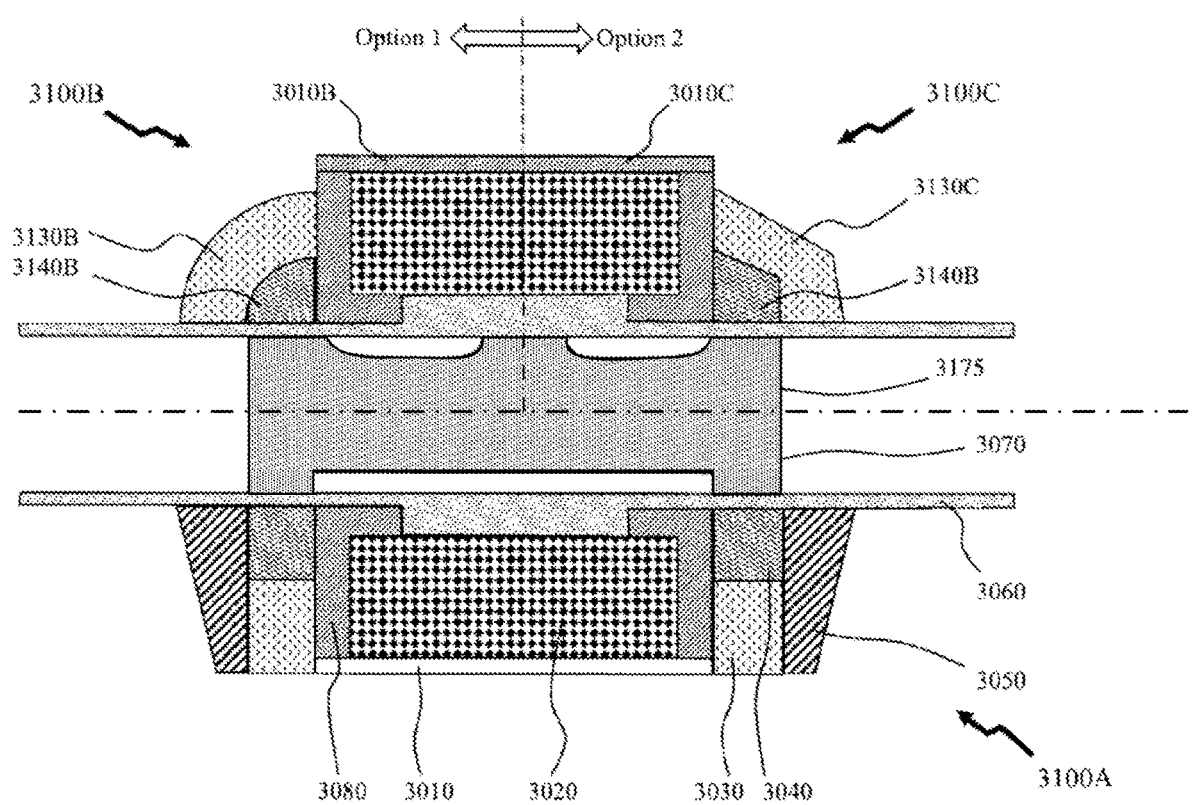
FIG. 31 depicts ECPUMP variants according to embodiments of the invention.

Now referring to FIG. 31 an ECPUMP according to an embodiment of the invention is depicted in first cross-section 3100A representing for comparison to design options 1 and 2 in second and third cross-sections 3100B and 3100C. As with FIG. 30 the first cross-section 3100A represents a standard geometry comprising outer body 3010, electromagnet 3020, magnet 3030, spacer 3040, outer washer 3050, bobbin core 3060, piston 3070, and inner washer 3080 with geometries similar to those in FIG. 20A. First and second optional variants 1 and 2 of such an ECPUMP are depicted in second and third cross-sections 3100B and 3100C respectively. Considering second cross-section 3100B the magnet 3030 and outer washer 3050 have been replaced by neodymium magnet 3130B. Spacer material 3140B, for example plastic or an air gap, may be formed separately to the neodymium magnet 3130B is thereby formed. Accordingly, the piston in second cross-section 3100B is now aligned with the air gap at its mid-stroke position. A variant of such a configuration is depicted in third cross-section 3100C with profiled neodymium magnet 3130C and spacer material 3140C, for example air or plastic. As such third cross-section 3100C depicts an ECPUMP design wherein the piston is again aligned with the air/plastic of spacer material 3040C but now does not require an outside washer as the neodymium magnet 3130C does both jobs. Additionally, as depicted in second and third cross-sections 3100B and 3100C respectively the piston may be modified from constant diameter piston 3070 to a contoured piston 3175 having profiled outer diameter versus longitudinal position. The outer casing for the coil in each of second and third cross-sections 3000B and 3000C is depicted as soft magnetic material 3010B and 3010C respectively which may for example be sintered magnetic composite (SMC) material.

Figure 32A:
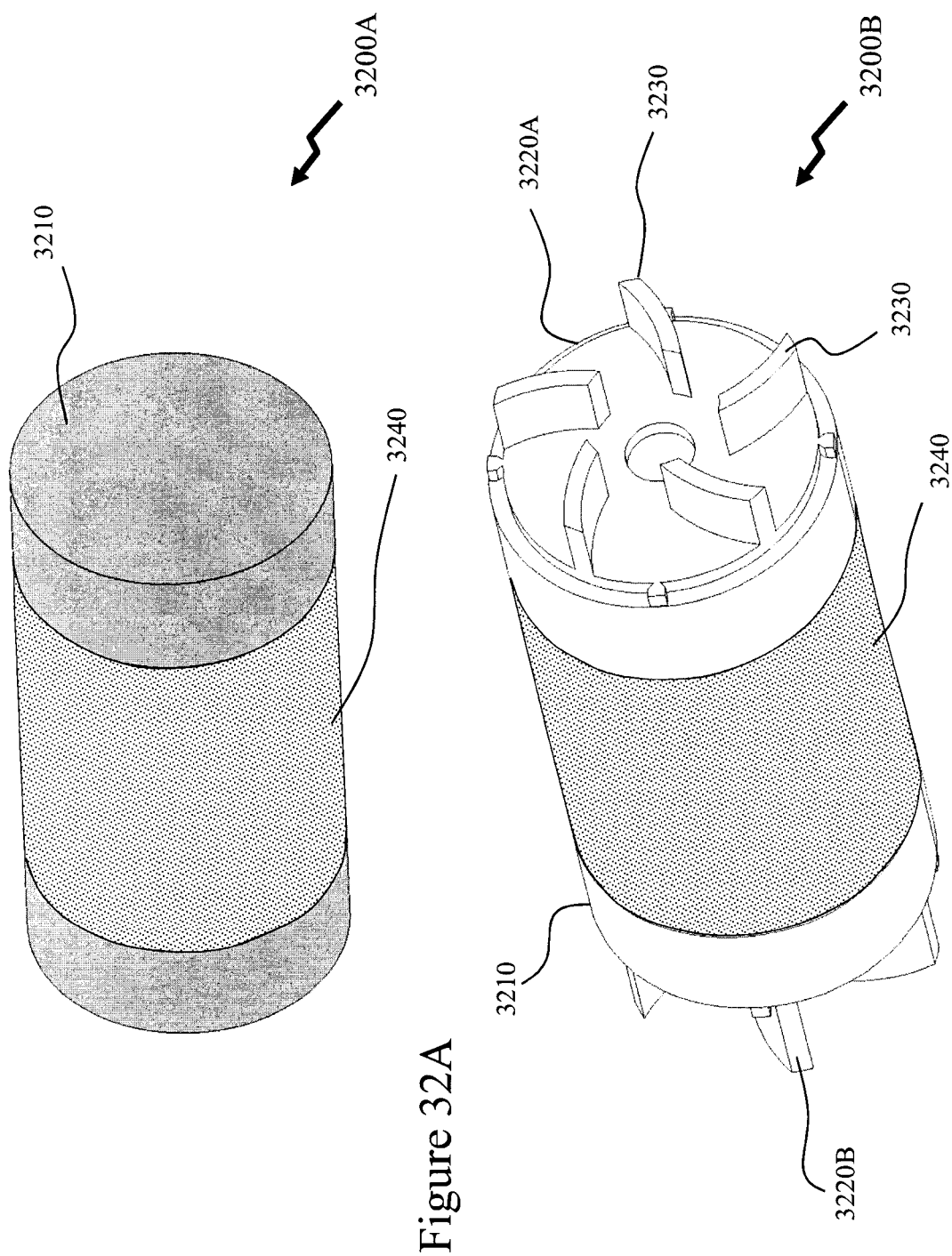
FIG. 32A depicts the application of vanes to the piston on an ECPUMP according to an embodiment of the invention.

Referring to FIG. 32A there is depicted a first piston 3100 being a standard piston 3210 with first and second ends and a typically smaller diameter connecting body, not shown for clarity, between the first and second ends. The resulting region between the first and second ends and smaller diameter connecting body is filled with plastic 3240 such that the bearing surface of the piston is primarily plastic rather than metal. Optionally, the first piston 3100 may be employed without the plastic 3240.

Also depicted second piston 3200B comprising a piston 3210 together with first and second vane arrays 3220A and 3220B. Each of the first and second vane arrays 3220A and 3220B comprises a plurality of vanes 3230 such that during motion of the second piston 3200 the vanes 3230 result in a rotary motion being applied to the second piston 3200 which enhances the alignment of the second piston 3200 within the ECPUMP and the ability to exploit rotational induced effects to maintain piston positioning within the center of the ECPUMP. As with first piston 3100 the first and second ends of the piston 3210 are joined by a typically smaller diameter connecting body, not shown for clarity, between the first and second ends. The resulting region between the first and second ends and smaller diameter connecting body is filled with plastic 3240 such that the bearing surface of the piston is primarily plastic rather than metal. Optionally, the surfaces of the piston towards the each of the ends may be tapered/chamfered in order to generate hydrodynamic lubrication arising from the linear motion of the piston, see the inventor in U.S. patent application Ser. No. 14/037,581 entitled "FLUIDIC METHODS AND DEVICES" filed Sep. 26, 2013. This linearly induced hydrodynamic lift may act alone or in conjunction with rotary motion induced hydrodynamic lift or vice-versa. Accordingly, the rotary flow produced from the swirl jets 3250 described below in respect of FIG. 32B together with the vanes provides rotational motion which in combination with a profiled and/or chamfered wedge profile of the piston ends generates hydrodynamic lift to float the piston within the bore of the ECPUMP.

Figure 32B:
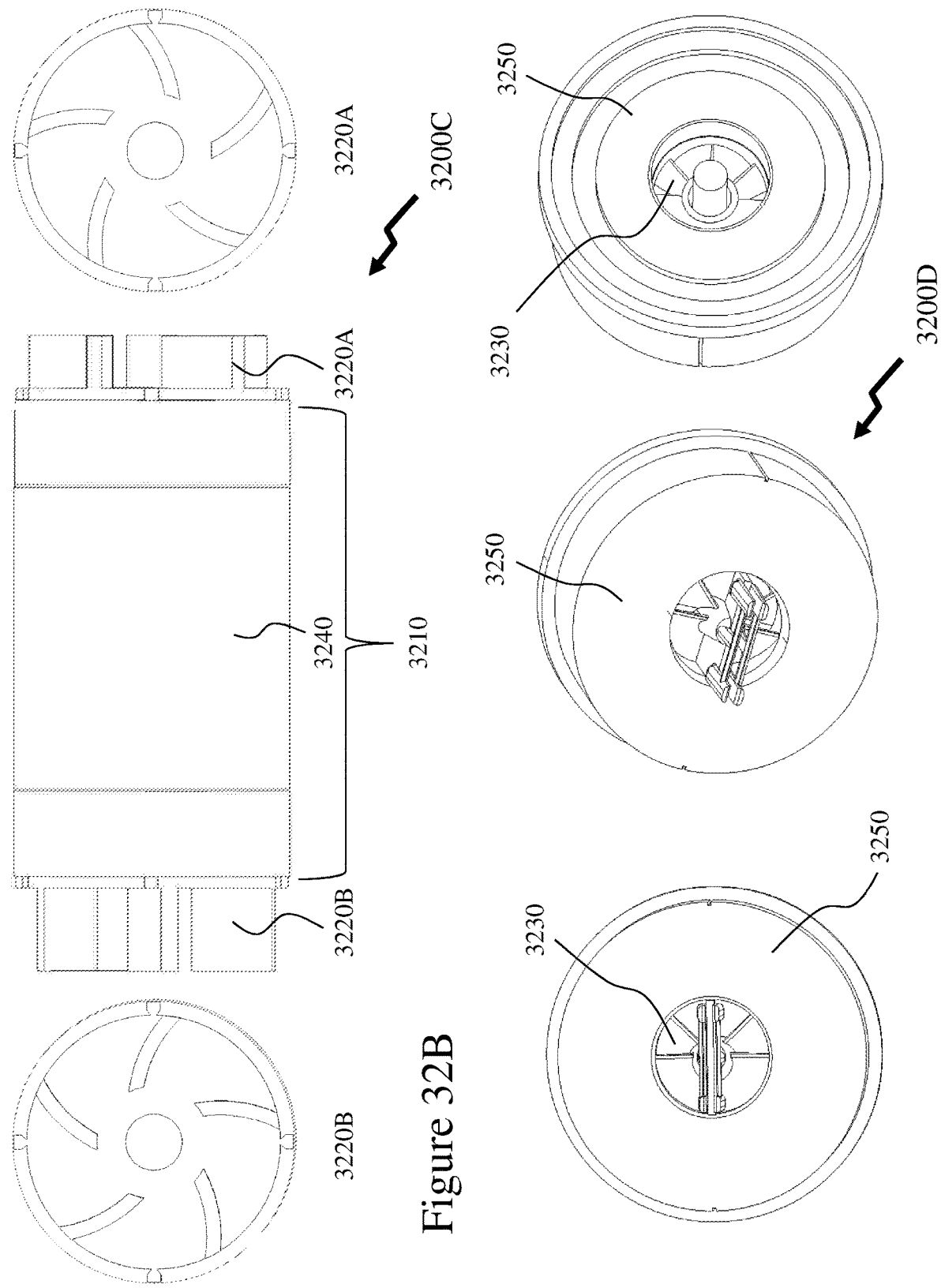
FIG. 32B depicts the application of jet features that induce swirling of the fluid between the piston ends and cylinder heads of the ECPUMP according to an embodiment of the invention.

Now referring to FIG. 32B there is depicted in first image 3200C the second piston 3200B is depicted comprising piston 3210, plastic 3240, and first and second vane arrays 3220A and 3220B as described supra in respect of FIG. 32A. Also shown are left and right hand sided end elevations showing each of the first and second vane arrays 3220A and 3220B respectively wherein it is evident that the direction of the vanes is opposite on either end so that the rotary motion of the second piston 3200 is maintained under motion of the piston in either direction and the swirl jet(s) 3250 depicted in second image 3200D applied to one or both ends of the ECPUMP between the second piston 3200 and the cylinder head or heads. As fluid flows into the ECPUMP bore the vanes 3230 within central region of the swirl jet 3250 create an initial swirling motion to the fluid within the region between the cylinder head and the respective vane array thereby generating rotational momentum to the second piston 3200B. Accordingly, this rotational momentum results in rotary motion of the second piston 3200B leading to increased hydrodynamic pressure between the piston and bore under the appropriate conditions thereby generating radial force to position the piston within the bore thereby reducing drag/friction. It would be evident that a swirl jet 3250 may be provided on each of the inlet and outlet ports of each cylinder head on each end of the ECPUMP.

According to a variant of the design depicted in FIGS. 32A and 32B respectively only one swirl jet may be provided per cylinder head. Accordingly, when the fluid enters the piston chamber (intake stroke) it is swirled by the swirl jet and hits the vanes of the vane array and turns the piston during which time the other end of the piston is on the output stroke during this time. When the stroke reverses and fluid leaves the piston chamber and heads toward the outlet one-way valve, there could be no swirl jet (or as inventors refer to the combination of vane array and jet elements with the bore/cylinder head, no swirl chamber) as the fluid would already be swirling because the piston is always spinning and accordingly the fluid flows. Optionally, this could be reversed to the other end of the piston. Even if there is only an inlet swirl jet (no outlet swirl jet) the piston will be drive to spin from the left end when piston is going left to right, and piston will be driven to spin by the right turbine when the piston is going right to left. If swirl jets are not needed at each end of the piston during both the inlet and outlet strokes, as this does absorb energy because the swirl is a restriction to flow, in order to spin the piston adequately then in some designs only 1 swirl jet per end will lead to increased maximum efficiency. Optionally, a swirl jet may on the inlet at one end and the outlet on the other end.

Figure 33:
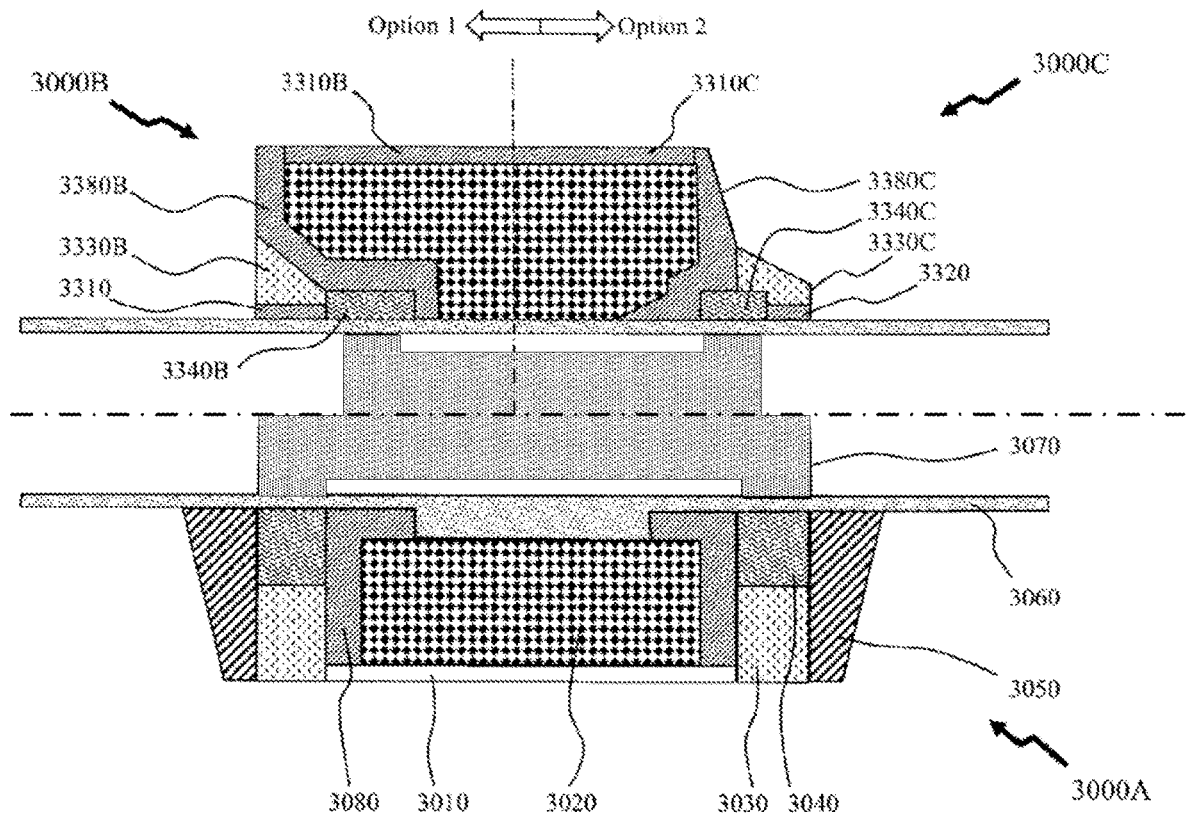
FIG. 33 depicts ECPUMP variants according to embodiments of the invention.

Now referring to FIG. 33 an ECPUMP according to an embodiment of the invention is depicted in first cross-section 3300A representing for comparison to design options 1 and 2 in second and third cross-sections 3300B and 3300C. As with FIGS. 30 and 31 the first cross-section 3100C represents a standard geometry comprising outer body 3010, electromagnet 3020, magnet 3030, spacer 3040, outer washer 3050, bobbin core 3060, piston 3070, and inner washer 3080 with geometries similar to those in FIG. 20A. Considering second cross-section 3300B the magnet 3030 has been replaced by a neodymium magnet 3330B and the outer washer 3050 eliminated. The outer body of the electromagnet is now shaped body 3380B formed from a soft magnetic material such as steel or SMC for example. Between the neodymium magnet 3330B and core 3060 is a ring 3310 of soft magnetic material such as steel or SMC, for example, to conduct the magnetic flux to the "tooth" of the end of the piston, this being end of the piston having a diameter close to that of the core 3060. A spacer material 3340B, for example plastic or an air gap, is disposed radially between the shaped body 3380B and core 3060 whilst longitudinally it is disposed between the neodymium magnet 3330B/ring 3310 and shaped body 3380B.

Similarly, considering the design variant of such a configuration in third cross-section 3100C the design eliminates the outer washer 3050, employs a shaped body 3380C, an outer neodymium magnet 3330C and ring 3320 of soft magnetic material. A spacer material 3340C, for example plastic or an air gap, is similarly disposed radially between the shaped body 3380C and core 3060 whilst longitudinally it is disposed between the neodymium magnet 3330C/ring 3320 and shaped body 3380C.

In each instance of the options 1 and 2 depicted in second and third cross-sections 3300B and 3300C the outer casing for the coil in each soft magnetic material 3310B and 3310C respectively which may for example be sintered magnetic composite (SMC) material. Accordingly, the options 1 and 2 depicted in second and third cross-sections 3300B and 3300C provide for a cost reduction for each of the respective ECPUMP designs as now SMC may be employed providing for an electrically isolating body with good magnetic properties.

Whilst emphasis has been made to self-contained discrete devices it would be evident that according to other embodiments of the invention that the device can be separated into multiple units, such as for example a pump assembly with device coupled to the pump assembly via a flexible tube which can be tens of centimeters, a meter or a few meters long. In other embodiments a very short tube can be employed to isolate the pump assembly from the remainder of the device or as part of a flexible portion of the body allowing user adjustment such as arc of their knee, elbow, calf, etc. It would also be evident that devices according to embodiments of the invention can be configured to be held during use; fitted to a harness; fitted via an attachment to a part of the user's body or another user's body, e.g., hand, thigh, or foot; or fitted via a suction cup or other mounting means to a physical object such as a wall, floor, or table.

Within embodiments of the invention with respect to devices and the electronic control the descriptions supra in respect of the Figures have described electrical power as being derived from batteries, either standard replaceable (consumable) designs such as alkaline, zinc-carbon, and lithium iron sulphide (LiFeS$_2$) types, or rechargeable designs such as nickel cadmium (NiCd or Nicad), nickel zinc, and nickel-metal hydride (NiMH). Typically, such batteries are AAA or AA although other battery formats including, but not limited to, C, D, and PP3. Accordingly, such devices would be self-contained with electrical power source, controller, pump(s), valve(s) and actuator(s) all formed within the same body. It would be evident that fluidic pumps, electronic controller, and fluidic valves are preferably low power, high efficiency designs when considering battery driven operation although electrical main connections can ease such design limits. For example, considering a device where the operating pressure for fluidic actuators is approximately 2-6 psi with flow rates of approximately for typical geometries and efficiencies then power consumption is approximately 3 W. Considering one 3.7V Li-ion rechargeable battery with 1 Amp-hour capacity then this offers approximately 3.7 W power provisioning. Other devices may include multiple batteries including those according to standards such as A, AA, AAA, C, and D for example. Additionally, different batteries may be combined with different pumps or these can be combined can be implemented within the device. Other devices may include those exploiting solar charging for example.

However, alternate embodiments of devices can be configured to include a power cord and be powered directly from the electrical mains via a transformer. Optionally, a device can be configured with battery and electrical mains connections via a small electrical connector with a cord to a remote transformer and therein a power plug. However, it would also be evident that other embodiments of the invention can be configured to house a predetermined portion of the pump(s), valve(s), power supply, and control electronics within a separate module to that containing the fluidic actuators.

With the embodiments of the invention described supra in respect of FIGS. 1 through 33 pressures of operation etc. have been discussed in respect of balloons, pumps, etc. A figure of 7 PSI is employed in some of these descriptions. It would be evident to one skilled in the art that pressures higher and lower than these may be employed by the appropriate design of the elements within the fluidic system. In some instances, pressures may be significantly higher, e.g. 20 PSI, for devices such as deep tissue massagers for example. However, such changes are typically easy to implement for the ECPUMP due to through reduction/enlargement in the diameter of the piston for example.

Within embodiments of the invention to devices and the electronic control the descriptions supra in respect of the Figures the electrical control has been described as being within the device. However, optionally the controller can be remote to the device either connected via an electrical cable or communicating via an indirect means such as wireless communications for example. Additionally, the electronic controller has been primarily described as providing control signals to the fluidic pumps and valves, as well as other active elements, of the device. However, in some embodiments of the invention the electronic controller can receive inputs from sensors embedded within the device or external to the device. For example, a sensor can provide an output in dependence upon pressure applied to that portion of the device the user, for example from vaginal contractions, wherein the controller can adjust one or more aspects of the device actions in terms of maximum pressure, speed, slew rate, and extension for example. Optionally, other sensors can be internally deployed within the device to monitor the performance of the device, including for example, linear transducers to monitor length extension, pressure sensors to monitor fluid pressure at predetermined points within the device.

Within the descriptions presented supra in respect of FIGS. 1 through 23 that reference has been made to specific embodiments of fluidic actuators, valves, switches, ECPUMPs, ECFPAs, EAVs etc. Whilst these embodiments represent solutions providing compact low power devices with a range of motions and/or actions according to the particular combinations of fluidic actuators, valves, switches, ECPUMPs, ECFPAs, EAVs etc. it would be evident that one or more of these elements including, but not limited to, the fluidic actuators, valves, switches, ECPUMPs, ECFPAs, and EAVs may also be implemented with alternative technologies and component, sub-assembly and assembly designs without departing from the scope of the invention.

It would be evident from the descriptions supra in respect of embodiments of the invention in FIGS. 1 to 33 that fluidic actuators in combination with fluidic pumps such as ECPUMPs can provide movement within small spaces, can provide increased functionality with reduced complexity, and can be scaled from small compact assemblies within children's toys for example through to fluid systems for an adult's limbs. These compact assemblies can be deployed within spaces that are too small for conventional prior art motors with gears, levers, etc. Further a single power plant, e.g. fluidic pump, can power multiple separate elements within the devices that are only connected by one or more flexible hoses that may be small diameter or sized appropriate to the function and feature variation being induced through the fluidic actuator. In this manner devices such as toys may be formed with motive features within structures that are themselves flexible or are connected to the remainder of the toy via flexible members. Similarly, in larger devices these can be manipulated to fit a user or rolled, flattened, etc. without damaging the "power chain" as the flexible hoses move with the skin and/or body of the device.

Additionally, fluidic systems provide additional advantages including, but not limited to:
  moving component is soft and flexible unlike mechanical systems;
  high pressures/tensions etc. together with large forces can be developed through hydraulic principles exploiting leverage;
  very thin aspect ratios are possible that are not possible with many mechanical systems;
  motive action can be simply provided in a distributed manner without complex linkages an mechanical assemblies;
  liquid based fluidic systems are generally better than gas based fluidic systems as no heat developed from compression of gas, enhanced positive displacement with liquids, and higher energy transmission is possible with equivalent volume; and
  liquid based fluidic pumping and balloon actuation is quiet compared to air pumps and air lines, balloons.

It would also be evident that the hydraulic actuators including, but not limited to, those providing torque, linear dimension adjustment, diameter expansion, increased surface area, leverage, twist, rotate, curve, bending etc. may be combined with mechanical systems including, but not limited to, mechanical levers, actuators, push/pull rods, gears, pivots, hinges, wedges, etc. Additional benefit is derived from the fact that fluidic motion can be designed to produce faster or slower motion than a similarly sized and costed mechanical system. Further, fluidic actuators can be designed to be less expensive in mass production than mechanical system equivalents as the balloons, tubes, etc. can be directly formed within the body of a device during its manufacture as well as exploiting lower cost manufacturing techniques. Additionally fluidic systems offer increased reliability as the number of moving parts is typically only one moving part in a fluidic pump and a single moving part in the actuator control valve.

Within massage device applications these devices can deigned for specific applications for all body parts, for example, neck, shoulders, upper and fore arm, thigh and calf, etc. or due to the flexible nature of the overall device be more general where a device may be applied to multiple body parts. Additionally, the fluid may be directly heated, cooled, or refrigerated prior to distribution rather than requiring multiple distributed heaters, coolers, etc. Such devices may be battery and/or mains powered. Within toys type applications for children or pets then elements of the toy can vary, e.g. swelling of a super hero's muscles etc., or balloon filling can cause movement for toy motion purposes, or a balloon swelling can be used just for visual or tactile purpose such that the toy could change shape by displacing fluid from one location to another or from an internal storage element such that eye balls swell, eye brows change, lips pucker, and ears wiggle for example. Further based upon the actuators implemented and the presence/absence of friction elements etc. can result in motions such as crawling, swimming, jumping, "inch worming", snaking, rolling, running, walking, as well as arm waving, throwing, facial expressions, body posture or pose changes, dancing, imitation of any action of an animal or human, etc. In addition to vibration and pressure massager actions can include rippling, kneading, progressive squeezing, stroking, and other massage motions.

Beneficially massager based devices could provide the same pressure, speed, and motions as a human massage specialist but does not tire, weaken, loose interest, booking, etc. and has reducing cost of ownership with time versus an increasing cost overall due to cost $/hour service provision. Beneficially, such fluidic based massagers are portable and can be used in a wide variety of locations at any time and any place plus can apply hot and/or cold cycles or other features like vibration etc. while massaging so that overall long and complex routines can be specifically designed to work specific muscles beyond human capability of control, repetition rate, consistency, complexity. Within medical environments and/or elderly care environments these also allow the benefits of massage therapy to be provided to all rather than a select few. Massage devices can also be provided that cover more surface area simultaneously than can be kneaded by a pair of hands or provide pressure points equivalent to dozens of fingers or provide manipulations that physically cannot be provided by a human.

Within other devices, e.g. a ball containing multiple balloons located inside the ball close to its surface with the pump being central, for example, then the ball could be made to roll and change directions, back up, start/stop with this all being apparently achieved "All By Its Self" based upon controlling the distribution of the fluid within the balloons within ball." Accordingly, fluidics can be used as a portable mass, the location of which can be changed and controlled in order to effect a change of a toys balance point, its centre of gravity etc. A toy could stand there and then fall over "All By Its Self" in response to a user action, a sound, a command from another toy or game, etc. or alternatively the toy can be made to wobble or not when it rolls, curve like lawn bowling curve ball effect. Equally variations of the centre of gravity can be used, for example, for manipulating a board game central figure, in games of chance, in games of reflexes or coordination, and skill games. Whilst pet toys would generally require a puncture proof flexible sheath over the surface of the device or specifically the fluidic elements in order to prevent tooth punctures they can exploit many of the same effects and actions as well as combining them with sensor feedbacks such as does the pet move, make a noise, or does it react to a visible signal, e.g. a laser pointer spot.

For toy devices exploiting embodiments of the invention then these may, when impacted, held, squeezed, restrained, in the dark or light, hot or cold, shaken, still, tilted, pulled, pushed, quiet, loud, or another measurable condition, generate specific responses based upon the programming of the controller. Similarly, a controller may trigger specific timed programs in response to triggers or control inputs. For massage devices, these could, for example, be a timed program of many selectable, user adjustable, and/or sensor based feedbacks to effect control of massage.

For massaging devices the fluidic actuators and fluidic systems can be combined with other output devices, heaters, coolers, audio, mechanical vibrators, electro-stimulators for transcutaneous electrical nerve stimulation (TENS), lights, ultrasonic vibrations, or other muscle healing or deep tissue, or skin level treatments, e.g. ultraviolet, infrared, etc., including compression, vacuum, tension, friction. According, massage devices according to embodiments of the invention can be employed to provider Swedish massage therapy, aromatherapy massage with integral oil dispensers in addition to the other fluidic systems, hot stone massage by providing localized heat, deep tissue massage, Shiatsu, Thai, reflexology. Beneficially, such massages can be now provided wherever the user is and in fact whilst they are undertaking other activities such as working, walking, sitting at home, sleeping etc.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments can be described as a process, which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The foregoing disclosure of the embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A reciprocating fluidic pump comprising:
   a bobbin core having a body defining a bore along a longitudinal axis of the bobbin core;
   a piston disposed within the bore of the bobbin core; and
   an electromagnetic coil surrounding a portion of the bobbin core and providing an electromagnetic force to move the piston within the bobbin core when an electrical current is supplied to the coil;
   first and second inner washers formed from magnetic material, each arranged adjacent to the coil at respective first and second ends of the coil;
   first and second magnets each arranged at a respective one of the first and second ends of the coil and adjacent to respective ones of the first and second inner washers;
   a pair of outer washers formed from magnetic material, each arranged at opposite ends of the coil and adjacent to respective magnets;
   an outer body surrounding the coil and in contact with each of the pair of inner washers, the outer body formed from a magnetic material; and
   first and second cylinder heads each arranged on opposite ends of the bobbin core and comprising a one-way inlet port and a one-way outlet port, wherein during a cycle of the reciprocating piston the fluid is sucked in through the one-way inlet port and expelled out of the one-way outlet port of the same cylinder head,
   wherein the piston reciprocates between:
      a first extent of a reciprocating stroke in which a first end of the piston is arranged adjacent to the first inner washer and a second end of the piston opposite the first end of the piston is arranged adjacent to the second outer washer; and
      a second extent of the reciprocating stroke in which the first end of the piston is arranged adjacent to the second inner washer and the second end of the piston is arranged adjacent to the first outer washer, and
   the reciprocating motion of the piston causes a fluid to be sucked into and pumped out of respective ends of the bobbin core.

2. The reciprocating fluidic pump according to claim 1, further comprising:
   a pair of spacer regions, each spacer region defining a region adjacent to the bobbin core at a first predetermined position relative to a midpoint of the electromagnetic coil along the longitudinal axis of the bobbin core enclosed by the electromagnetic coil, the bobbin core, an inner washer of the first and second inner washers, and a magnet of the first and second magnets;
   wherein each of the inner washers comprises:
      a first portion adjacent to an end of the electromagnetic coil;
      a second portion disposed around the spacer region of the pair of spacer regions at that end of the electromagnetic coil; and
      a third portion disposed around the magnet of the of first and second magnets at that end of the electromagnetic coil.

3. The reciprocating fluidic pump according to claim 2, wherein at least one of:
   each magnet of the first and second magnets fits completely within a region formed between an inner washer of the first and second inner washers and the bobbin core;
   each end of the piston when it is aligned within the bore of the bobbin core to the midpoint of the electromagnetic coil does not project beyond a point along the longitudinal axis of the bore of the bobbin bore defined by an inner edge of the magnet of the first and second magnets at that end of the pump towards the midpoint of the electromagnetic coil; and
   the spacer region is formed from air or a plastic.

4. The reciprocating fluidic pump according to claim 1, further comprising:
   a pair of spacer regions, each spacer region defining a region adjacent to the bobbin core at a first predetermined position relative to a midpoint of the electromagnetic coil along the longitudinal axis of the bobbin core enclosed by the electromagnetic coil, the bobbin core, an inner washer of the first and second inner washers, and a magnet of the first and second magnets;
   wherein each of the inner washers includes:
      a first portion adjacent to an end of the electromagnetic coil; and
      a second portion disposed around a first predetermined portion of the spacer region of the pair of spacer regions at that end of the electromagnetic coil; and
   wherein each magnet is disposed around the remainder of the spacer region of the pair of spacer regions at that end of the electromagnetic coil.

5. The reciprocating fluidic pump according to claim 4, wherein at least one of:
   each magnet of the first and second magnets is completely outside the inner washer of the first and second inner washers it is adjacent to;
   each end of the piston when it is aligned within the bore of the bobbin core to the midpoint of the electromagnetic coil does not project beyond a point along the longitudinal axis of the bore of the bobbin bore defined by an inner edge of the magnet of the first and second magnets at that end of the pump towards the midpoint of the electromagnetic coil; and
   the spacer region is formed from air or a plastic.

6. The reciprocating fluidic pump according to claim 1, further comprising:
   a pair of spacer regions, each spacer region defining a region adjacent to the bobbin core at a first predetermined position relative to a midpoint of the electromagnetic coil along the longitudinal axis of the bobbin core enclosed by the bobbin core and a magnet of the first and second magnets;

wherein each of the inner washers includes:
a first portion adjacent to an end of the electromagnetic coil; and
a second portion disposed between the electromagnetic coil and the bobbin core towards the midpoint of the electromagnetic coil; and
wherein each magnet includes a first internal surface towards the midpoint of the electromagnetic coil enclosing the spacer region of the pair of spacer regions at the end of the electromagnetic coil it is disposed at and a second external surface.

7. The reciprocating fluidic pump according to claim 6, wherein at least one of:
each magnet of the first and second magnets is completely outside the inner washer of the first and second inner washers it is adjacent to;
each end of the piston when it is aligned within the bore of the bobbin core to the midpoint of the electromagnetic coil does not project beyond a point along the longitudinal axis of the bore of the bobbin bore defined by the extent of the spacer region of the pair of spacer regions along the longitudinal axis of the bore of the bobbin core at the end of the electromagnetic coil it is disposed at; and
the spacer region is formed from air or a plastic.

8. The reciprocating fluidic pump according to claim 6, wherein at least one of:
the first internal surface is a predetermined portion of a sphere;
the piston includes a first end, a second end, and a central portion wherein a first lateral dimension of the piston between the first end and the central portion is narrower than each of the first end and the central portion and a second lateral dimension of the piston between the second end and the central portion is narrower than each of the second end and the central portion.

9. The reciprocating fluidic pump according to claim 1, further comprising:
a pair of spacer regions, each spacer region defining a region adjacent to the bobbin core at a first predetermined position relative to a midpoint of the electromagnetic coil along the longitudinal axis of the bobbin core enclosed by the electromagnetic coil, the bobbin core, an inner washer of the first and second inner washers, a ring of a pair of rings, and a magnet of the first and second magnets;
wherein each of the inner washers includes:
a first portion adjacent to an end of the electromagnetic coil;
a second portion disposed around the spacer region of the pair of spacer regions at that end of the electromagnetic coil; and
a third portion disposed around the magnet of the first and second magnets at that end of the electromagnetic coil;
the pair of rings, each ring disposed axially along the bobbin core such that a spacer region of the pair of spacer regions is between the ring of the pair of rings and the midpoint of the electromagnetic coil; and
wherein each of the magnets has a first surface adjacent to a ring of the pair of rings at the end of the electromagnetic coil it is disposed at and a second surface of an inner washer of the first and second inner washers at end of the electromagnetic coil it is disposed at.

10. The reciprocating fluidic pump according to claim 9, wherein at least one of:
each magnet of the first and second magnets is completely outside the inner washer of the first and second inner washers it is adjacent to;
each end of the piston when it is aligned within the bore of the bobbin core to the midpoint of the electromagnetic coil does not project beyond a point along the longitudinal axis of the bore of the bobbin bore defined by the extent of the spacer region of the pair of spacer regions along the longitudinal axis of the bore of the bobbin core at the end of the electromagnetic coil it is disposed at;
the ring is formed from a soft magnetic material; and
the spacer region is formed from air or a plastic.

11. The reciprocating fluidic pump according to claim 1, further comprising:
a pair of spacer regions, each spacer region defining a region adjacent to the bobbin core at a first predetermined position relative to a midpoint of the electromagnetic coil along the longitudinal axis of the bobbin core enclosed by the electromagnetic coil, the bobbin core, an inner washer of the first and second inner washers, a ring of a pair of rings, and a magnet of the first and second magnets;
wherein each of the inner washers comprises:
a first portion adjacent to an end of the electromagnetic coil; and
a second portion disposed around a first predetermined portion of the spacer region of the pair of spacer regions at that end of the electromagnetic coil;
the pair of rings, each ring disposed axially along the bobbin core such that a spacer region of the pair of spacer regions is between the ring of the pair of rings and the midpoint of the electromagnetic coil; and
wherein each of the magnets has a first surface disposed adjacent to a ring of the pair of rings at the end of the electromagnetic coil it is disposed around, a second surface encompassing a second predetermined portion of the spacer region of the pair of spacer regions at that end of the electromagnetic coil, and a third surface disposed adjacent to an inner washer of the first and second inner washers at end of the electromagnetic coil it is disposed at.

12. The reciprocating fluidic pump according to claim 11, wherein at least one of:
each magnet of the first and second magnets is completely outside the inner washer of the first and second inner washers it is adjacent to;
each end of the piston when it is aligned within the bore of the bobbin core to the midpoint of the electromagnetic coil does not project beyond a point along the longitudinal axis of the bore of the bobbin bore defined by the extent of the spacer region of the pair of spacer regions along the longitudinal axis of the bore of the bobbin core at the end of the electromagnetic coil it is disposed at;
the ring is formed from a soft magnetic material; and
the spacer region is formed from air or a plastic.

13. The reciprocating fluidic pump according to claim 1, wherein the magnetic material of at least one of the outer body and the first and second inner washers comprises a sintered magnetic composite material comprising an epoxy bonded powdered iron composite material.

14. The reciprocating fluidic pump according to claim 1, further comprising:
a swirl jet comprising a plurality of vanes arranged to impart a swirling motion to the fluid at an end of the bobbin core; and a plurality of vanes arranged on an end of the piston to convert at least a portion of the swirling motion of the fluid into rotational motion of the piston.

15. The reciprocating fluidic pump according to claim 14, wherein the swirl jet generates hydrodynamic pressure to reduce friction on the piston.

16. The reciprocating fluidic pump according to claim 14, further comprising a plurality of swirl jets, wherein each one of the plurality of swirl jets are arranged in a respective one of the inlet port or the outlet port of the first or second cylinder head.

17. The reciprocating fluidic pump according to claim 14, further comprising:
   a second swirl jet comprising a plurality of vanes arranged to impart a swirling motion to the fluid at a second end of the bobbin core; and
   a second plurality of vanes arranged on an opposite end of the piston to convert at least a portion of the swirling motion of the fluid into rotational motion of the piston.

18. The reciprocating fluidic pump according to claim 17, wherein the swirl jet is arranged in one of the inlet port or the outlet port of the first cylinder head and the second swirl jet is arranged in one of the inlet port or the outlet port of the second cylinder head.

* * * * *